United States Patent [19]

Beatty et al.

[11] Patent Number: 4,574,355
[45] Date of Patent: Mar. 4, 1986

[54] ARRANGEMENT FOR SENSING REMOTE BINARY INPUTS

[75] Inventors: Robert M. Beatty, Warwick; Edward B. Miller; Paul G. Huber, both of West Warwick, all of R.I.

[73] Assignee: General Electric Company, Bridgeport, Conn.

[21] Appl. No.: 548,110

[22] Filed: Nov. 2, 1983

[51] Int. Cl.[4] .............................................. H02J 3/10
[52] U.S. Cl. ..................................... 364/492; 307/39; 364/483
[58] Field of Search ......................... 364/492, 493, 483; 307/38, 113, 40, 115, 140, 131, 39; 375/107; 340/310 A, 825.06, 825.07

[56] References Cited

U.S. PATENT DOCUMENTS

| 4,153,936 | 5/1979  | Schmitz et al. ........... 364/493 |
| 4,167,786 | 9/1979  | Miller ..................... 364/493 |
| 4,168,531 | 9/1979  | Eichelberger et al. ..... 364/900 |
| 4,173,754 | 11/1979 | Feiker .................. 340/310 A |
| 4,185,272 | 1/1980  | Feiker .................. 340/168 R |
| 4,196,360 | 4/1980  | Miller et al. ........... 307/270 |
| 4,213,182 | 7/1980  | Eichelberger et al. ..... 364/493 |
| 4,264,960 | 4/1981  | Gurr .................... 364/493 X |
| 4,347,575 | 8/1982  | Gurr et al. .............. 364/492 |
| 4,348,668 | 9/1982  | Gurr et al. ............ 364/493 X |
| 4,367,414 | 1/1983  | Miller et al. ............. 307/38 |
| 4,396,844 | 8/1983  | Miller et al. ............. 307/39 |
| 4,425,628 | 1/1984  | Bedard et al. ........... 364/900 |
| 4,484,258 | 11/1984 | Miller et al. .......... 364/492 X |

Primary Examiner—Edward J. Wise
Attorney, Agent, or Firm—Cushman, Darby & Cushman

[57] ABSTRACT

An improved switch input arrangement for a system that remotely controls distributed electrical loads. The switch input arrangement is part of a transceiver decoder that receives commands from central controller for controlling the state of latching relays for controlling the power circuits of the loads. The improvements include: monitoring the state of contact closure inputs to the transceiver decoder, selectively enabling/disabling specific contact closures to control the masking of switch inputs, inclusion of an accumulated switch buffer to store the last actuation state of all relays, an answerback to insure that action occurs responsive to a switch input, a shifting threshold and multiplexing technique for more accurate reading of contact closure switch inputs, and the inclusion of a power-up reset message annunciated to the central controller to alert it that certain commands may have to be issued in order to reestablish the desired states of the transceiver.

9 Claims, 40 Drawing Figures

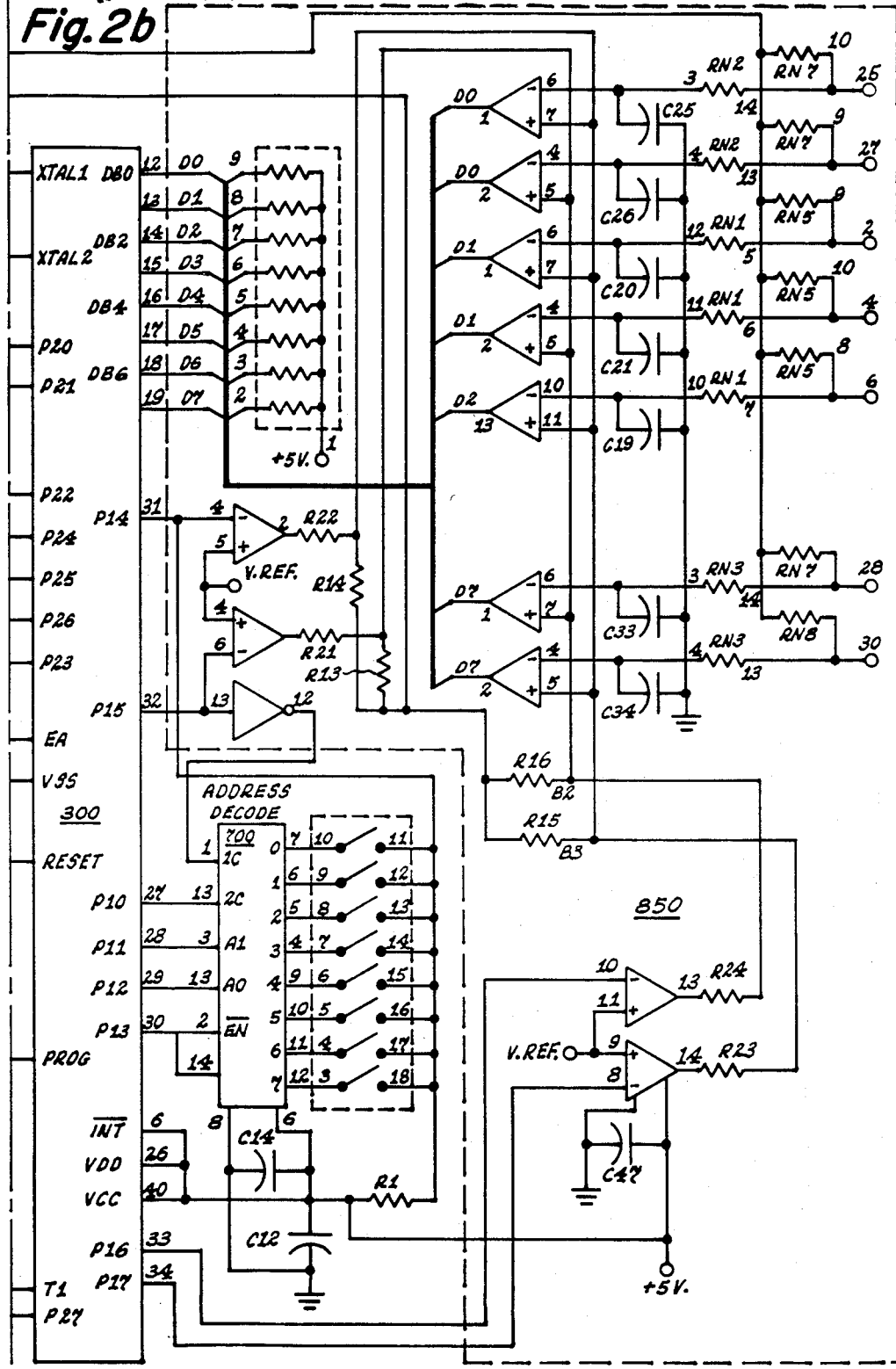

ARRANGEMENT FOR SENSING REMOTE BINARY INPUTS

BACKGROUND OF THE INVENTION

There has been developed a system for remotely controlling electrical loads distributed over a wide area (such as a large office building or factory) from a microprocessor based central controller. That system is disclosed in U.S. Pat. No. 4,367,414—Miller et al, issued Jan. 4, 1983. The information disclosed in that patent is incorporated by reference thereto as if fully set forth herein. In the Miller '414 system, control instructions are issued by the central controller 50 and are tarnsmitted to various transceiver-decoders 56 via a twisted pair cable 58 constituting a bidirectional communications channel. A particular transceiver-decoder that is "addressed" carriers out the command by actuating one or more particular relays to make or break an electrical connection as desired. The central controller issues its control instructions in accordance with a predetermined schedule, in response to a measured parameter (such as light level or temperature) or in response to a user switch actuation sensed by a switch processor in the transceiver decoder and transmitted to the central controller over the bi-directional communications link, or in response to a user command telephonically transmitted to the central controller.

Although the Miller '414 system operates effectively as disclosed, further enhancements are now possible. This patent is directed to improvements in the transceiver-decoder, particularly to a switch input arrangement for processing various binary closure inputs to the transceiver decoder to be transmitted to the central controller to give it information or request a relay state change.

The enhanced transceiver-decoder is configured in a modular fashion. Separate switch and relay "modules" are provided to allow a user of the product to configure a remote control panel to meet his specific application needs. This modular construction is field adaptable allowing an electrician who has no electronic expertise to easily install, replace and service the panels. To do this, small modules are developed so that they can be easily handled and configured in the field.

It is now possible to further enhance means for sensing the ON/OFF condition of binary contacts to make appropriate control decisions. In the system depicted in FIG. 1 of Miller '414, central controller 50 could interrogate binary inputs located on a remotely located transceiver and determine the proper control output needed in response to the condition of those binary sensors. This is particularly useful where a thermostat is employed as a binary input to the central controller which would turn ON and Off or cycle heating ventilation air conditioning systems according to the ON/OFF condition of the thermostat switch which would be preset to a predetermined temperature threshold. Additionally, a photo relay or switch can be connected to these binary inputs to determine which lights are to go ON and OFF within a perimeter office in response to the amount of sunlight entering the area.

It is desirable to be able to selectively disable the response to certain or specified individual switch inputs thereby allowing certain switch inputs to be masked out. As previously disclosed in Miller '414, the actuation (either opening or closing) of a contact causes immediate transmission back to the controller so that appropriate control information can be transmitted forcing the proper load state. It may be desired at certain times of day, however, to disable selected switches so that no action occurs ignoring its ON/OFF condition. A typical application would include night setback thermostats where two thermostats would be connected to two binary inputs such that one thermostat would be enabled and so set for normal working periods while the second thermostat would be set and enabled during off hours providing the night setback function. This selective enabling and disabling of contact closure or binary sensors are achieved by commands from the central facility means.

It is also desirable to provide a positive acknowledgement from the central facility means to the remote input transceiver verifying the action of the change of state of binary contact closures. In the prior art, a transmission would be immediately initiated by the transceiver to the central controller means upon the enabling of a binary input. Only one transmission was made such that if the central controlled means missed the message no action would take place. Since this is undesirable for use with critical inputs such as alarms, demand, security and other binary input functions, an answer back function was added. This answer back scheme would result in the input transceiver to periodically transmit to the central controller the action of the binary sensor until the reception of a positive acknowledge that the message was received from the central controller means.

It is also desirable to provide improved self diagnostics such that the central controller can detect the erroneous resetting or subsequent application of power to remotely located transceivers. This power-up and reset annunciation will insure the integrity of the distributed data base while providing a diagnostic means to trace failed devices.

SUMMARY OF THE INVENTION

This invention relates to improvements in transceiver-decoders 56 shown in FIG. 1 of Miller '414. Now, each transceiver-decoder has separate processors for carrying out switch functions (sensing a condition change or a user initiated contact closure and sending a message to central controller 50) and receiving a command from central controller 50 and controlling in response to that command, one or more relays in the power circuits of electrical loads to be controlled.

The transceivers according to this invention have some physical and functional differences from those of the Miller '414 patent. These differences are upward compatible with the Miller '414 design and therefore, interchangeable in the field. The notable physical and functional improvements are:

New reset button function which would cycle loads both on and off.
Built-in installation test scenario.
New built-in functions for future product offerings.
Smaller enclosure and plus-in modular design.
No switch inputs—allow add ON switch input modules.

Switch-Only-Transceivers

A switch-only-transceiver can be configured as an add-on plug in module. It can be a "piggyback" module for any new transceiver.

Pulse-Output Transceiver

This transceiver provides a means to pulse high current contactors or motor starters. This product has solid-state outputs capable of driving a maximum of 1 amp at 120 VAC for 100 msec's. In the alternative, this function can be carried out as a relay output function. The product is configured in 8 outputs and should fit into the same case as the stand alone switch-only-transceiver.

All of the above products are configures to operate at 115 V, 230 V, and 277 V AC (50/60 Hz) desirable to have these multiplicity of input voltages be compatible with every product so there is no distinction due to input voltage.

Power Supply

A universal power input circuit is provided for all products rated for an input voltage range of 100 VAC to 320 VAC (RMS) at 47 to 100 Hz.

The power dissipation of the transceiver is kept as low as possible to eliminate the need of costly cooling techniques. The maximum steadystate power (not pulsing relays) does not exceed 700 mW per transceiver.

Watchdog Reset

A watchdog reset circuit is provided to reset the microcomputer chip in the unlikely event noise causes it to adversely execute erroneous instructions and latchings in a closed loop. The watchdog reset physically resets the computer causing it to execute a power-up sequence described below.

Switch Input Processing

A switch input interface for both a standard 3 wire momentary and 2 wire maintain with a user selectable jumper is to be provided in the same fashion as the Miller '414 transceiver. The switch connects to the transceiver over number 20 AWG wires of up to 250 feet in length. The switch interface circuitry on the transceiver must provide a high enough voltage, typically greater than 20 VDC, so as to breakdown typical oxides that form on the switch contacts.

| Switch Interface Specifications | | | | | |
|---|---|---|---|---|---|
| Description | Notes* | Min. | Max. | Typ. | Units |
| Electrical | | | | | |
| Switch Closed Contact Resistance | 1 | | 700 | | Ohms |
| Open Contact Voltage | 2,5 | 20 | 40 | 30 | VDC |
| Current Supply At 18 VDC | 3,5 | 1.8 | 5 | 2 | ma |
| Switch Input Threshold | 4,5,6 | 8 | 12 | 10 | Volts |
| Functional Timing | | | | | |
| Response To Valid Switch Closure (Debounce Period) | 7 | 40 | 110 | 50 | msec |
| Switch Input Noise Filtering (Cut Off Frequency) | 8 | | | 10 | KHz |
| Special Function Device | | | | | |
| Loading With 18 vdc Minimum | | 3 | 10k | | Ohms |

*See the following notes for a description of the specification.

Switch Specification Notes

1. The switch contact resistance is the maximum impedance that a switch device can have and properly be interpreted as a switch closure. This specification is particularly important for electronic switching means connected to the transceiver.
2. The open contact voltage is a specification to ensure that a minimum voltage is provided or impressed by the transceiver on the switching device to break down oxides that typically form on switch contacts. Furthermore, it is also necessary to ensure a wide noise margin with a large voltage swing. The maximum spec. of 40 VDC is limited by NEC Class 2 circuit requirements.
3. The current supply specification is for special function devices that derive its power from the switch inputs of the transceiver. For example, the BPHOTO-4 photoswitch is a low current device that can derive its operating power from the signal inputs. Therefore, to ensure proper noise immunity, an 18 VDC minimum must be maintained at 1.8 ma current to supply power to the special function device so as not to be mistakenly read as a switch closure. Therefore, the maximum DC operating impedance or load on a switch input cannot be less than 10K Ohms. If the special function peripheral device is less than 10K Ohms, an external power supply is needed for it to derive its power. This spec. also indicates the current limiting required on the switch input circuitry at 0 volts or in the closed contact condition.
4. The switch input threshold is the minimum voltage below which a switch is considered closed or in the "make" condition. Similarly if a switch input is above its maximum voltage it is considered open or in the "break" condition. More significant is the DC impedance on the contact device itself needed to cause this maximum voltage on the switch input terminals.
5. All voltages are referenced to the circuit common.
6. Power to the switches is solely supplied by the transceiver. At no time can a switching device impress a voltage on or power to a switch input of a transceiver. All current notations indicate the positive flow from the transceiver switch terminals to the switching device.
7. Switch debouncing of more than 40 msec's should be provided to guard against multiple switch closures. The debounce period simply means that a switch reading must take place between 40 and 110 msec's. It is not required to have the switch be enabled for two or more switch periods before a reading is taken.
8. During a switch reading sequence appropriate noise rejection and filtering is needed to guard against spurious signals coupled into the switch wire affecting it's reading. To insure the reading of a DC level and not the affects of noise, appropriate low pass filtering is needed (both digital and analog). After the debounce timeout a switch reading is taken. During the switch reading protocol noise filtering can be achieved by sampling the switch closure continuously for 100 microseconds. If the switch changes state or is not stable during the switch reading interval then it is to be rejected and read again after the next debounce period.

Special Switch Only Transceiver Function

In order to improve the systems switch input processing capabilities, a special extension feature is to be provided in the switch only transceiver products. A user selectable switch input enable mask is provided. When a switch is disabled no state change is recorded or can cause a transmission. However, when the switch input is subsequently enabled the state of the switch is to be transmitted to the controller it is in any of its known steady states. Therefore, the enabling of a switch is equivalent to a switch state change which causes the appropriate transmission as if it were actually mechanically actuated.

Specifically:
If in the maintained switch mode, a transmission will be made indicating the ON/OFF state of the switch after the switch input is enabled by the controller.
If in the momentary switch mode the switch is enabled, a transmission is to take place if and only if the switch input is in any one of its "make" contact states, i.e. on or off.

The enabling and disabling of switch inputs adds a powerful dimension to our energy management control system. They can be used in our scheduling, telephone and switch input control scenarios. For example, scheduling of night set back thermostats and improved demand control scenarios are possible.

Special Switch Transmission Feature

Two forms of switch transmissions are to be provided selected by a factory installed jumper. They are the regular and secure mode of switch transmissions.

The regular switch transmission mode is similar to the Miller '414 configuration such that a switch activation causes an open loop transmission. If the controller is in the manual or "down" mode this transmission will be missed and therefore not acted upon. For wall switches this is apparently not a significant problem and is probably the desired scenario. The user may simply try activating the switch again. However, when connected to demand control equipment or special purpose devices, it is desirable to have the system catch up to these command inputs once returning to the automatic mode.

Therefore, a secure mode of switch transmission is defined whereby a transceiver would transmit a switch action at 1 second intervals until receiving a switch acknowledgement from the central controller. This will provide a secure and fully closed loop system.

Only a reset command, switch acknowledgement, or a power-up can abort this answer back switch protocol. This feature will again provide the most secure system while maintaining system throughout.

Power-Up Sequence

When power is first applied, the transceiver is to enter a "power-up" sequence. The power-up sequence consists of an internal reset protocol plus special functions.

The reset protocol has the folllwing functions.
Delay 100 msec's to allow power supplies and external circuits to precharge. This must be the first function performed after initializing I/O lines.
Disable any relay processing action or pending action (do not change the state of relays).
Disable switchleg activation.
Clear any switchleg mask words. Enable all switchleg input circuits.
Clear any transmission requests.
Reset the receiver section to wait for a line free.
Do not alter the internal memory containing the states of the relays. Many times a power-up due to a watchdog reset will not affect the validity of the relay state work stored in its internal memory.
Initialize the switch input section so as not to cause the transmission of the present switch states. It should be noted the action on switches are taken only when there is a change of state or condition. The switch enable mode and switch read command. are the only exceptions.

In addition to the above reset protocol the following two special functions are included during a power-up sequence.
Set an Internal Reset Bit which is used the central controller to indicate there has been a power-up sequence. This internal bit can be read by a controller for self clearing system functions. This internal reset bit is cleared only after a command is received affecting either relays or switchleg functions. It can be used to cause a transmission upon a command to the central controller (see the central control interface section for details).
Set-up to cause a single transmission indicating a power-up sequence took place. This is random access unsolicited transmission to the central controller who could decide to take command action. Only one transmission of this message is allowed. The Internal Reset Bit is not to be cleared after this transmission.

Note: There is a distinction between the "reset protocol" and power-up sequence. The reset protocol although a subset of the power-up sequence can be activated by a command from the central controller. When invoked by the controller the internal reset bit is to be cleared since it is only associated with a physical reset of the microcomputer.

A power-up sequence can only be executed either by a true power-up, watchdog reset trip, or by activating the reset button. A reset protocol sequence can be executed by either a power-up sequence or on command from the central controller.

Addressing

The transceiver product will have a 10 bit address similar to the existing product configurations. However, the address scheme will support the following extensions:

Hardware

The hardware for the enhanced transceiver according to the present invention includes the following:
A. Data line transmitter/receiver circuit
B. Watchdog reset & voltage monitoring circuit
C. Jumper selection circuit
D. Address decode circuit
E. Switch input module circuit The following is a list of particular objectives of the present invention:

A first object of the invention is to provide the ability to monitor binary input sensors upon command from a central facility over a shared or common data communications link.

Another object of the invention is to provide a means to selectively disable individual switch inputs so that they can be ignored and no action take place during certain conditions defined by the central facility means. When a switch input is masked, no transmission or any action will take place upon the subsequent change of state of said masked input.

A further object of the invention is to provide a novel switch threshold multiplexing apparatus with improved input filtering. The multiplexing scheme is achieved by shifting the input threshold to comparators so that a multiplicity of switch input lines can be multiplexed into a microprocessor for subsequent processing. This threshold shifting means as a technique for multiplexing is distinguishable over Tri-State devices previously used in OR-TYING inputs onto a common bus.

A still further object of the invention is to provide the ability to read an accumulated last state transmitted for each individual switch monitored by the input transceiver. This accumulated state memory would not only contain the actual state of two wire maintained contacts but also the last state of actuation of previously actuated three wire momentary contacts. Since a momentary contact input disappears, its ON/OFF condition is lost unless it is remembered. The apparatus has been provided to remember such changes in state and allow it to be interrogated upon command by a central controller means.

An even still further object of the invention is to provide a secure or answer back response to binary input actuations. This will insure that the responding device will have read and acknowledged the switch actuation. This is needed to verify the response due to critical inputs, such as alarms, demand, light levels, and temperature changes.

Another object of the invention is to provide for the annunciation of input module powerup or erroneous reset. This annunciation will insure the integrity of the distributed data base while enhancing the system's diagnostics and self correction capabilities.

To accomplish these and other objects, a separate input transceiver module was developed extending the capabilities of the Miller '414 system. The switch input or binary input transceiver module is configured to plug into a mother board similar to that of the relay transceiver Ser. No. 547,619, filed 11-1-83. It can be housed in a panel where there are both binary inputs and relay outputs provided. As in the prior art, this input transceiver connects to the low voltage twisted pair data communications link connecting all remotely located transceivers or load control processors to the central controller means. The binary input transceiver is responsible for providing a simple contact closure input port for control override commands to the central controller means. Upon the actuation (change of state) of any of the monitored binary inputs, an automatic transmission back to the controller is initiated by the transceiver. The specific improvements in this invention allow the central controller to monitor binary sensor inputs to determine appropriate control action. These binary inputs are read on command from the controller but further improvement was made to allow for the masking of certain switches disabling them in accordance with commands from the central facility.

An additional feature was provided to insure the actuation in response to binary inputs. This feature is known as the answer back or secure mode switch transceiver which periodically transmits the actuation of the binary input until receiving a positive acknowledgement from the central controller means that the sensor was read. Additional diagnostic capability was provided to interrogate the last state accumulated of all momentary and maintained binary input sensors.

DETAILED DESCRIPTION OF THE PREFERRED EMBODIMENT

Figure 1:
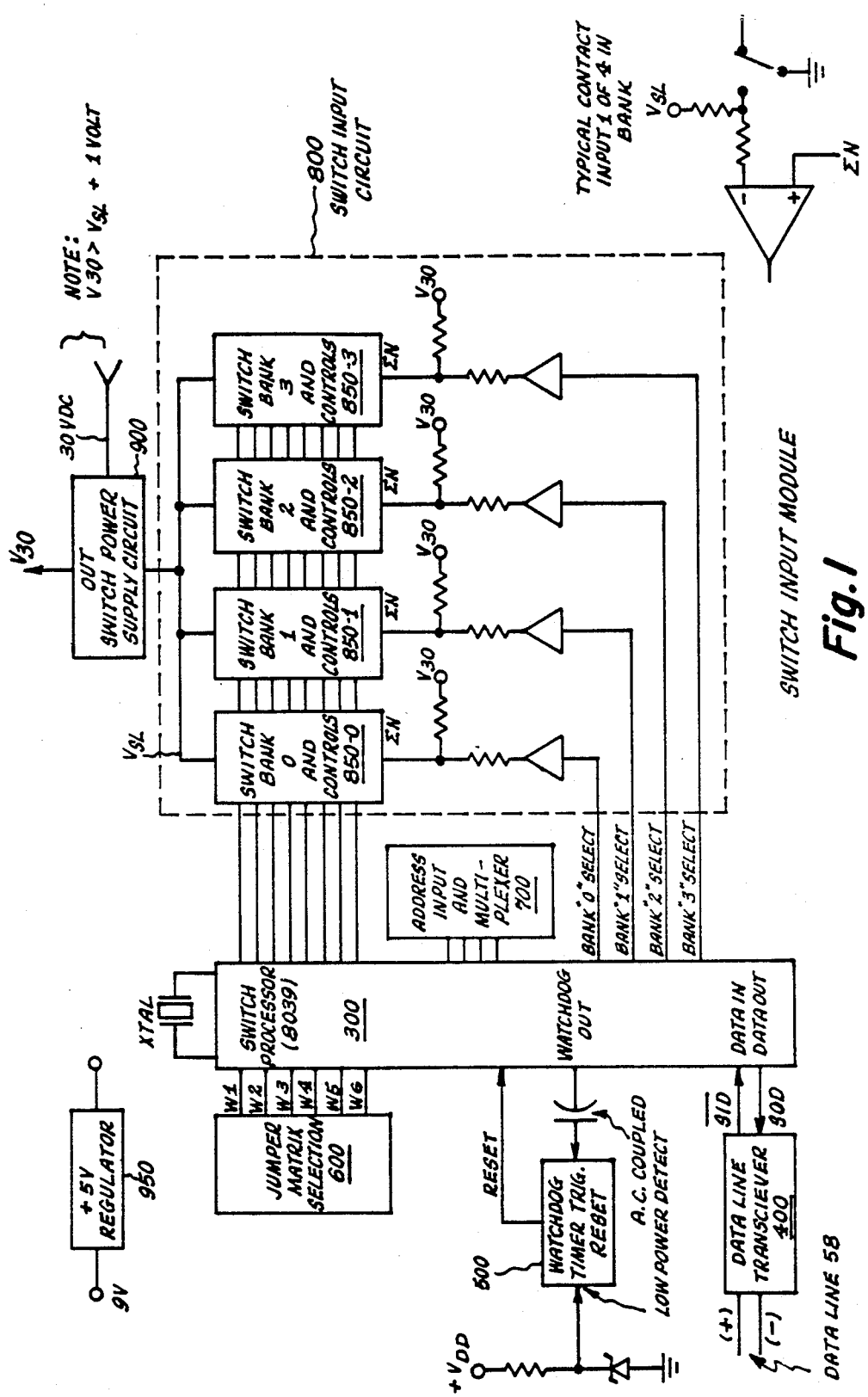
FIG. 1 is a block diagram of the switch input module according to the present invention.

Referring now to FIG. 1 there is shown a block diagram of the switch module, according to the present invention.

The central controller (Reference numeral 50 shown in FIG. 1 of the Miller '414 patent) communicates with a plurality of transceiver decoders via bi-directional communication link. In the preferred embodiment, this bi-direction communication link is constituted by a twisted pair 58 (correspondong to twisted pair 58 shown in FIG. 1 of the Miller '414 patent). A switch processor 300, preferably an 8049 microcomputer, receives commands from twisted pair 58 and sends information to the twisted pair via a data line transceiver 400. Data line transceiver 400 was shown in detail in FIG. 8 of the Miller '414 patent and therefore will not be detailed in schematic form.

Data line transceiver 400 couples relay processor 300 to the common communication link (twisted pair 58) used to transmit serial data to and from the central controller (not shown but corresponding to central controller 50 in the Miller '414 patent). Data line transceiver 400 contains both a receiver and a transmitter to facilitate bidirectional data communication. Both the transmitter and receiver are optically isolated from any ground reference thereby providing a noise immune balanced driver capable of rejecting common mode disturbances and receiving differential signals. Serial data is transmitted in a similar fashion as described in the Miller '414 patent and is received from the data line over the SOD line. Transmitted, output data such as for example information related to switch contact closures is impressed onto the data line via the SID line.

Associated with processor 300 is a watchdog reset circuit 500 including a watchdog timer 500 and associated circuitry. Watchdog reset circuit 500 is responsible for causing or generating a reset pulse to processor 300 under the following conditions:

A. Power on; when power to the system is first applied.
B. Low power; when the power to the system falls below a predetermined operating voltage.
C. Watchdog Time-out which results when the processor 300 fails to retrigger the watchdog timer 500 within a predetermined time interval. The trigger to the watchdog timer is reset every time processor 300 causes a pulse on the watchdog out line. This line is AC coupled to the watchdog circuit to insure only transitions cause a reset. By forcing processor 300 to pulse its watchdog output line, it is insured that the system will remain in a deterministic state. If for any reason processor 300 fails to reset the watchdog timer within a predetermined time interval, timer 440 will force a reset on the reset line of processor 300 in an attempt to restart it. This will self correct the system to a deterministic state reducing the systems vulnerability to spurious signals. A reset pulse is generated periodically until the watchdog reset signal appears acknowledging the proper operation of processor 300. After a reset, processor 300 will annunciate the occurrence on the data line.

A jumper selection matrix 600 is used to select an operating mode of a relay module. This allows a multiplicity of functions to be achieved with essentially one apparatus configuration. By the use of the jumper selection matrix 600, the apparatus can be particularly configured for a special application. The jumpers are:

W1: (selects normal or answerback switch inputs),
W2: (not applicable),
W3: (not applicable),
W4: (8 or 16 switch input select),
W5: (communcation, new or old format),
W6: (3 wire or 2 wire (momentary or maintained, respectively) switch configuration).

An address input multiplexer 700 provides for the multiplexing of address bits into processor 300. This allows the multiple use of a common set of input/output lines to processor 300.

A switch input circuit 800 couples external contact closures or switch inputs to processor 300. The circuit provides the necessary buffering and protection against transients that can couple on to externally routed switch cables. There are 4 banks 850 of 4 3 wire inputs that are multiplexed into the microcomputer. Each switch input (3 wire) has a red (ON) and black (OFF) and a common wire. Therefore, three (3) lines are required for each switch to read an ON/OFF contact closure into the microcomputer. In the 2 wire configuration only the red (ON) wire or line is utilized to determine the state of a switch contact.

A switch power supply circuit 900 provides two power outputs, the switchleg power $V_{SL}$ and the reference power V30. The VSL will to breakdown oxides that may form on switch contacts while providing the necessary noise immunity. The V30 supply acts as a reference to the switch enable input for each bank. When a bank is enabled V30 is divided by 2 to provide a reference threshold voltages used to read the switch input. When the bank is disabled the enable lines are pulled to V30 thereby disabling the switch bank. This enabling/disabling requires that V30>VSL+1 volt.

There is further provided a five volt regulator 950 for supplying power to the logic circuits.

Switch processor 300 functions as a sequential logic machine that is configured by firmware to perform all the control and communication processes discussed above.

Figure 2A:
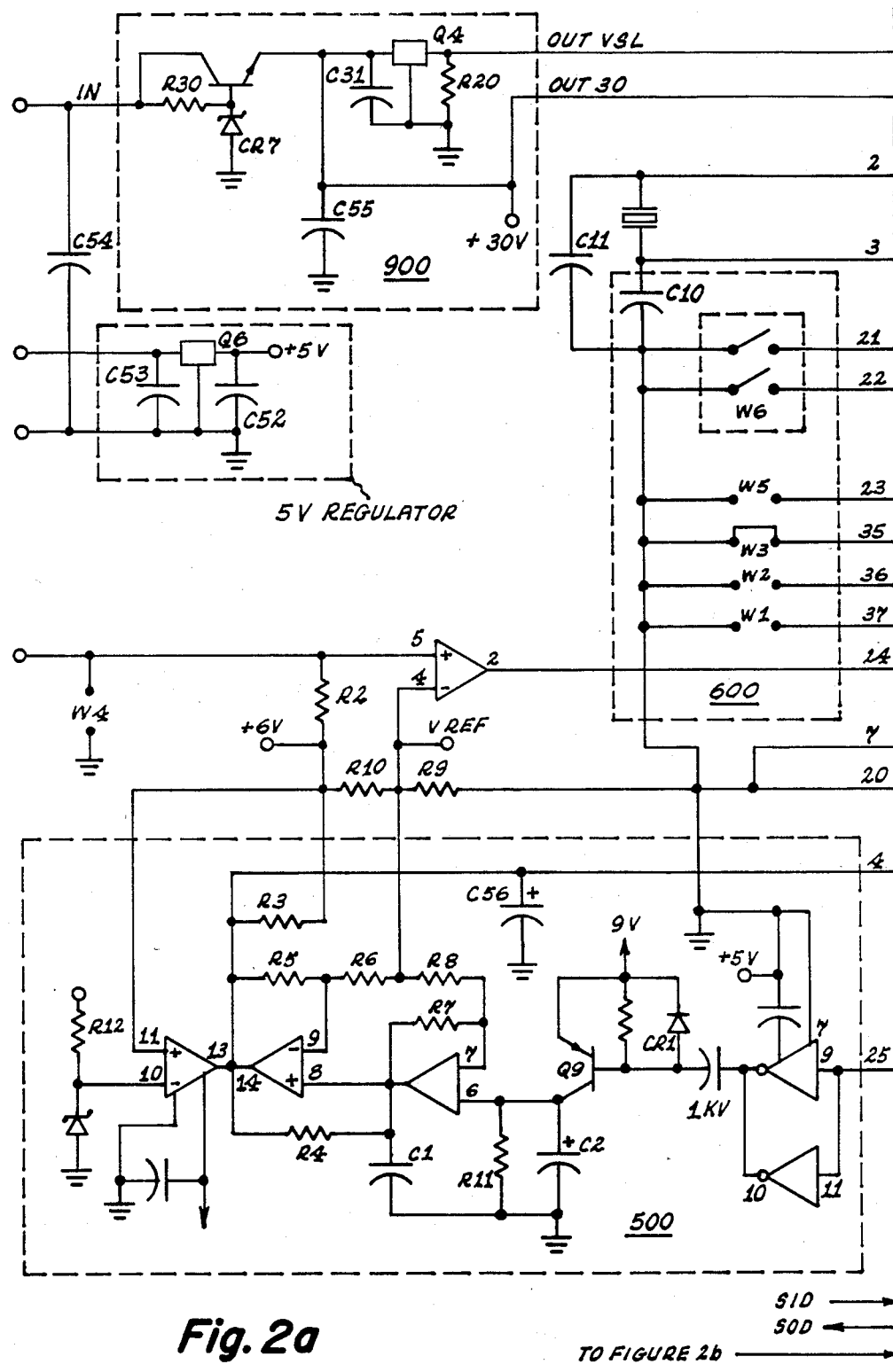
FIG. 2 (including FIGS. 2A-2C) is a schematic diagram of the switch module with the data line transceiver omitted. A schematic diagram of the data line transceiver portion of the relay module can be found in the Miller '414 patent, FIG. 8, incorporated by reference into this application.

A detailed schematic diagram of the switch module is shown in FIG. 2, including FIGS. 2A-2C.

The Watchdog circuit 500 has several functions. The first function is a power-on reset function. The second function is a voltage monitoring function that holds the microprocessor in reset whenever the microprocessor power goes below limits. The third function is to act as a watchdog for the microprocessor. In normal operation the microprocessor will send a string of signals through Pin 25, the Prog pin, to constantly reset an RC combination. Should the microprocessor get hung up in an endless loop, or get "lost" in its program, the RC combination will time out and provide a series of reset pulses to the microprocessor, allowing the system to restart without manual intervention by the customer. The watchdog sequence starts with pulses appearing on Pin 25 of the microprocessor. This pin is under software control in the microprocessor. It is directly connected to Pin 9 of U-2 which is an inverter. The inverter in this case is used as a buffer. This buffer drives C-10, a 470 picofarad capacitor which in turn drives the base of Q-10 a 2N2907. When microprocessor signal goes high causing the inverted buffered signal to go low, the base of Q-10 conducts current pushing a pulse of current into C-7 through the collector of Q-10 and charging C-7. R-15 is the time constant determining resistor. The combination of R-15 and C-7 determine how often the pulses must come from the microprocessor to prevent a watchdog reset. In this case, the time constant is 100 milliseconds. R-14 is connected across the base emitter junction of Q-10 and serves to turn off Q-10. CR-2 provides a current path to the current on C-10 when the signal from the buffer inverter is a high level going signal. The primary purpose of C-10 is to provide DC isolation of the reset signals from the microprocessor. In this type of coupling it is not the absolute level of the signal from the microprocessor that determines when a watchdog reset occurs, rather it is the period between transistions of the microprocessor signal that determins when a watchdog reset will occur. Assuming a high level voltage on C-7, R-15, this high level voltage appears on the minus input Pin 8 of the comparator U-6. Since the minus input is at a higher voltage than the position input, then the output of this comparator on Pin 14 will be low. This low level signal is directly connected to the minus input of comparator input Pin 10, another section of U-6, and since in this case the minus input is less than the positive input, the output of this comparator section on Pin 13 will go into the high impedance state allowing R-13 to pull up the reset line, although delayed by C-18. C-18's prime function is to provide a power-on reset. It will hold the microprocessor in reset upon the event of power-on for approximately 500 milliseconds. Should the watchdog pulses cease to occur, Q-10 will stop charging C-7; C-7 will discharge thru R-15 and the voltage on Pin 8 will drop below the voltage on Pin 9 of the comparator, forcing Pin 14 into a high impedance state. R-12 will charge C-6 until the point that the voltage on Pin 10, the minus input of the comparator, will exceed that of Pin 11, the position input of the comparator. The comparator will then clamp low on the output Pin 13 and put the microprocessor into a reset state. It will be held in that reset state until R-12 discharges C-6. This time constant is approximately 20 milliseconds. Thus when the microprocessor fails to give watchdog pulses, the reset line will be given a series of 20 millisecond reset pulses. The rise time on this reset pulse will be determined by R-13 and C-18 and will be very slow as a result. This is of no consequence to the processor which has built in reset hysteresis. R-10 and R-11 provide hysteresis in the comparator circuit for the RC time constant just as R-9 and R-13 provide the hysteresis for the oscillator function. The savings of two resistors was achieved by using R-7 and R-5 combination as a voltage reference. This provides the voltage reference of approximately 2.5 volts and is used in several instances. The low voltage reset circuit operates using R-20 and CR-4 as a 4.3 volt reference into the comparator U-9. This voltage reference is fed into a minus input Pin 10 and is compared to the 5 volt supply of the microprocessor on Pin 11, the positive input. When the microprocessor supply drops below 4.3 volts, the microprocessor is held in reset through this comparator output Pin 13. The jumpers in jumper selectin matrix 600 use the internal pullups of the 8049 and are activated by coupling jumpers to ground. The first jumper, W-1, is called the feature jumper. The second jumper W-2 is not used. The third jumper, W-3, is the type jumper. The fourth jumper, W-4 selects the size. The fifth jumper W-5 is the communications mode jumper. C-8 and C-9 are the start-up and harmonic filter for the crystals Y-1.

Address Decode Circuitry of the Switch Module

Address decoder 700 decodes the address bits one at a time using a 74LS156 as a decode mechanism. The 74LS156 is used in the dual two-line to four-line decoding mode. This is necessary because it shares control lines with the switch multiplexing circuits. Pins 3 and 13 are used as the data input while Pin 15, Pin 1, and Pin 2, Pin 14 connected together are used as enable lines. Using these three lines of control enable allows the multiplexing of control information and address information. The combination of Pin 2 and 14 can be viewed as an overall chip enable. It is active low. Pin 1 can be viewed as the enable pin for the first two-line-to-four-line converter. It is active high and enable the outputs on pin 7 through 4. The second two-to-four converter enable pin is Pin 15 and is active low. In order to determine which address lines are set on the dip switch pull Pin 2 and 14 low and then choose one of the two banks of two-to-four converters. For example, one might put Pin 1 high enabling the first bank of two-to-four conversion. If then both Pins 2 and 13 were zeroes, that is low levels, then Pin 7 would be activated by a low on the output. If the address line zero dip switch is closed, the output of the LS 156 pulls the input line going to port 1, data bit 4, low. If that address line dip switch is open, the pull-up resistor connected in conjunction with this dip switch pulls the line high and a high-level signal would be read. If one now wanted to read the next address bit location, one again pulls Pin 2 and 14 low as a chip enable, put Pin 1 high as the first bank of two-to-four selector enable while leaving Pin 15 high to disable the second bank of two-to-four conversion, set Pin 3 address 1 input low and set Pin 13 a zero input high. This would enable Pin 6 low on the output side which is connected through the address switch selector to port 1, data bit 4, input. Similarly, the other address lines may be read when using the second two-line to four-line converter. Pin 1 is put in a low state, Pin 2 and 14 are enabled and Pin 15 is put into a low state to enable the second bank, that is, outputs 9 through 12. Pin 1 and 15 could not be tied together and Pin 2 and 14 used as the enable lines because when 1 and 15 are tied together, one of the two decoders will always be enabled. When a relay is being pulsed, this output could interfere with proper pulsing of the relays.

The 5 volt regulator consists of a 3 terminal regulator, a 78MO5, which is designated Q-6, and its associated decoupling capacitors. Worse case power dissipation occurs with a 20% error on the high side of the 9 volt source. The power dissipation in a worse case current draw of 150 milliamperes is 0.7 watt. This would mean that without a heat sink this regulator will have a 43 degree C. rise in temperature. This is acceptable given that the ambient environment will not exceed 60 degrees C. and the rated junction operating temperature is 150 degrees C. We will safely be at 100 degrees C. worse case operating temperature.

When jumper W-3 is inserted as a jumper on port 2, data bit 4 of the microprocessor, it indicates to the processor that it is an input type of module. In this case, input mode will be switchlegs. In a switchleg module all circuits are the same as in the relay module with the exception of the relay driver section, which is an output section. That section is transformed into an input section.

A switch is read using a comparator which compares the switch input voltage to a 12 volt reference. If the switch input voltage is greater than 12 volts, the switch is considered in the open connection. If the switch voltage is less than 12 volts, the switch is considered in the closed position. The output of the comparator is fed directly to a data bus input line. A typical input starts with a 3.9K pull-up resistor to 24 volts connected to one of the switch contacts and the other switch contact connected to ground. A switch closure then connects the two contacts. The connection of the contact with the pull-up resistor is brought through a 10K resistor to the comparator input. In Switch Number 1, the comparator input would be Pin 6 of U-8 the negative input. This input also has a 0.1 microfarad capacitor connected to ground. The 10K resistor and the 0.1 capacitor form a RC noise filter with a 1 millisecond time constant. Further filtering of the signal is done in software. This signal is compared to the positive input terminal, Pin 7 in this case of U-8. Normally this pin is pulled up to approximately 30 volts. This makes the comparator output a high impedance state. When the microprocessor wishes to read this comparator, the microprocessor activates port 1, data bit 7. This pin is connected also to a comparator, Pin 8 of U-12, the inverting input. When this comparator input is activated, low, its output goes low and the voltage on U-8, Pin 7 is cut in half through R-23. This makes the voltage at Pin 7 of U-8 approximately 12 to 15 volts as opposed to the previous 30 volts. The microprocessor can now read the data bus port as an input and this switch #1 will appear on D-0 Pin 12 of the microprocessor, which is pulled up by a 4.7K resistor. When the switch is not active the DB0 will be low. When the switch is active, that is grounded, the DB0 will then go high. To use the processor efficiently, eight switch inputs are read at a time. That is port 1, data bit 7 enables eight comparators at one time. In this case, it was convenient for software processing to read eight switch inputs of the same indication, that is, ON or OFF. For example, when port 1, data bit 7 isenabled, we read the "NON" input of switch 1, 2, 3, 4, 5, 6, 7 and 8 of the low address transceiver. When port 1, data bit 6 is enabled, we read the "OFF" switch input of switch 1, 2, 3, 4, 5, 6, 7 and 8 of the lower address. The optional high order address switch inputs work in the same manner except that the "ON" switch bank select is port 1, data bit 4 and the "OFF" switch bank select is port 1, data bit 5.

In the switch power supply circuit 900, a 34 volt source is fed into the daughter board. Noise is decoupled by C54 0.01 microfarad capacitor. Q-5 in conjunction with R-30 and CR-7 form a voltage regulator regulating the input voltage down to approximately 31 volts. This is necessary to protect the LM339 which have a maximum operating voltage of 36 volts. Should something happen to the power supply, and the nominal 34 volts go above specification, this regulator will protect the 339's. Furthermore, in ordinary operation this regulator will reduce the stress on the 339's increasing the MTBF. C-55, a 150 microfarad capacitor, is a filter capacitor to hold up the 30 volt lines while relays are pulsing. The 30 volt supply is used for the 339 positive input and for the bank select of the comparators. The 30 volts also feeds a 24 volt 3 terminal regulator.

The 24 volt supply supplies the reference voltaqe and pull-up voltage for the switch inputs. Each switch input is connected to this 24 volt supply via a 3.9K pull-up resistor. Worse case power dissipation in Q-4 occurs if all switch inputs were activated to some state. In this case Q-4 would dissipate approximately 1.4 watt, caused by a 200 milliamp current drain and a 7 volt differential. This would cause an 84 degree C. rise in Q-4, where the allowable junction temperature in 150 degrees C.

When a switch is activated it causes a current of 6.15 milliamps to flow through its corresponding pull-up resistor. The power dissipated in this 10K resistor is 0.15 watts; maximum power allowable dissipated by a single resistor is 0.2 watts in this type of single inline packaged resistor network. This represents a 25% power margin. However, at the package level, the networks have been wired such that red and blacks were on and offs of same switches are connected to the same SIP. This means that at any given time only one-half of the resistors in a network can be activated so that the power dissipated at a package level is less than 50% of the allowable power. Using this type of margin insures a long life for the resistor packages. With the same life consideration reasons, the decoupling capacitors and filtering capacitors are 50 volt capacitors with 24 volts applied. This type of derating insures long life for the product.

The following table sets forth a pin-out of processor 300.

| Pin | Function | Pin | Function |
|---|---|---|---|
| 1 | N.C. | 21 | ADDR8 |
| 2 | XTAL2 | 22 | MODE |
| 3 | XTAL2 | 23 | COMM |
| 4 | RESET | 24 | SIZE |
| 5 | N.C. | 25 | WDSTB |
| 6 | Vcc | 26 | Vcc |
| 7 | GND | 27 | G2ADRS |
| 8 | N.C. | 28 | ADRIN1 |
| 9 | N.C. | 29 | ADRIN0 |
| 10 | N.C. | 30 | ADRSEN |
| 11 | N.C. | 31 | ADRINP/G2ON1 |
| 12 | SLINP1 | 32 | G1ADRS/G3OFF1 |
| 13 | SLINP2 | 33 | G0ON0 |
| 14 | SLINP3 | 34 | G1OFF0 |
| 15 | SLINP4 | 35 | GND |
| 16 | SLINP5 | 36 | N.C. |
| 17 | SLINP6 | 37 | FEATURE |
| 18 | SLINP7 | 38 | SOD |
| 19 | SLINP8 | 39 | SID |
| 20 | GND | 40 | Vcc |
| SLINPx | 1 = MAKE, | | 0 = BREAK |
| MODE | 0 = MOMENTARY, | | 1 = MAINTAINED |
| FEATURE | 0 = SECURE, | | 1 = NORMAL |
| SIZE | 0 = ONE ADDR | | 1 = TWO ADDR |
| COMM | 0 = NEW | | 1 = NEW & OLD |

The following table sets forth switch group selector.

| ON SLINP1-SLINP8 | G0ON0 | G1OFF0 | G2ON1 | G3OOF1 |
|---|---|---|---|---|
| BANK 0 RED | 1 | 0 | 0 | 0 |
| BANK 0 BLACK | 0 | 1 | 0 | 0 |
| BANK 1 RED | 0 | 0 | 1 | 0 |
| BANK 1 BLACK | 0 | 0 | 0 | 1 |
| NO SWITCHES | 0 | 0 | 0 | 0 |

BREAK is a "0" or low impedance on SLINPx.
MAKE is a "1" or high impedance on SLINPx.

Figure 3:
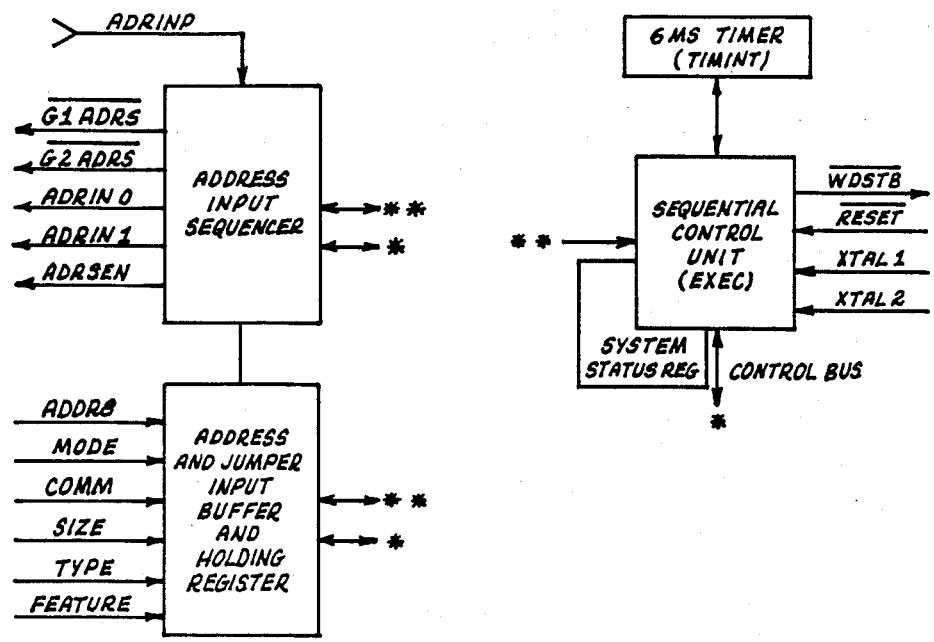
FIG. 3 is a block diagram showing the various functional blocks of the firmware associated with the switch processor (microcomputer) shown in FIG. 1.
Figure 3:
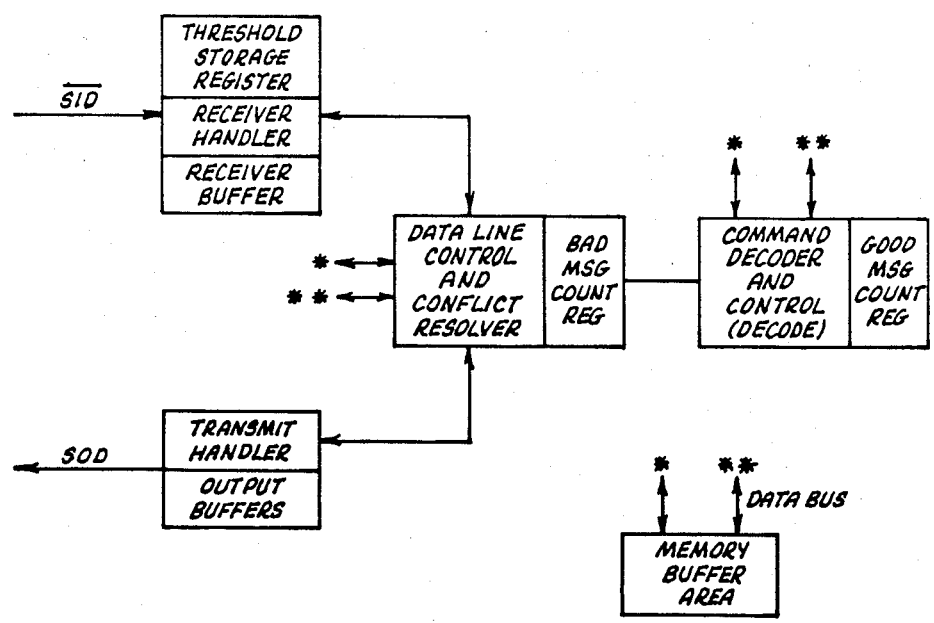
Figure 4:
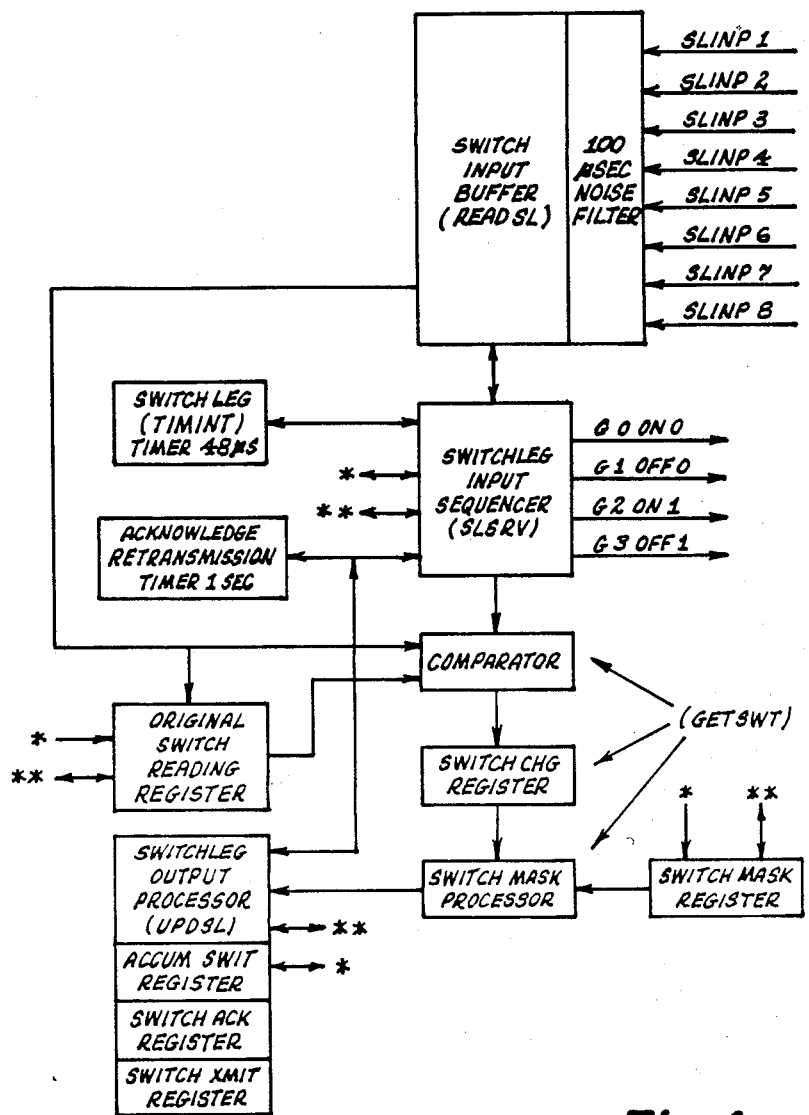
FIG. 4 is a further block diagram illustrating the function of firmware associated with the switch processor (microcomputer) shown in FIG. 1.

Referring now to FIGS. 3 and 4 there are shown block diagrams of the functions performed by the firmware associated with the switchleg processor.

The Switch Transceiver comprises the previously described hardware apparatus and several software or firmware procedures and processes described below. The block diagram of the Switch Transceiver is depicted in FIGS. 3 and 4, and provides a functional description of each of the software process blocks. The firmware is embodied in the object code listing set forth in complete form in Appendix I.

Referring to FIG. 3, the sequential control unit is formed by the TIMINT (timer interrupt service routine) and the Executive (EXEC) routines. The purpose of this section is to provide the 6 msec timing signal and monitor the status of the various other processes. It is further responsible for the task dispatching to all process functions.

The address input sequencer and address and jumper buffer holding registers described in the MODIDN process provides a means of uniquely identifying a switch transceiver, as well as configuring the product via user or manufacturing installed jumpers to support various selectable features.

The command decoder operates upon data contained in the memory buffer area consisting of messages received from the data line receiver. The DECODE process checks the validity of the messages (through parity or checksum calculations), the proper address (ADRCHK process) and the command type. The command decoder will place the proper data into the memory buffer area and status registers of the sequential control unit for subsequent dispatching to the proper task to perform the desired action. The decoding of a valid message results in the incrementing of a good message count register used for internal system diagnostics. (description of RCUSRV & XMTSRV)

A receiver means (RCVSRV) similar to that described in Miller '414 can be utilized in order to convert the incoming serial data stream into a parallel form in the memory buffer area suitable for command decoding.

In addition, a transmitting means (XMTSRV) similar to that described in Miller '414 can be utilized in order to convert parallel data from the memory buffer area to the serial format of the common data line.

FIG. 4 describes the processes associated with the sensing of binary inputs. The switchleg input sequencer (SLSRV) works in conjunctin with the switchleg 48 ms timer (TIMINT) to control the reading and subsequent transmission of switch or input actuations or states.

Upon command from the switchable input sequencer the switch input buffer (READSL) will input the proper bank of switches through a 100 microsecond digital noise filter from the multiplexing apparatus.

A comparator function compares the original switch reading register (from the previous reading) to the current input value, and places those inputs whose state have changed into a switch change register (GETSWT).

The switch mask processor will eliminate any non-enabled switch changes from the switch state word indicated by the switch mask register (user programmable).

The switchleg output processor (UPDSL) will operate on the generated switch state word and place it into the memory buffer for subsequent transmission. In addition, an accumulated switch register which is user interrogatable, is formed and contains the last state values of all switches that have been actuated.

Finally, a 1 second acknowledgement retransmission timer in conjunction with the switch acknowledgement register (from the UPDSL process) allows for a switch to be retransmitted repeatedly until it is confirmed and removed from the switch acknowledgement register. This provides for a more secure means of transmitting a switch actuation, and guarantees that it will be received.

FIGS. 5-38 detail in flow chart form the specific functions of the switch module.

Switch Input Processing

The purpose of the switch input processing section is to read contact closures or switchleg inputs. During this process, the switch inputs are filtered, interpreted and are appropriately setup for transmission onto the data line. This includes specifically the handling of both maintained (2 wire) and momentary (3 wire) switches and maintaining a queue of swtiches that have been activating for subsequent transmission out over the data line to be received by appropriate sensing or controlling devices.

The transmission of these switch inputs (which may or may not involve a special answer-back or secured mode transmission sequence) is also handled in this section. If the transceiver is in the answer-back mode, then a process is established which will keep transmitting actuated switches until an acknowledgement is received back from the controlling or sensing device indicating its reception of valid switch data. This answer-back or secured transmission process involves waiting for a period of approximately one second for an acknowledgement after a transmission of actuated switches were made. If after this one second interval an acknowledgement has not been received by this transceiver the switch actuation message will be repeated and retransmitted back over the common communication link (or the data line). It should be noted that during this subsequent transmission that if there are any new switch actuations that have occurred since the first (or previous) transmission, that these new switch actuations will be included and thereby queued in the switch actuation message that is transmitted over the data line. Furthermore, when a new switch position has been activated while waiting this one second interval for a previous switch acknowledgement the switch information which includes the past transmission plus the new switch will be transmitted immediately upon the actuation of this new switch even if it occurred before the one second period for the acknowledgement has elapsed.

The switch acknowledge, or secured mode switch process, is a selectable feature which is invoked by a jumper inserted in the printedcircuit board during manufacture. This feature, which could have been programmable through commands over the communications link, was implemented as hardware invokable so as to avoid any possibility of spurious signals causing the complex electronic circuits to assume this answer-back function. It was desired to provide this feature for future applications that may involve interfacing to external machine, computing devices or threshold responsive sensors to insure that no data is lost during the normal action in a centralized control system. However, other devices such as normal wall-mounted switchlegs for purposes of turning ON and OFF lighting and other loads, which are typically human actuated, are not desired to continuously transmit until an acknowledgement is received. This is to avoid taking deferred action on human actuated devices when, in fact those actions are no longer needed when the system returns to its normal operation state after a long period of down time which may occur in a centralized control system. In summary, this answer-back feature provides an extra degree of security in the response to contact closure inputs to our central control system. This security is jumper selectable so that it can be applied selectively to loads which need and desire such security.

The processing of switch inputs is performed in the following sequence: 1. switch readings are made at no less than 48 millisecond intervals; 2. during the reading of switches they are appropriately filtered; 3. the switch inputs are then interpreted by considering it to be of either the 2 or 3 wire type; 4. a determination is made as to whether the switch is indeed allowed to be active and cause transmissions to take place over the common communication link. The resultant of this process, on a valid switch actuation, causes an appropriate transmission word indicating which switch and the state (ON/OFF) that has been actuated to be transmitted on the common communication link for further control or sensing processes by other devices.

A switch reading period takes place at no less than every 48 milliseconds. This is to avoid multiple readings of the ON/OFF state of contact closures (switches) due to excessive mechanical bounce which are typical properties of both human actuated mechanical devices and electromechanical devices. 48 milliseconds was chosen to insure that the reading or measurement interval would be greater than this bounce period to reject erroneous multiple actions. Compensating for mechanical bounce of contacts using this period measurement interval method will result in a switch reading that is said to be debounced. The maximum switch interval reading is nominally 100 milliseconds. Since this was determined to faster than multiple actions on a human actuated push button switch, this will insure that no switch request is lost since the measurement interval will always be faster than human inputs.

After the 48 millisecond switch reading interval, switches are then read for a period of 100 microseconds sampled at a high rate. This is to utilize digital filtering techniques, rejecting switch actuations caused by spurious signals. This 100 microsecond sampling period for switch readings yields a 10 kilohertz cutoff frequency low pass filter. It should be noted that in addition to the digital filtering techniques, hardware signal filtering is provided with appropriate lumped elements. This further insures the integrity and validity of any contact closure or switch inputs.

After the switch is read, a determination is made whether to process the contact closure inputs as either 2 or 3 wire devices. This determination is made by a customer selection provided on the transceiver. The 2 wire switch, organized as a single-pole, single-throw device, operates such that an ON condition is considered the make of the contacts while an OFF condition is considered the break of the contacts. The 3 wire switch conforms to the single-pole, double-throw contact arrangement. In this arrangement, an ON condition is considered when one side of the contacts are in the make condition. An OFF condition, or state, is actuated when the other side, or contact, is in the make condition. Any break actions from either contact is considered no action, or change of previous state. This would allow applications of push-button momentary switches. It should be noted that the 3 wire single-pole double-throw switch arrangement is rejected if both contacts are actuated or in the make condition simultaneously. This is to avoid erroneous assumptions of the conditions of these switches since the simultaneous make states is defined by convention as a forbidden state.

After the determination of 2 or 3 wire switches, the switch actuation is compared to a predetermined switch mask which specifies the switch positions that are enabled, that is, that are allowed to be actuated and cause subsequent communication to occur on the common communication link. The switch mask provides the capability to define selectively which switch is enabled. This selective definition is programmed via the common communication link by external devices. The setting of this switch mask is described in the command decoder section of this description.

After a switch is read and the appropriate state is determined (that is, whether it is ON or OFF), it is compared to its last valid state read in the previous 48 millisecond interval. If, and only if, there is a change of state (that is an ON to an OFF or an OFF to an ON condition), an automatic transmission will take place over the communication link to inform remotely located devices of the switch change. This will effectively broadcast the switch actuation immediately so that appropriate control or sensing functions can take place. If there is a message from the previous 48 millisecond interval that is still awaiting transmission due to a busy communications link, the new switch actuation message will be queued and added to the pending outgoing message so that it can be included for transmission in the first free communication opportunity.

In addition to establishing a message to be transmitted over the communications link, the new switchleg input states are merged into the accumulated switchleg buffer. This buffer contains the accumulated history of all switch inputs since resetting this buffer. This historical information recording the last ON/OFF condition of all contact closure inputs provides the ability to maintain a record of said states even when applied momentary contact or switch devices; that is, although a momentary contact is only in a temporary make condition indicating its ON/OFF state this accumulated buffer will hold this state for subsequent interrogation by other devices over the common communication link.

Figure 5:
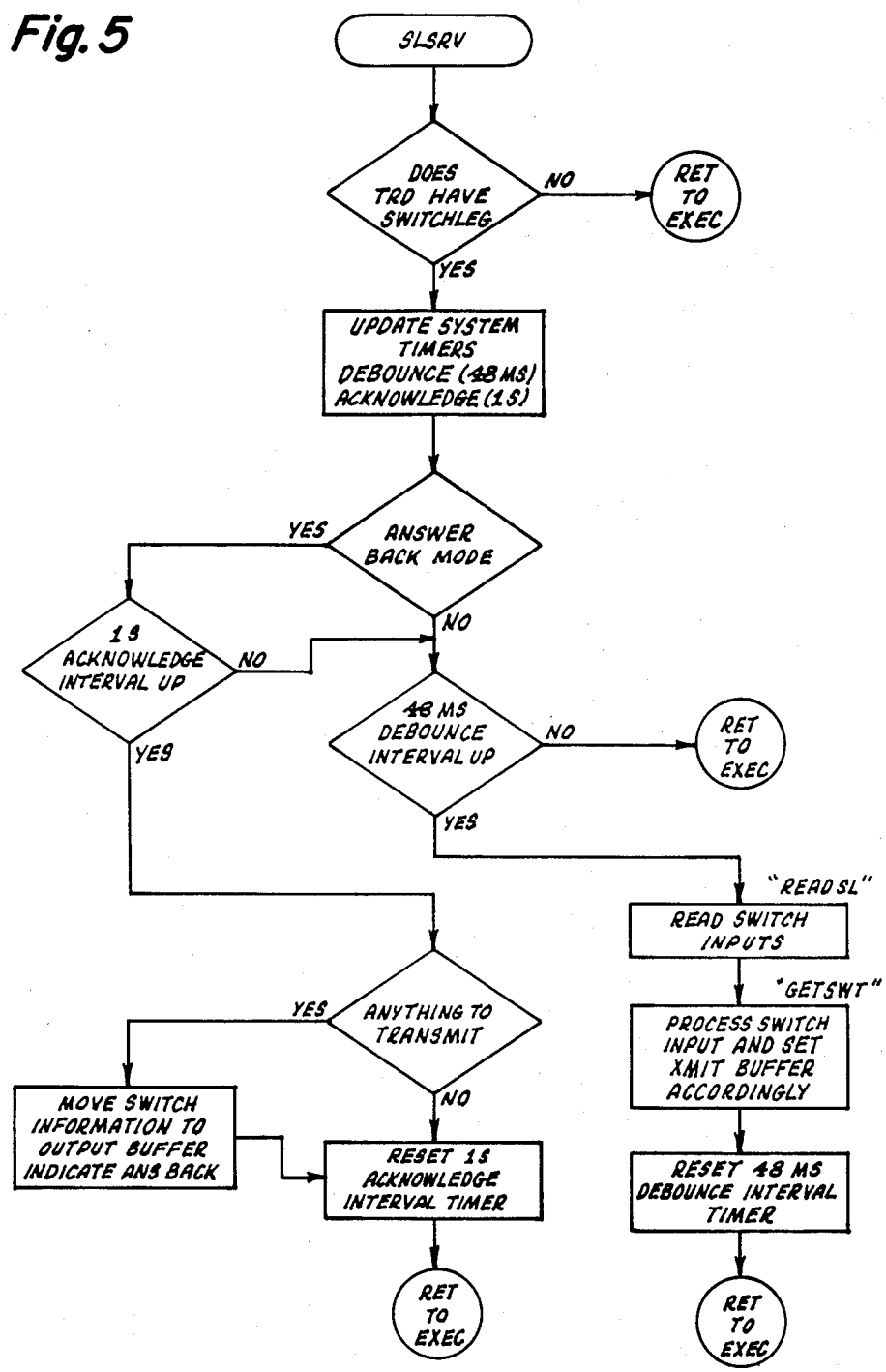
FIGS. 5-38 are detailed flow charts illustrating the functions carried out by firmware associated with the relay processor; and APPENDIX 1 is a complete listing of the object code associated with the switch processor which carries the functions illustrated in FIGS. 3-38.

The process that performs the entire switch handling function is called switchleg service and is designated as "SLSRV". The process flow for the switchleg service function is described in FIG. 5. This process is performed on-command by the main process executive. Referring now to FIG. 5 upon entering the switchleg service process a check is made to see if this transceiver has been defined to have switchleg capability. If not, it aborts and returns back to the exec for further processing. If it does, the interval timers for the switchleg reading and for the retransmitting of non-acknowledged switch transmissions are updated. The updating of these timers includes the time elapsed from the last update or service which can occur any time. Using an internal 6 millisecond timer, the switchleg reading interval timer and the acknowledge retransmission timer are updated to reflect the time lapse, if any, from this last reading. This will insure when long messages are being received over the communications link that these timers will not be unduly neglected and can thereby be updated compensating for any lag due to alternate processing activity. After updating the timers, a check is made to determine if the unit has been selected to be in the answer-back mode. If the system is in the answer-back mode, a check is made to determine if the retransmission acknowledgement timer has timed out. If it has, a further check is made to see if there is still a message that needs to be transmitted over the common communication link. If there is, that message is moved to the appropriate output buffer for subsequent transmission and the acknowledge retransmission timer is reset followed by a return to the system executive. It should be noted that this acknowledge retransmission timer is set to cause a retransmission of switch actuation at one second intervals if they have not been acknowledged. This will insure the integrity of the actuated switch inputs by proividing a hand shake with the external receiving device. If the system is not in an answer-back mode, or if it is in an answer-back mode and the one second timer has not timed out, a check is made to see if the debounce interval timer has timed out. If it has not, further processing is aborted and the system returns back to the system exec. If this timer has timed out, the system assumes it's now time to read switches for further processing. It should be noted that this timer is set for a minimum interval of 48 milliseconds to compensate for the worst case of mechanical bounce that may be associated with devices connected to the contact closure or switch inputs.

The system continues by reading the switch inputs by transferring control to a process titled "READSL". Continuing, after reading the switch inputs, a process called "GETSWT" takes control which is responsible for processing switch inputs and sets up any messages that are needed to be transmitted over the data line in response to switch actuations. After processing the switch inputs and determining its type, various modes and effects of any switchleg mask that might have been defined, the system resets the debounce interval timer to set up for the next switch reading and returns back to the system exec.

The reading of the switch inputs is handled by the process called "READSL". The read switchleg process reads 4 groups of 8 switch lines each at a time. These 4 banks are multiplexed in order to make use of an 8 bit bus structure. Each group is read and processed separately. The read switchleg process results in an accurate reading of the state of the contact closures in each of the 4 groups stored in appropriate registers along with a register indicating whether noise was discovered in any of those switch positions.

Figure 6:
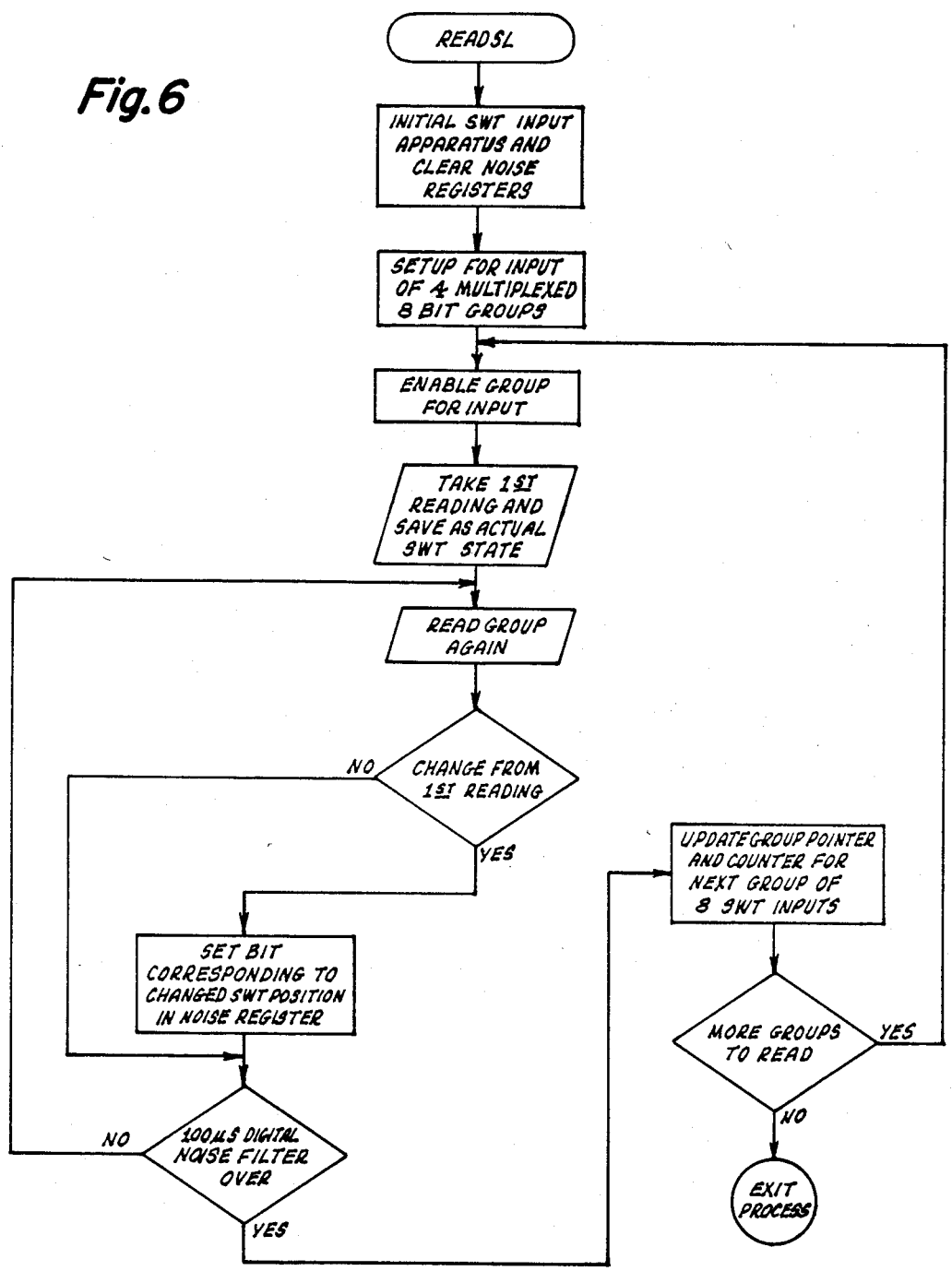

Referring now to FIG. 6. When entering the read switchleg process, the switch input apparatus, which contains the multiplexing hardware, is initialized along with the resetting of the switch noise indication registers and a register pointing to the first group.

It should be noted that two out of four groups are associated together within a bank, and that there are two banks. Bank 0 is associated with groups 0 and 1, and Bank 1 is associated with groups 2 and 3. The association of two groups to a bank provides for the reading of 3 wire switches with their ON and OFF contact arrangement. Furthermore, the two banks, 0 and 1, correspond to the multiple addresses allowed for the switch transceiver. Although, as previously described, the switch input block is in a logical 8 position group, two blocks have been defined in one device allowing it to respond to two separate address locations for the purposes of communicating over the common communication link. In other words, due to the method in which switches are handled by 8 switch input groups, a 16 switch input module was achieved by having it respond to two independent addresses. It should be further noted that this 8 position switch group was arbitrary and is, in fact, independent of this design.

After the initialization of registers and the apparatus, a group is now enabled for input (initially group 0). The 8 switch positions are now read and are taken as the first reading and saved as the actual switch state. After the first reading, the group is now sampled again and a check is made to see if it differed from the first reading. If it did, an indication of the bit position corresponding to the changed switch will be set and saved in a noise register for later processing. This process of reading a group, comparing it with the first reading, and building a noise register based on any differences in the first reading and subsequent readings continues for a period of 100 microseconds. This 100 microsecond sampling loop, as indicated in FIG. 6, provides the digital filtering needed to reject any high frequency noise. After this 100 microsecond group read loop has completed, the process continues by updating the group pointer to the next group (that is, the pointer will now point to group 1 if it previously pointed to group 0) in order to read the next 8 switch input or contacts. A check is made to see if there are any more groups to read. If so, the system loops back and enables the group for input and repeats the filtering process for the next group as indicated in the figure. After all the groups are read in, the actual switch state from all the groups (which represent the first reading) are stored in appropriate switch state registers and the noise registers are set as a result of subsequent readings being different from the first, the system exits back to the supervisory process.

Figure 7:
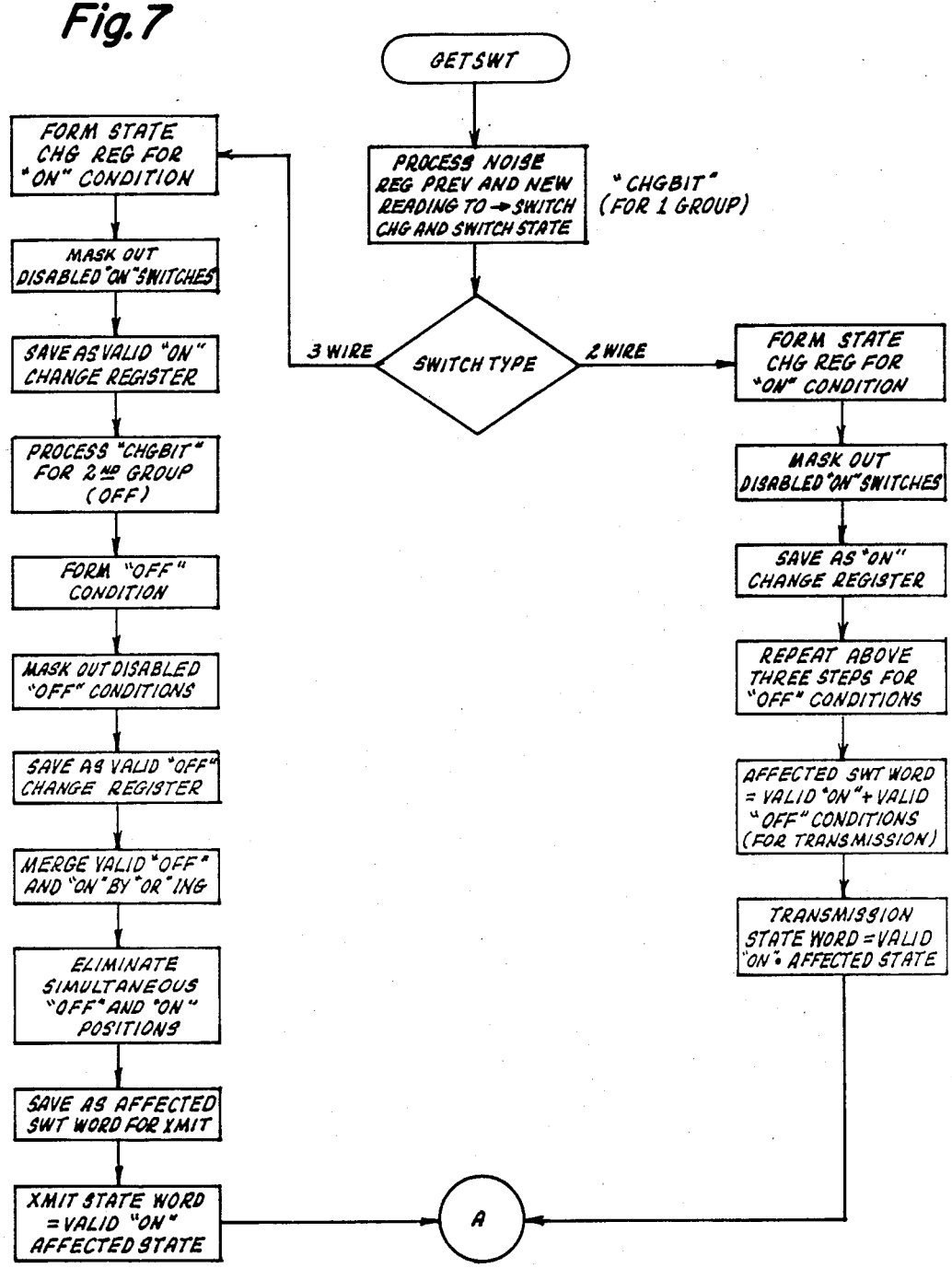

The actual processing of the switchleg inputs and recognition of valid switch changes is performed by the process called "GETSWT". This GETSWT process is depicted in FIG. 7. Upon entering the process, it assumes that switch information has been read in and stored in the actual switch state register and noise register as described above. The output of this GETSWT process will result in the transmitter output buffer being loaded with a valid switch change word (indicating secured switches or one of the two formats for standard switches) for subsequent transmission over the common communication link, if it has determined that, in fact, a switch change took place references to the previous valid switch reading.

Figure 9:
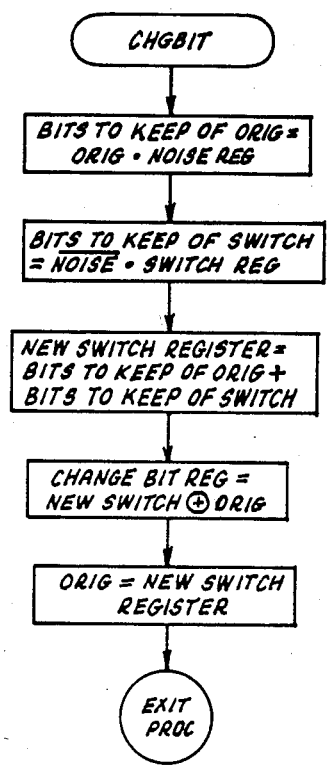

Referring now to FIG. 7, the first group of the Bank is processed by the "CHGBIT" proces of FIG. 9. This process takes the noise register, the previous valid switch or reading (or original switch register) and the new actual switch state reading and creates a register of valid switch changes indicating which switch positions actually changed and a register indicating the ON/OFF state of those switches with respect to the group being processed. A make is defined as an ON or a logic 1 and a break is defined as a logic 0 or OFF. It should be further noted that in a 3 wire configuration this process is repeated for the other group and later further processed to determine the ON/OFF state based on make/make switch action.

After this switch is preprocessed, as was described above for the "CHGBIT" process routine, the system continues by checking if the switch inputs are configured as 2 wire or 3 wire. For 2 wire inputs, a state change word for the ON condition is determined. This word is taken from the ON/OFF state word returned from the "CHGBIT" process which is then masked with the switch enable mask to eliminate disabled ON switches. The result of this operation is then saved in the valid ON change register. The above three steps are repeated for the OFF condition. This time the OFF state is determined from the inverted ON/OFF state word return from "CHGBIT" and the disabled OFF switches are masked out with the ersults saved in a valid OFF change register. The process then creates an effected switch word by ORing the valid ON change register with the valid OFF change register established above. This will yield an effected switch register such that a logic 1 represents an effected switch that had changed from the previous valid state and the logic 0 would indicate no change. Furthermore, the ON/OFF state word is defined to equal the valid ON change register, such that a logic level 1 is equal to the ON condition and 0 to the OFF. It should be noted, however, that the respective bit positions starting from bit position 0 to bit position 7 in both the effected switch word and state word correspond to switch numbers 1 through 8 respectively.

Figure 8:
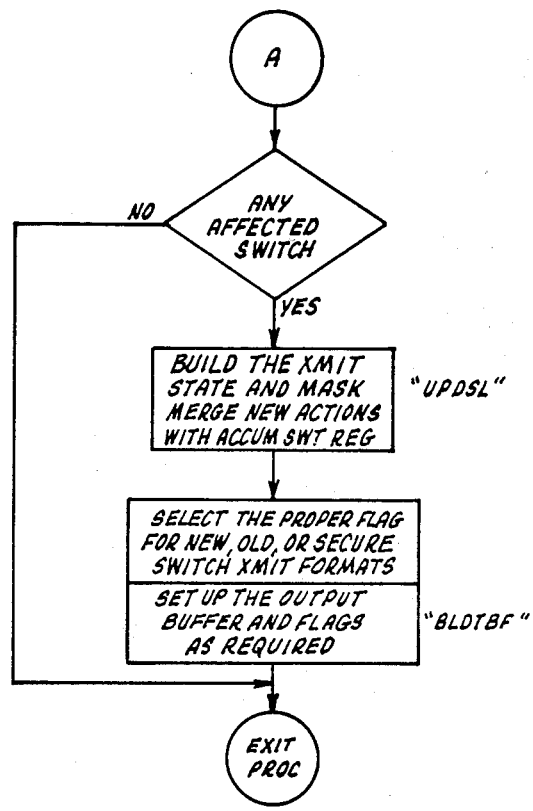

Referring back to FIG. 7 for the 3 wire switch configuration a state change word for the ON condition is similarly determined and masked with the disabled ON switches which is then saved as the valid ON change register. However, the process then calls the "CHGBIT" process (FIG. 9) for the second group in order to process the OFF state condition. Similarly, as with the ON, a valid OFF change register is formed by masking out the disabled OFF switch positions. After this step, the process merges both the ON and OFF valid change registers togehter, eliminates simultaneous ON/OFF positions in those registers, and forms the effected switch registers which is then saved. The ON/OFF state word is further formed by ANDing the previous valid ON change register and the effective switch register to yield an ON/OFF state word suitable for transmission. After either the 2 wire or 3 wire configuration creates the effected switch word and appropriate state word, a check is made to see if there are any switches that have been affected or changed as indicated by FIG. 8. If there is not, the process aborts and returns back to the calling supervisor. If there is a change called for, the process updates and builds a queue and resolves the accumulated switch buffer (performed by the process called "UPDSL"). The proper transmit flag word is selected to indicate secured switches or one of the two formats for non-secured switches. Finally, the process then takes these valid switch change messages and establishses the appropriate transmit buffer through the utility called "BLDTBF" which readies the information for subsequent transmission onto the common communication link. After this, the process is complete and control returns back to the requesting supervisor.

The procedure Get Switch, "GETSWT", described above invokes another procedure called Change Bit, "CHGBIT". The purpose of Change Bit is to combine the switch state and noise registers generated by the "READSL" procedure with the original reading of the switchlegs taken during the previous debounce interval. This process will result in the change register having a "1" value set into a position corresponding to a switchleg that has changed state and a bit set within the new state register which indicates the new state of the switchleg (a 1 is a make or ON condition while a 0 is a break or OFF condition). In addition, the previous original reading is replaced by an updated value reflecting the integration of the switch state and noise registers with the original switch register.

Referring to FIG. 9, describing the Changing Bit, "CHGBIT", routine, the process beings by logically ANDing the original group reading with the noise register to form the bits to keep of the original switch register. Next the noise register is inverted and then logically ANDed with the switch register. This forms the bits to keep of the switch register. The bits to keep of the original switch register are logically ORed together with the bits to keep of the switch register resulting in the new switch register. The process continues by forming the Change Bit register which is equal to the exclusive OR of the new switch register with the original switch register. The Change Bit register will contain a "1" in each position corresponding to a switchleg changed its state. A 0 value will indicate no change of state from the original reading. At this point, the original switch register is updated and set equal to the new switch register completing the process which then exists to the calling supervisor.

Figure 10:
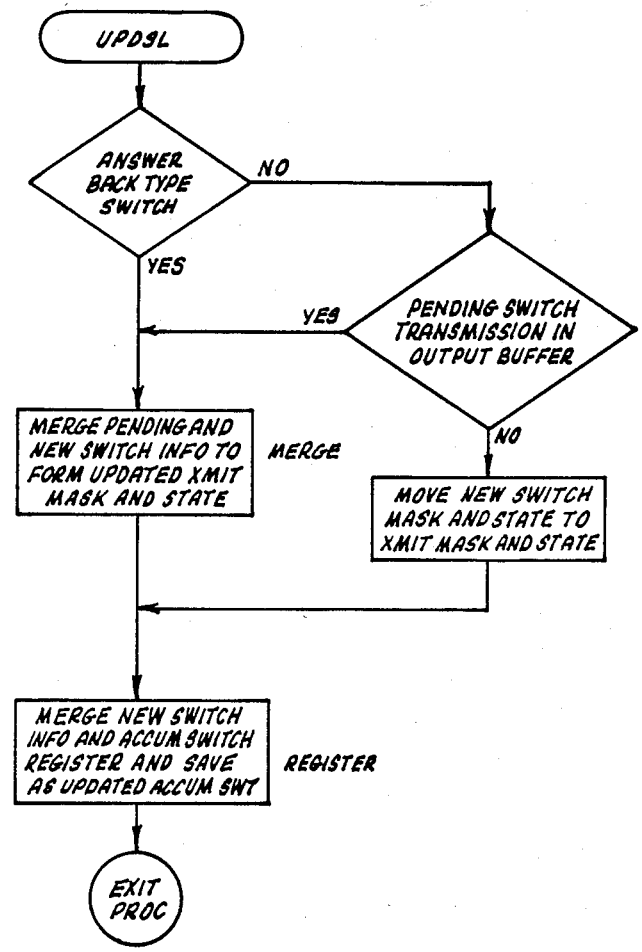

The update switchleg routine "UPDSL", whose use was described above for the "GETSWT" routine, is responsible for the building the transmit switch mask and state register as well as merging the new switchleg information into the accumulated switch register. It should be noted that the accumulated switch register contains a history of all switchleg actions transmitted over the common data line and is constantly updated with more recent actions. It should be further noted that the update switchleg routine will also combine the new switchleg actions with any recent actions that are pending transmission due to a busy common data line. In addition, the update switchleg routine will combine the new switch actions with any secured switches that have not been previously acknowledged. FIG. 10 indicates that on entry to the UPDSL process a test is made to determine if the transceiver is an answer-back type. If so, then any secured switches pending transmission and the new switch information are combined by the "MERGE" routine. This merging will also occur even if the transceiver is not an answer-back type; if there is switch data pending transmission in the output buffer. If no data is pending, then the new data replaces the old. Continuing with FIG. 10, the new switch information is then combined with the historical information of, and saved as, the accumulated switch register; completing the process.

The merge routine, "MERGE" is a process used by the "UPDSL" routine to combine existing switchleg information in the form of a mask and state register with new switchleg information. This process is carried out in such a manner as to keep any uneffected old information and replace any old information that has been changed.

Figure 11:
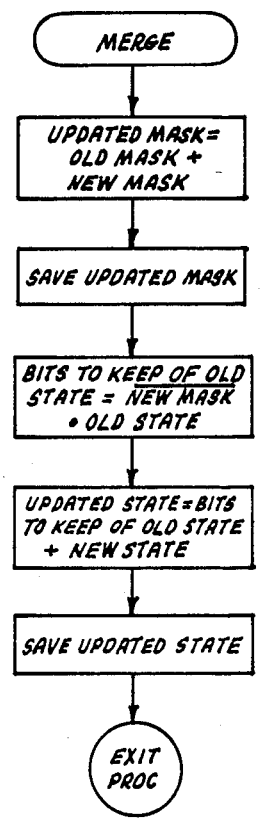

Referring to FIG. 11, the process of flow for the "MERGE" routine, an updated switch mask is formed by logically Oring the old mask with the new mask. This new updated mask is then saved in the appropriate register. The bits to keep of the old state is formed by logically ANDing the old state register with the logical complement of the new switch mask register. Continuing with the flow description, an updated state register is then formed by logically ORing the bits to keep of the old state register with the new state register. This updated state is then saved in the appropriate register completing the process which then exits to the calling supervisor.

This concludes the description of the switchleg handler which provides: 1. A means of inputting sixteen 2-wire or 3-wire switch contact closures over a multiplexed data bus; 2. A means of high frequency noise filtering for the contact closures; 3. A means of avoiding multiple actions due to mechanical bouncing of contact closures; 4. A means of processing these contact closures and generating effected switch mask and switch state information for subsequent transmission on the common data line; 5. A means for restricting undesired switch actions from transmission over the common data line; 6. A means of queuing a plurality of switch actions for transmission over the common data line; 7. A means of providing multiple transmissions of the same switch action to allow an answer-back acknowledgement of that switch action; 8. A means of queuing a plurality of new switch actions with previous switch actions that have yet to be acknowledged; 9. A means of providing an accumulated switch register which will contain the latest switch actions for all contact closure that have occurred (since the time that the accumulated switch register was last reset); 10. A means of formating the information for transmission in such a manner as to distinguish an answer-back switch action from a normal switch action; 11. A means of transmitting normal switch actions in two different formats.

Decoder Handler

The purpose of the decoder handler is to monitor the receiver buffer and determine when a valid message has been received for decoding. When it is determined that a message is awaiting decoding, the message is verified for correctness of format, proper address and the proper check or parity word at the end of the message. Once the validity of the message has been determined, the decoder will recognize various commands for the device in question. The desired actions are then performed which might includes the manipulation of internal data buffers and possible transmission of a reply message to the controlling device via the common data line.

The Decoder Handler includes three main routines: the DECODE routine, responsible for decoding the flag portion of the messages as well as performing other supervisory tasks; the Address Check routine, ADRCHK, responsible for verifying the proper address and checksum or parity word; and the Transmission routine, SENDIT, which is responsible for the transmission of data requiring immediate or interactive transmission.

Figure 12:
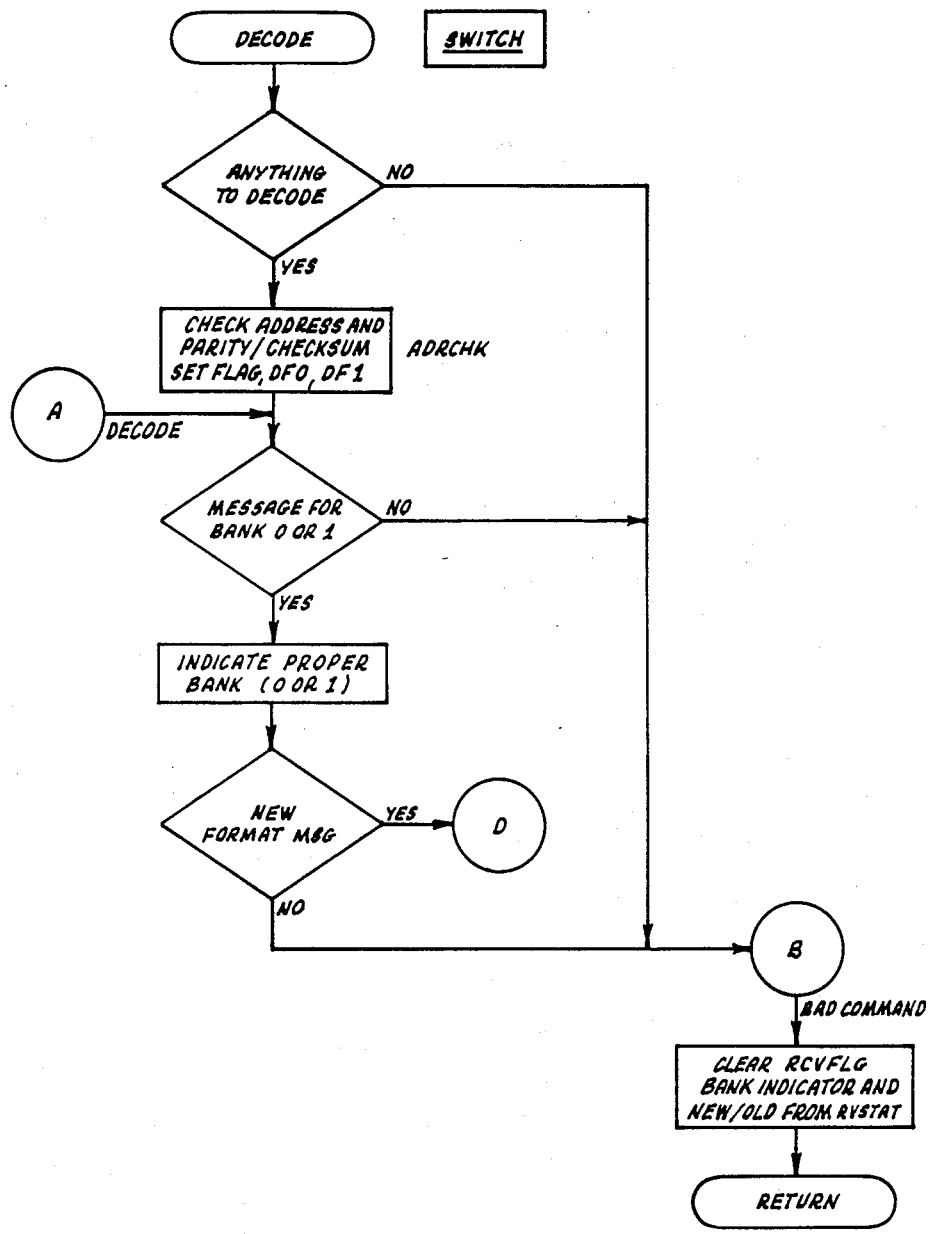

The Decode, DECODE, routine is invoked by the executive and is described in FIG. 12. Beginning with the entry point, a test is made of the RVSTAT register to determine if the RCVFLG is set indicating the presence of a message in the receiver buffer. If not, then control continues to Connector B or DECODE2 with is an abort from the Decode utility that will clear the RCVFLG bank indicators and new/old mode bits from RVSTAT and then return to the executive. If it is determined that there is a message to be decoded in the Receiver Buffer, then the utility ADRCHK is invoked in order to check the address and parity or checksum word of the message and build the flag, DF0 and DF1 storage register as required. At Connector A, DECOD0, a test is performed on the RVSTAT register to determine if there is a message waiting decoding for either bank 0 or bank 1. If not, then the routine aborts through Connector B. Otherwise, the proper bank, either 0 or 1, is indicated (by setting or resetting F0). A test is then made to determine if the message is in a new format. If so, the control continues at Connector D of FIG. 13. Otherwise, the process completes at connector B.

Figure 13:
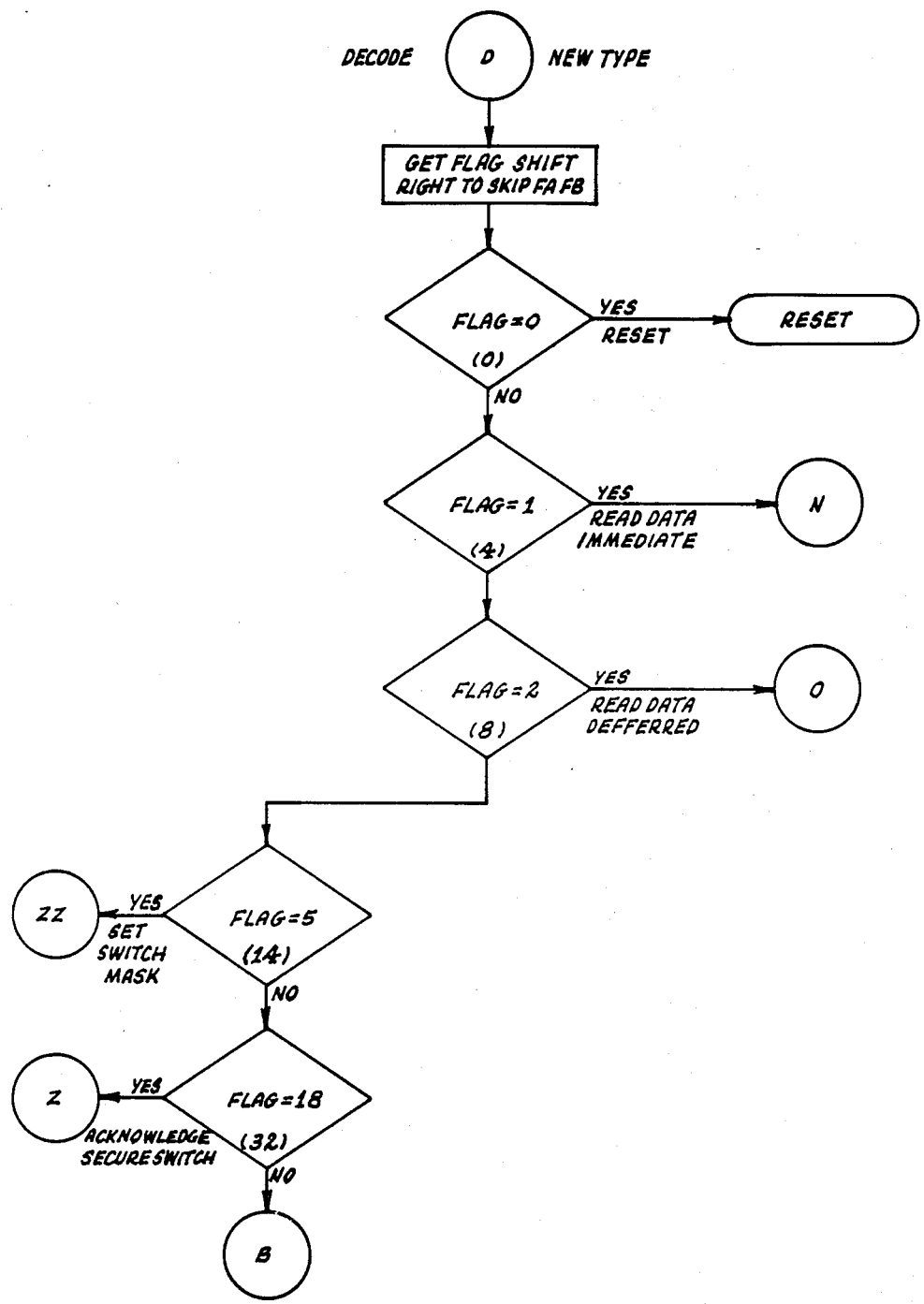
Figure 20:
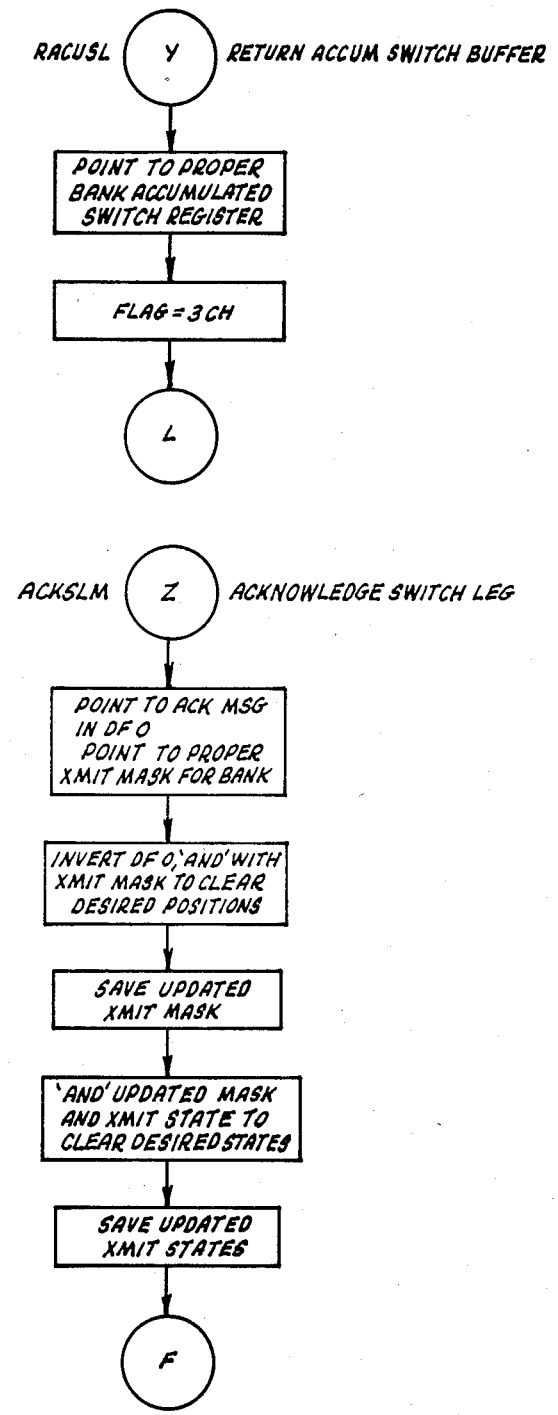
Figure 33:
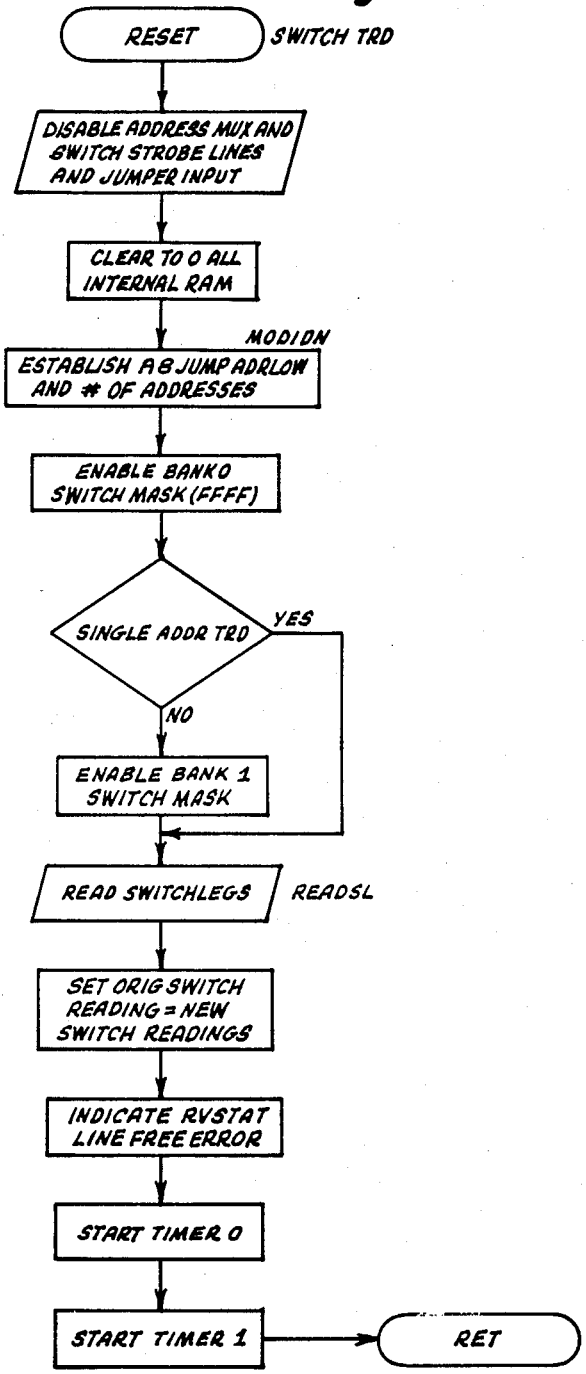

FIG. 13 describes the decoding used for new type commands. Beginning with Connector D, the received flag is shifted two positions to the right in order to skip over the FAFB bits. A test is then performed to determine if the adjusted flag is equal to a value of 0. If so, then a reset command has been issued and the procedure continues with the reset process as shown in FIG. 33. Otherwise, a test is made to determine if flag is equal to 1 indicating a desire to read data with an immediate or interactive transmission (continuing at Connector N of FIG. 14). If the flag is equal to a value of 2, then a command requiring data to be read and transmitted in a deferred method is indicated and control continues at Connector O of FIG. 14. A flag value of "5" will perform the set switch mask process at connector ZZ on FIG. 21. A flag value of "18" will perform the acknowledge answerback (secure) switch process at connector Z (FIG. 20). If it is not possible to decode a new type flag, then the procedure aborts connector B of FIG. 12.

Figure 15:
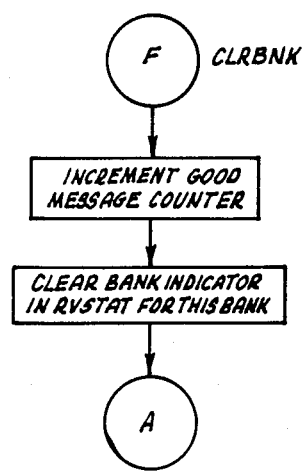

At connector F of FIG. 15 the good message counter is incremented to indicate the decoding of a proper command and the bank indicator corresponding to the command just decoded is cleared in RVSTAT. Control then continues at Connector A of FIG. 12 in order to process any information for the other bank.

Figure 16:
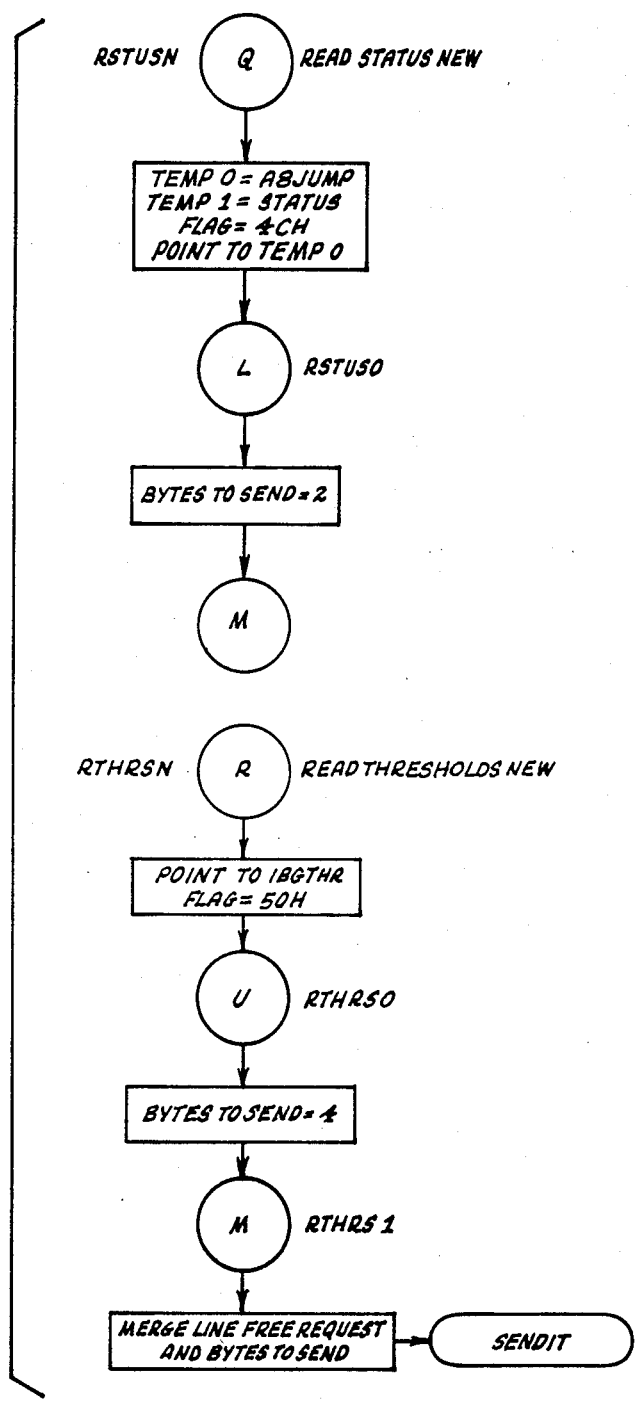

The read status in new format command is described in FIG. 16 at Connector Q. The TEMP1 register is set equal to the A9JUMP value containing address bit A8 and the jumper definition for the TRD. TEMP1 is equal to the STATUS register of the TRD. The flag register is then set to a value of 4CH anda pointer to TEMP0 is established. Continuing at Connector L, an indication is made that two bytes of data are to be transmitted and the process continues at Connector M.

Connector R describes the read threshold in new format process. The IBGTHR register is pointed to and the flag is set equal to a value of 50/H. Continuing through Connector U, four bytes of data are indicated to be sent. At Connector M, the previously determined line free requirement and the number of bytes to send are merged together. The process continues with the SENDIT routine described in FIG. 24.

Figure 14:
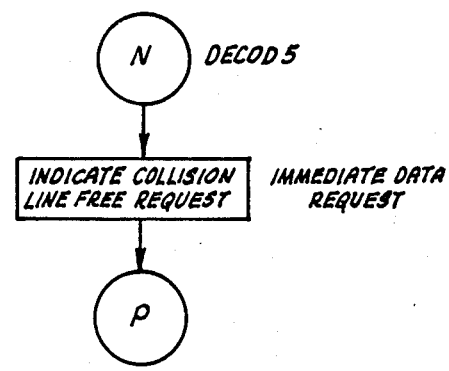
Figure 14:
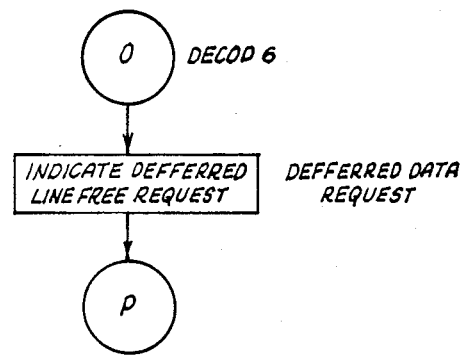
Figure 17:
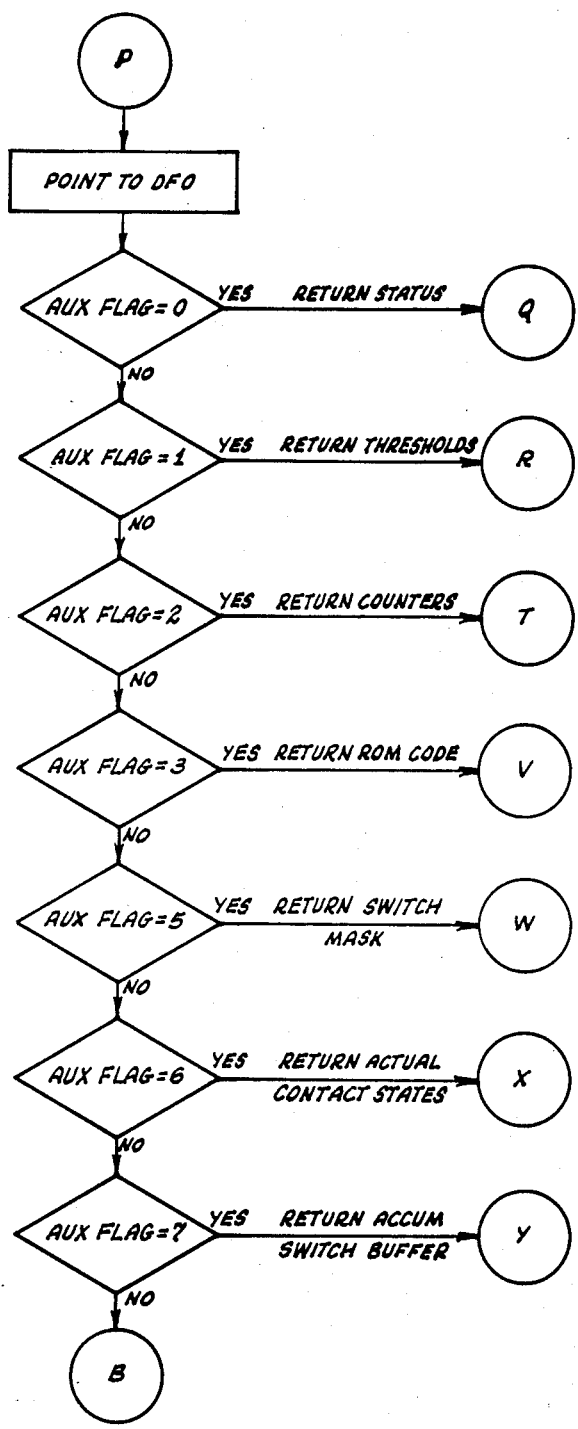

Connector N of FIG. 14 is entered whenever there is an immediate or interactive request for data. A collision line free requirement is indicated and control continues at Connector P (FIG. 17). Connector O is entered whenever there is a deferred request for data and a deferred line free requirement is indicated with control continuing at Connector P.

Connector P of FIG. 17 describes the decoding performed on the auxiliary flags for the read data request. Data Field DF0 is pointed to and a test is made of the auxiliary flag in that position to determine if it's equal to 0. If so, then a request for system status is indicated and control continues at Connector Q of FIG. 16. If the auxiliary flag is equal to 1, then receiver thresholds are being requested and control continues at Connector R of FIG. 16. An auxiliary flag value of 2 indicates a desire to return the data line counters (good or bad message counts) and control continues at Connector T of FIG. 18. An auxiliary flag value of 3 indicates a request for ROM code version handled at Connector V of FIG. 18. An auxiliary flag value of "5" will perform the return switch mask function at connector W of FIG. 19. An auxiliary flag value of "6" will perform the return actual switch contact state function at connector X of FIG. 19. An auxiliary flag value of "7" will perform the return accumulated switch buffer function at connector Y of FIG. 20.

Figure 18:
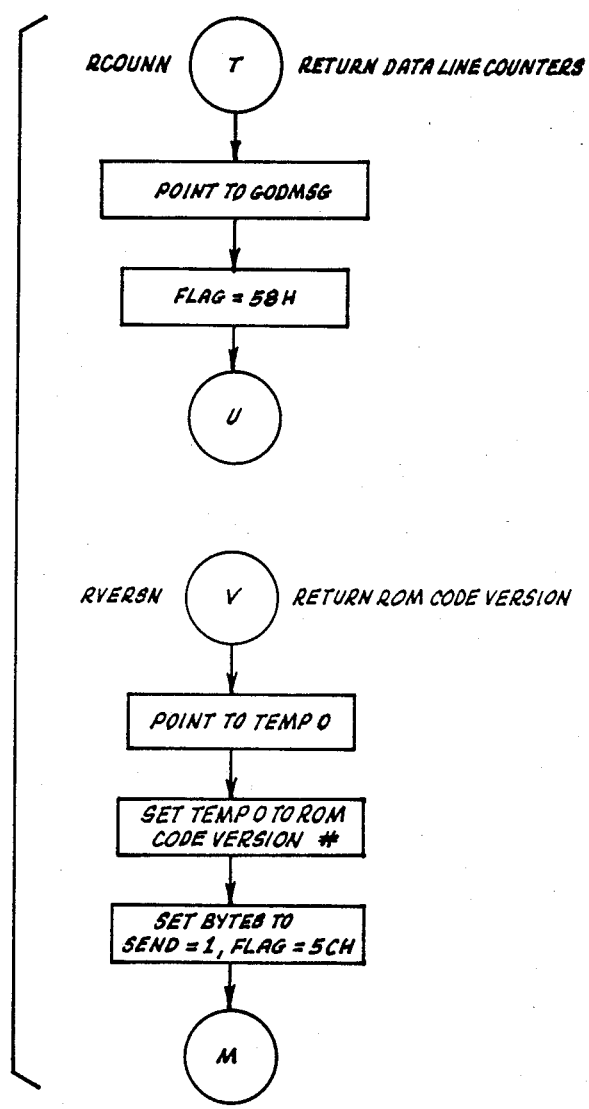

FIG. 18, Connector T describes the process for returning the data line counters. The GODMSG register is pointed to and the flag is set to a value of 58H with control continuing at Connector U of FIG. 16.

The return ROM code version request is handled at Connector V. A pointer to TEMP0 is established and TEMP0 is then set equal to the ROM code version number. One byte of data to be sent is indicated, and the flag is set to a value of 5CH. Control continues at Connector M of FIG. 16.

Figure 19:
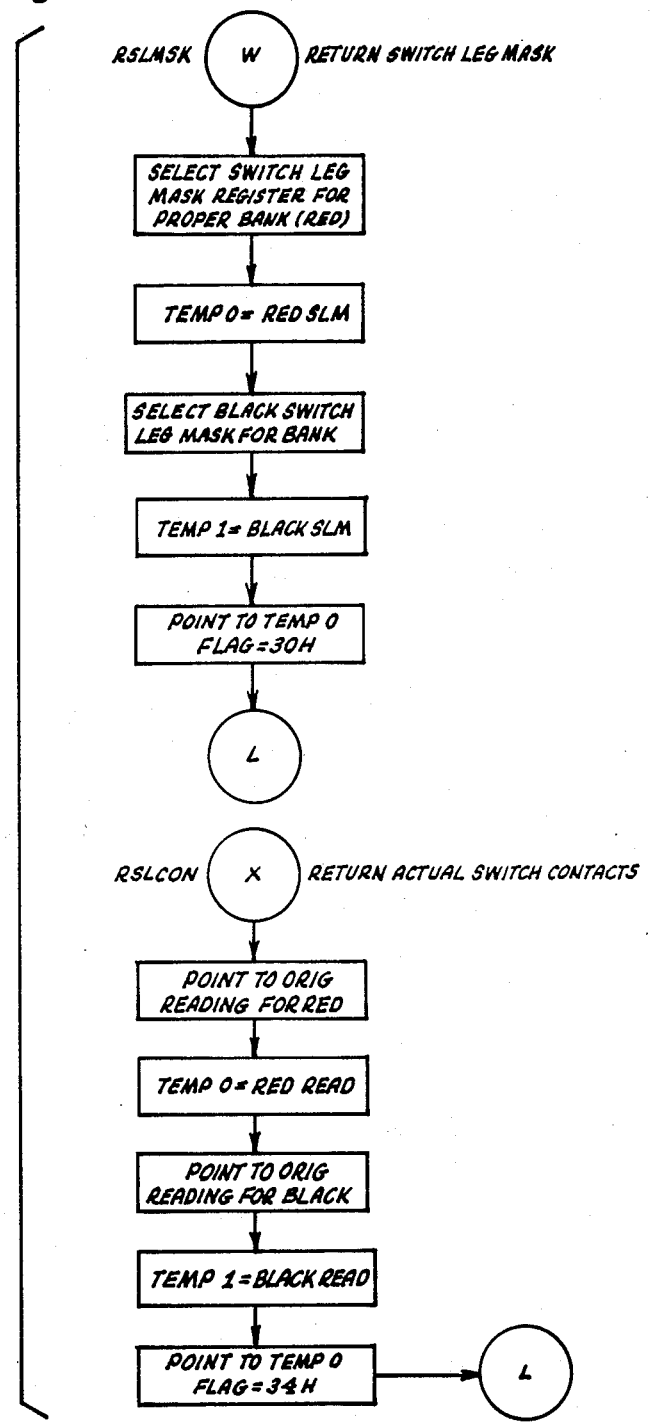

FIG. 19 lists the actions necessary to return a switchleg mask RSLMSK at Connector W. The red switchleg mask for the proper bank is selected and the TEMP0 register is set equal to that value. Next the black switchleg mask for the proper bank is selected and TEMP1 is set equal to that value. the value of 30H. Control continuesd at Connector L of FIG. 16.

Connector X (FIG. 19) is invoked in order to return the actual switch contacts RSLCON. The original reading for the red switchlegs is pointed to and TEMP0 is set equal to that value. Next, the original reading for the black switchlegs is pointed to and TEMP1 is set equal to that value. Finally, a pointer to TEMP0 is established, the flag is set equal to a value of 34H, and control continues at Connector L of FIG. 16.

The return accumulated switch buffers RACUSL procedure is described at Connector Y of FIG. 20. The accumulated switch register for the proper bank is pointed to and the flag is set equal to a value of 3CH with control continuing at Connector L of FIG. 16.

A command to acknowledge a secured switchleg transmission is handled at Connector Z of FIG. 20 (ACKSLM). The acknowledgement message contained in data field 0 is pointed to and the proper transmit mask corresponding to the desired bank is pointed to. Data field 0 is then inverted and ANDed with the transmit mask in order to clear the desired positions. This updated transmit mask is then saved. The updated mask is then ANDed with the transmit switch states in order to clear the desired states. This updated transmit switch states is then saved and the process continues at Connector F of FIG. 15.

Figure 21:
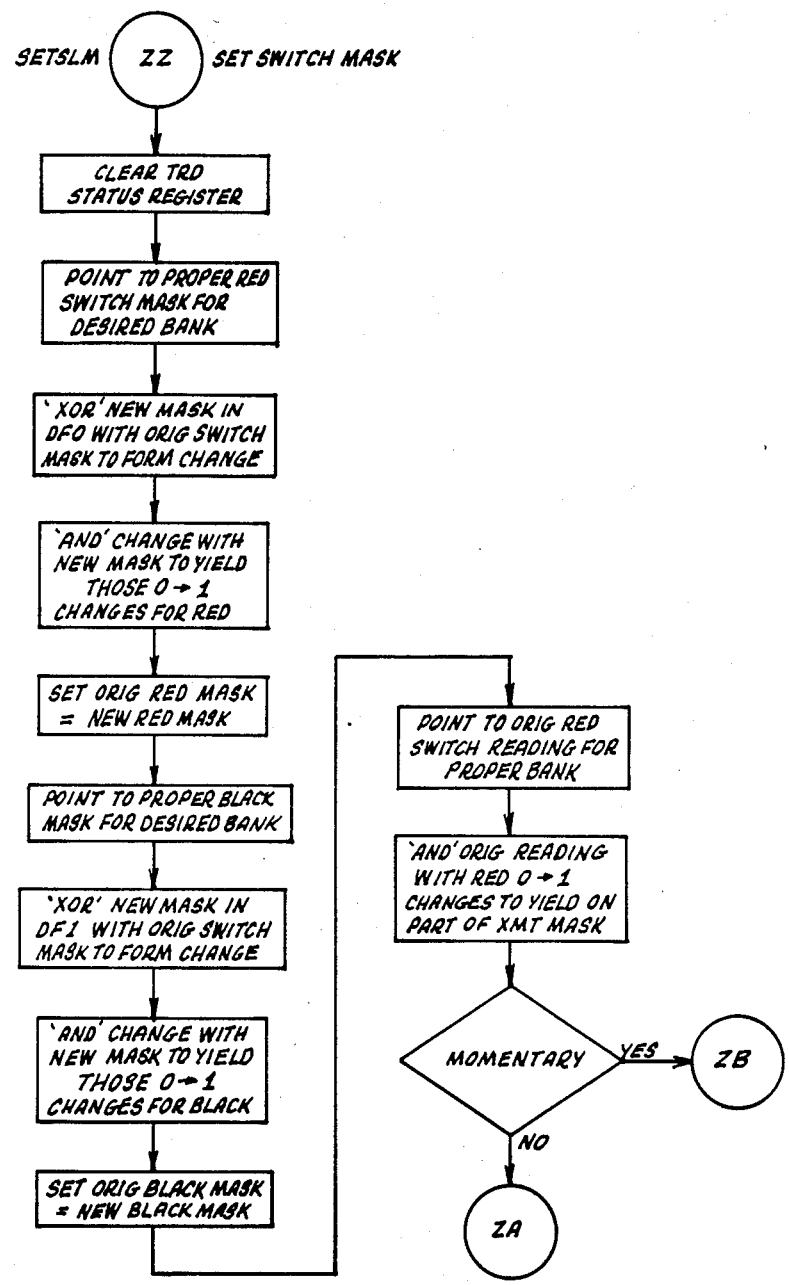

The set switchleg mask procedure is described in FIG. 21 beginning with the Connector ZZ. This process is invoked whenever a change to the current switchleg mask is desired and is responsible for updating the switchleg mask and generating any resultant switchleg transmission that might be caused by a disabled to enabled transition of a switchleg mask. The STATUS register for the TRD is cleared and a pointer to the proper red switch mask for the desired bank is established. The new mask contained in data field 0 of the receiver buffer is exclusively ORed with the original switch mask in order to form a change value. This change value is then ANDed with the new mask in order to yield those 0 to 1 (disabled to enabled) changes for the red or ON switch contacts. Next, the original red switch mask is set equal to the new red switch mask contained in data field 0 of the receiver buffer. The black switch mask for the desired bank is then pointed to. The new mask contained in data field 1 of the receiver buffer is then exclusively ORed with the original switch mask in order to form the change information. This information is then ANDed with the new mask in order to yield those 0 to 1 (disabled to enabled) changes for black. The original black switchleg mask is then set equal to the new black switchleg mask value contained in the receiver buffer and a pointer to the original red switch reading for the proper bank is established. By ANDing the original red switch reading with the red 0 to 1 changes the ON part of the transmit switch mask is determined. For momentary type switches control continues at Connector ZB of FIG. 23. Otherwise, for maintained switches control continues at Connector ZA of FIG. 22.

Figure 22:
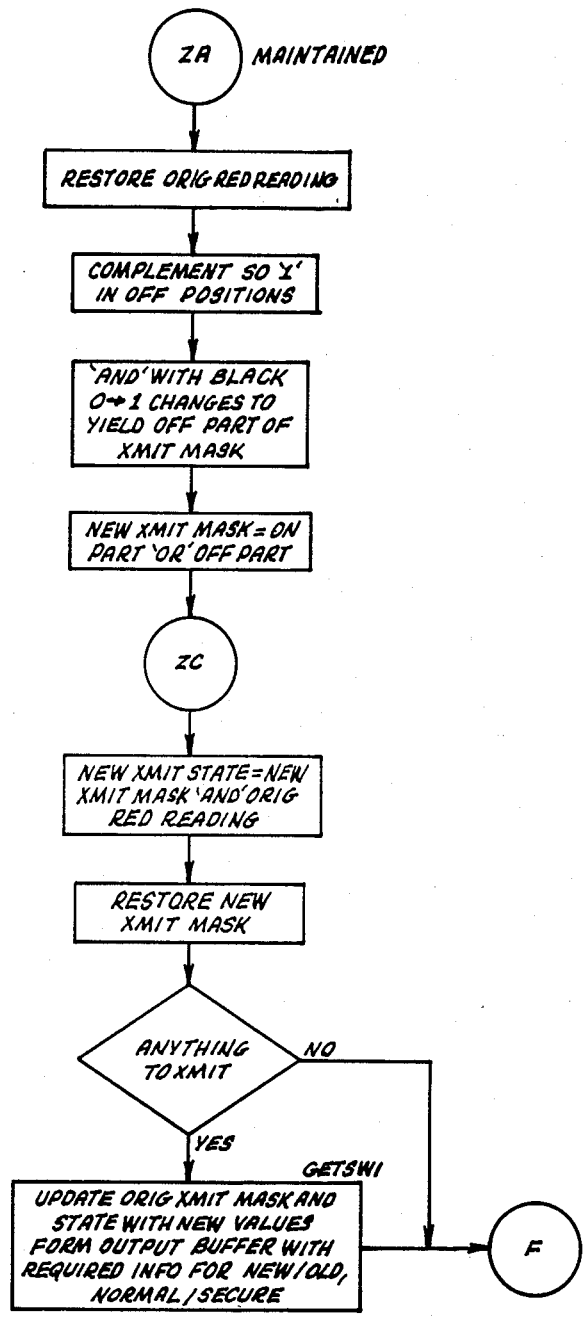

For maintained type switches, at FIG. 22 Connector ZA, the set switchleg mask process continues by restoring the original red switch reading. This reading is them complemented in order to have "1" values in OFF positions. This complemented value is then ANDed with the black 0 to 1 changes in order to yield the OFF portion of the transmit switch mask. The new transmit switch mask is then defined to be equal to the ON part ORed with the OFF part of the transmit switch mask with control continuing at Connector ZC (FIG. 22). The new transmit switch state is defined to be equal to the new transmit switch mask ANDed with the original red reading. The new transmit mask is then restored and a test is performed to determine if anything is available for transmission. (If the transmit mask equals to 0 then nothing is available for transmission.) If nothing is available, then the procedure continues at Connector F of FIG. 15. Otherwise, the original transmit switch mask and states are updated with the new values and the output buffer is formed with the required information for new or old and normal or secured type transmissions by the GETSW1 procedure described above. Upon completion of this, the process continues at Connector F of FIG. 15.

Figure 23:
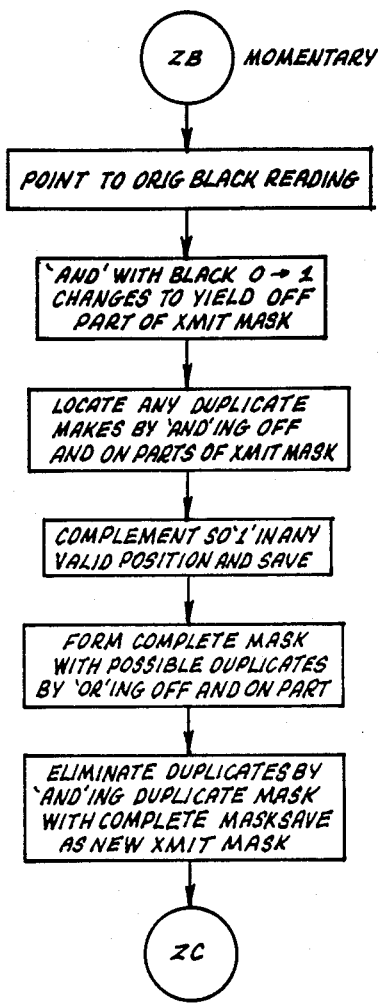

The required handling for momentary switches is described at Connector ZB of FIG. 23. The original black switchleg reading is pointed to and then ANDed together with the black 0 to 1 changes in order to yield the OFF portion of the transmit switch mask. Any duplicate "Make" conditions are then located by ANDing the OFF and ON parts of the transmit switch mask (any duplicate switch closure will show as a "1" after this process). The resultant value is then complemented so that there will be "1" values in any valid positions. The complemented value is then saved. The complete mask is formed by ORing together the OFF and ON part and then duplicate makes are eliminated by ANDing the duplicate mask with the complemented mask. The result is saved as the new transmit switch mask and control continues at Connector ZC of FIG. 22.

Figure 24:
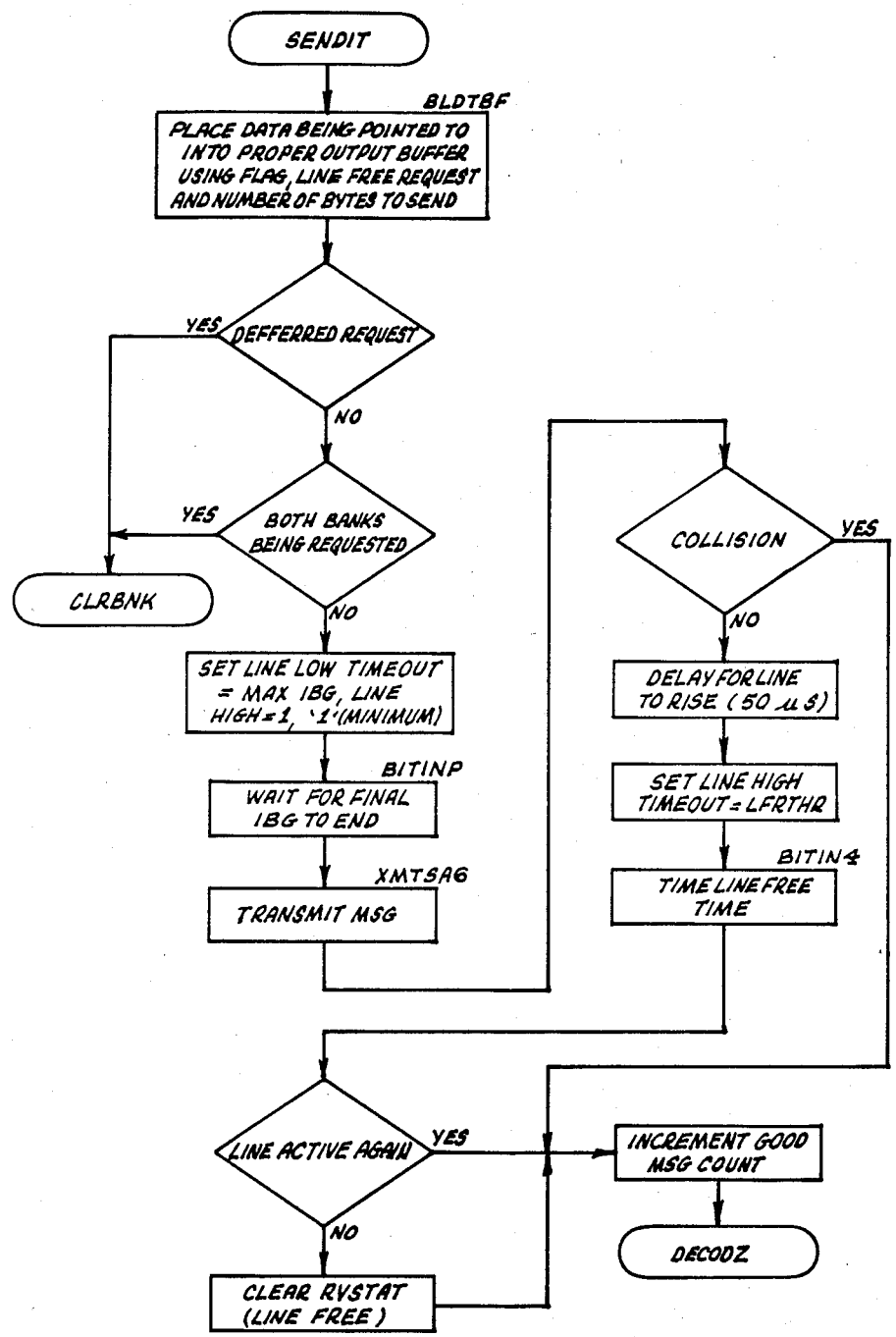

The SENDIT routine described in FIG. 24 is responsible for placing data required for transmission into the output buffers and then determining if immediate transmission requirements are needed. If SENDIT performs the actual transmission of a message in an interactive data transmission then it will test the line free requirements in order to clear out previously established receiver thresholds if the line goes free upon successful transmission of the data.

SENDIT places the data being pointed to into the proper output buffer using the flag, line free request, and number of bytes to send by invoking the BLDTBF routine. A test is then performed in order to determine if a deferred line free requirement is needed. If so, then the process CLRBNK is invoked, which is described in FIG. 15 at Connector F. Otherwise, if an immediate transmission is required, then a test is performed in order to determine if both banks are being requested. If so, then the immediate transmission of the first bank is postponed and the process continues with the CLRBNK routine. If only one bank of information is to be transmitted, then the line low timeout is set equal to the maximum interblock gap time and the line high timer is set to the minimum. The BITIMP routine is then invoked in order to wait for the final IBG of the interactive transmission message to complete; at which point the transmit process (similar to that disclosed in Miller '414) is invoked in order to transmit out the required data. If at any time during the transmission a collision is detected, then the process will continue as indicated on the diagram. Otherwise, a delay will be invoked in order to allow the line to go from its low impedance state (from the final IBG) to the high impedance state (50 microseconds). The line high timeout is then set equal to the line free threshold value and the process BITIN4 is invoked in order to determine if the line is active. If the line does not go active, then RVSTAT is cleared indicating a line free condition and the process continues as indicated. If the line did go active then the controlling device has reestablished control of the data line. Therefore, the receiver thresholds are not be cleared. The good message counter is incremented and the process continues at the DECOD2, FIG. 12 Connector B.

Figure 25:
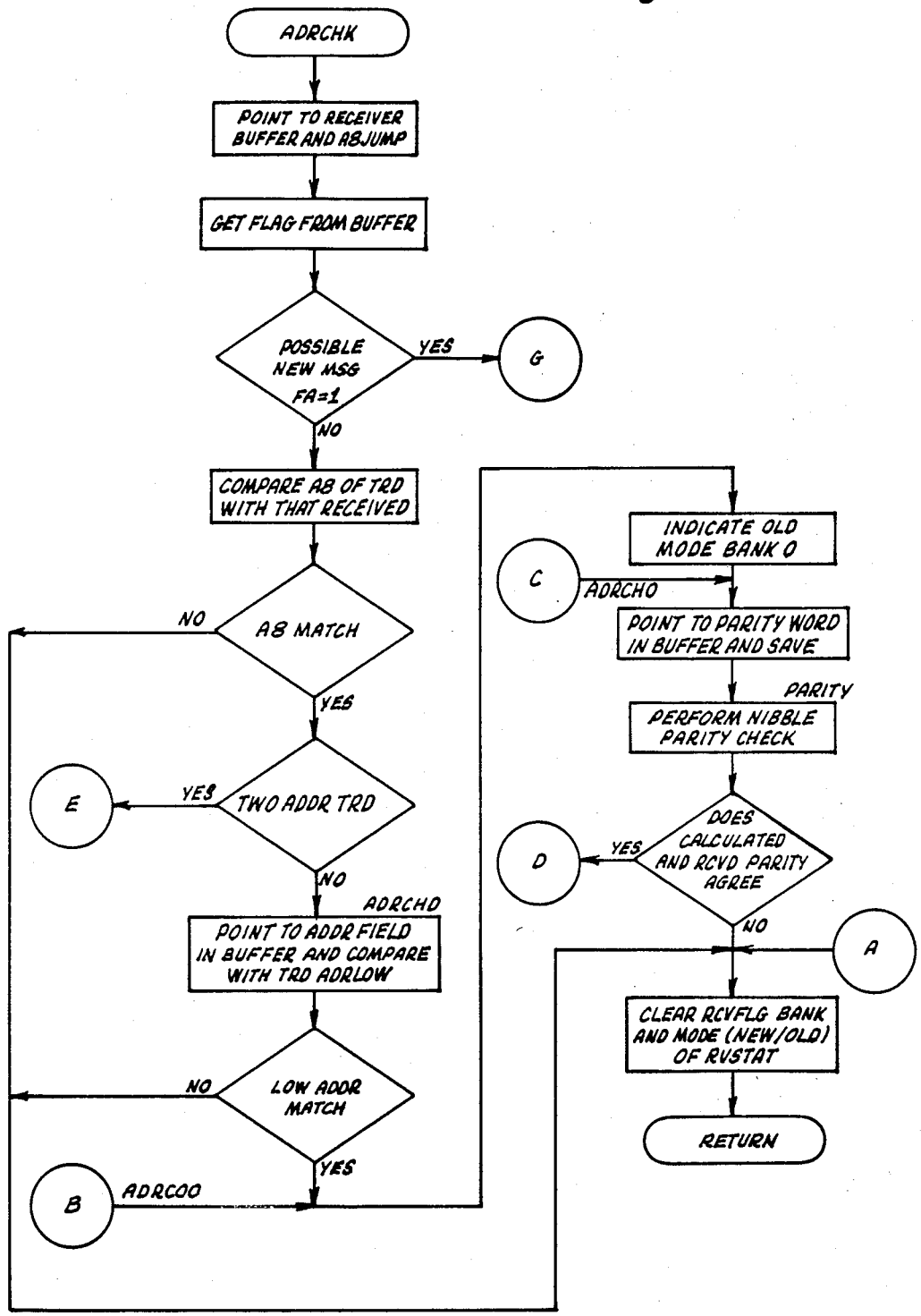

The address check routine ADRCHK is described in FIG. 25. It is responsible for verifying that a message in the receiver buffer is, in fact, addressed to the proper transceiver decoder. In addition, it will verify the correctness of the message by performing a nibble parity check or checksum verification of the message. If both the address and check portions of the message are correct, then three registers will be set to the proper values for the flag, data field 0, and data field 1.

The description of ADRCHK begins with FIG. 25. The proper receiver buffer is pointed to for the desired bank along with the A8JUMP register. The head of the buffer is fetched in order to get the flag. A test is then performed to determine if this is a possible new mode message by examining the FA bit (or bit DB1) of the flag to see if it is set. If so, then control continues at Connector G of FIG. 27. Otherwise, address bit A8 of the transceiver decoder is compared with that received. If there is not an A8 match, then continuing the Connector A, the RCVFLG bank and mode indication are cleared from RVSTAT and the address check routine returns. Otherwise, if there is an address A8 match, then a further test is performed to determine if it is a two address TRD. If so, then control continues at Connector E of FIG. 26. If the transceiver decoder is a single address device, then the address field is pointed to and compared with the TRD ADRLOW register by the ADRCHD procedure. If there is not a low address match, then the process aborts through Connector A (FIG. 25). Otherwise, continuing through Connector B (FIG. 25), an old mode bank 0 message is indicated. At Connector C (FIG. 25), the parity word in the receiver buffer is pointed to and saved for later comparison. Next a nibble parity check is performed by the PARITY routine and a test is performed to determine if the received and calculated parity agree. If not, then ADRCHD aborts and clears the receiver flag RCVFLG at at Connector A (FIG. 25). Otherwise, the process continues at Connector D of FIG. 26.

Figure 26:
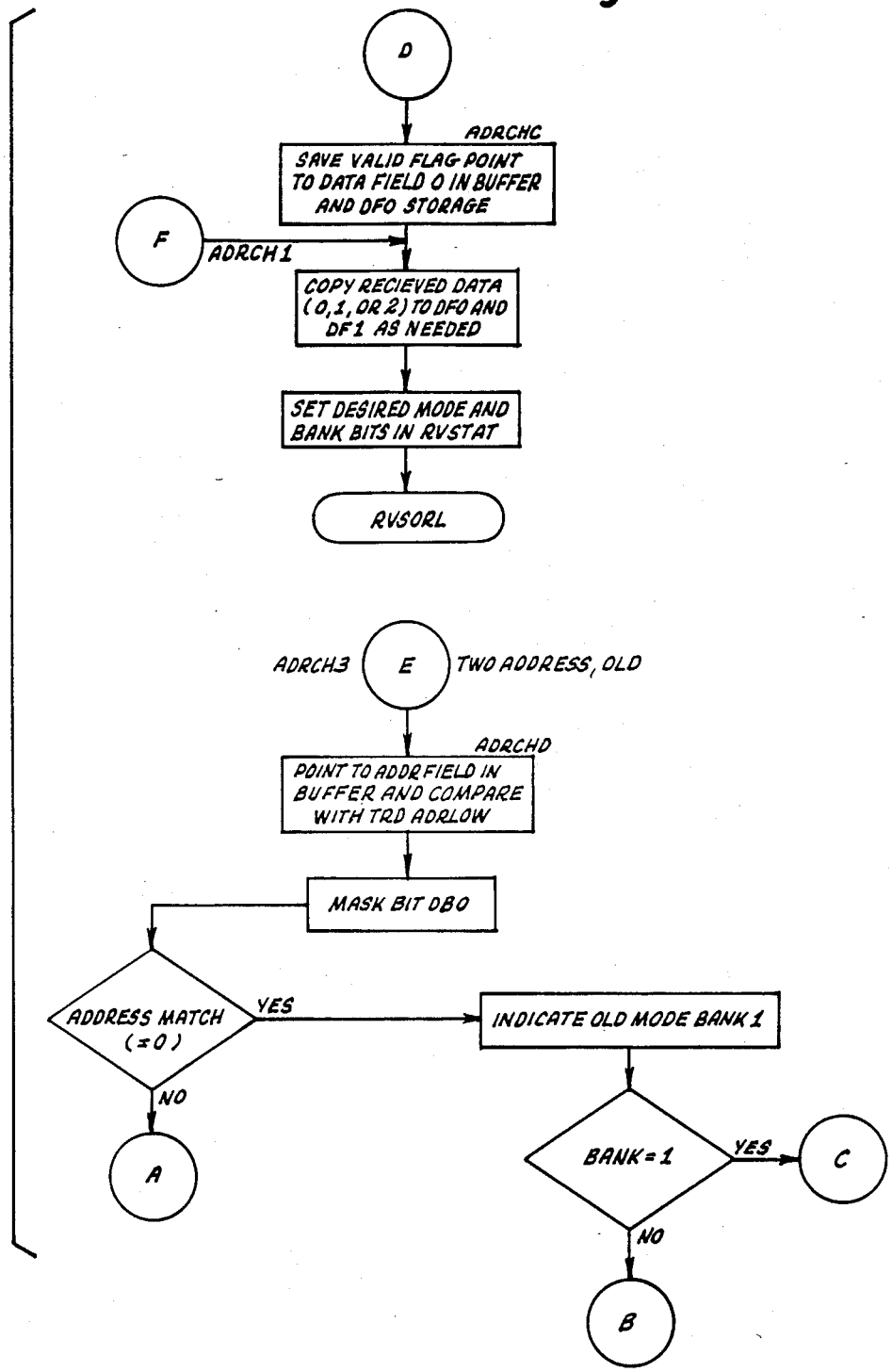

Continuing with the description of the ADRCHK process at Connector D of FIG. 26, the valid flag from the receiver buffer is saved and data field 0 in the buffer is pointed to along with DF0 storage by the ADRCHC procedure. At Connector F (FIG. 26), the copy routine is invoked in order to copy the received data (0, 1 or 2 bytes) from the receiver buffer to the DF0 and DF1 storage registers as required. The desired mode bits and bank bits are then set within RVSTAT, which completes the process.

Connector E (FIG. 26) is entered whenever an old mode two address TRD is to be verified. The process ADRCHD is invoked in order to point to the address field in the buffer and compare this with the TRD ADRLOW. Data bits DB0 of the result is then masked out. (This least significant bit determines the bank that the message was intended for in a two address TRD. DB0 equals to 0 corresponds to bank 0 and DB0 equals to 1 corresponds to bank 1.) If there is no address match then the process aborts at Connector A of FIG. 25. Otherwise, the old mode type message for bank 1 is indicated. A test is then performed to determine if the message in fact was to bank 1 by testing at DB0 of the received address field. If it was to bank 1, then the process continues at Connector C of FIG. 25. Otherwise, the process continues at Connector B of FIG. 25.

Figure 27:
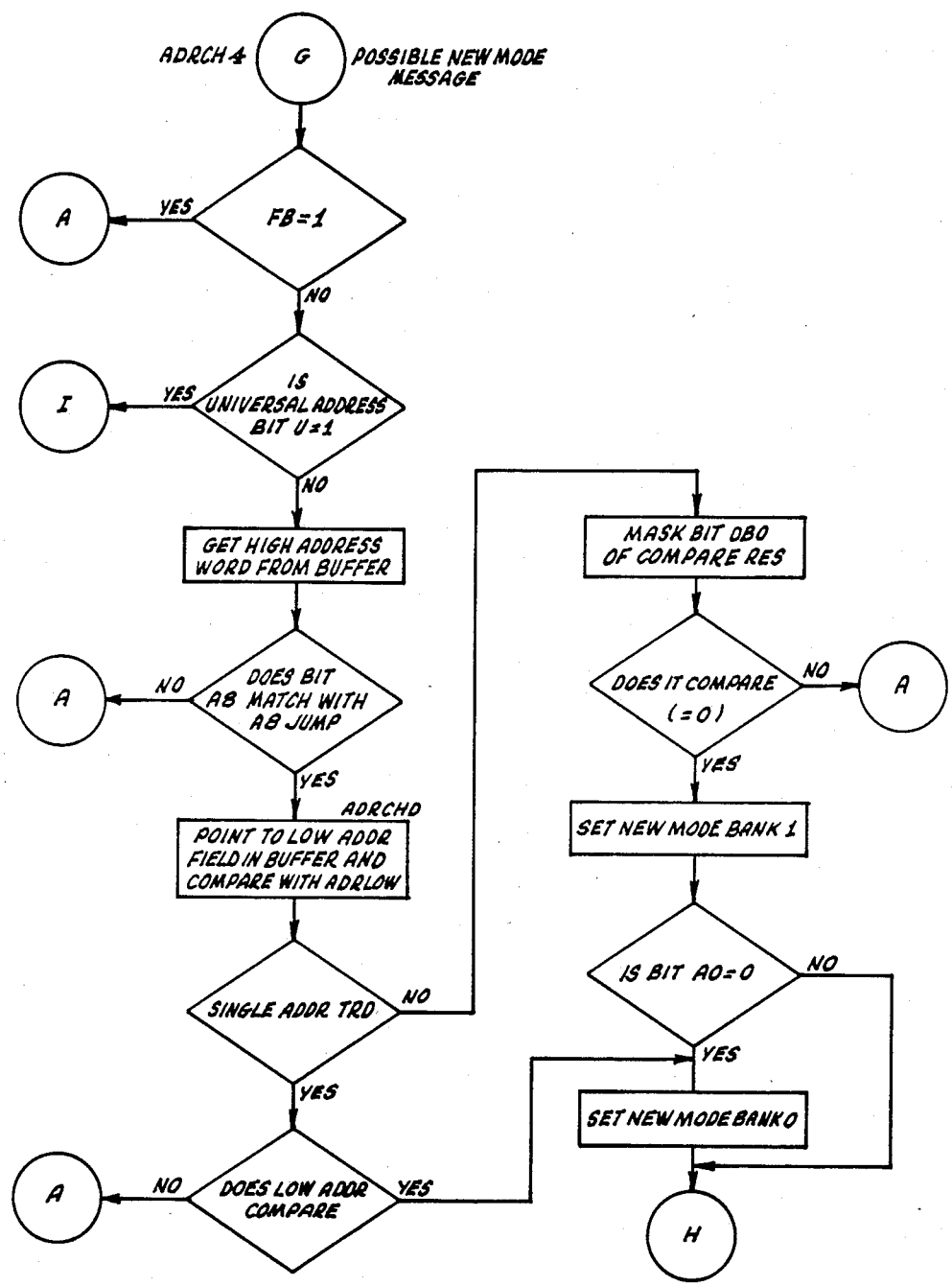

Connector G of FIG. 27 is entered whenever there is a possible new mode message. A test is performed on Bit FB (DB0 of the flag word) to determine if it is a 1. If so, then new mode addressing is not being used and the process aborts via Connector A of FIG. 25. Otherwise, a test is performed of the universal address bit U within the high address word. If U is equal to 1, then the process continues at Connector I of FIG. 29. Otherwise, universal addressing is not being used. The high address word is fetched from the buffer and it is compared with address bit A8 of the TRD. If there is not a match, then the process aborts at Connector A (FIG. 25). Otherwise, the low address field is pointed to in the buffer and compared to the ADRLOW storage register by the routine ADRCHD. A test is then performed to determine if the transceiver is a single address type. If so, then a test is made to determine if the low address received and that contained in the ADRLOW register compare. If not, the process aborts at Connector A. Otherwise, it continues as indicated on the diagram. If the device was a two address TRD, then Bit DB0 of the result of the comparison of ADRLOW and the received low address field is masked off. If the remaining address bits do not compare then the process aborts at Connector A. Otherwise, a new mode message for bank 1 is indicated and a test is performed on address bit A0 to see it it's set to 0 indicating a bank 0 message. If so, then the indication is changed to a new mode bank 0 message. Otherwise, it is left as a new mode bank 1 message and control continues at Connector H of FIG. 28.

Figure 28:
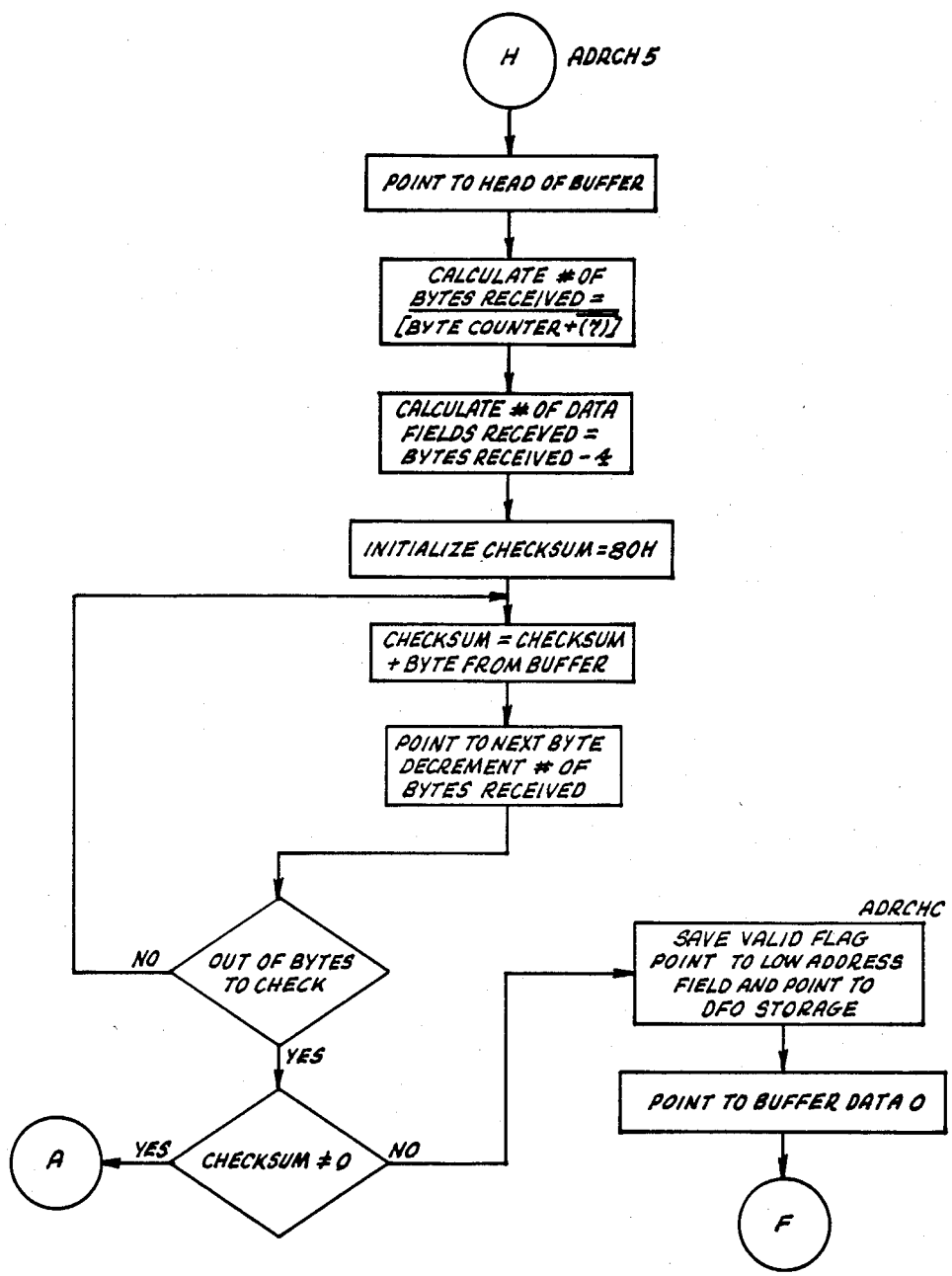

Continuing with the description of the new mode address checking at Connector H of FIG. 28, the head of the receiver buffer is pointed to. Following this, the number of bytes received is calculated by taking the 1's complement of the sum of the byte counter register plus the 1's complement of 7. The number of data fields received is calculated by subtracting 4 from the total number of bytes received. Next the checksum register is initialized to a value of 80H. A byte from the receiver buffer is then summed into the checksum register and the pointer to the receiver buffer is incremented to the next byte. The number of bytes received is decremented and a test is made to determine if there are any additional bytes to sum into the checksum. If so, then the process of summing the bytes incrmented the pointer, and decrementing the byte count continues until all bytes have been summed into the checksum. When all bytes have been checked, then a test is made to determine if the final checksum value is equal to 0. If not, then the process aborts at Connector A of FIG. 25. Otherwise, the head of the buffer is saved as a valid flag, the low address field is pointed to and data field storage register is pointed to by the process ADRCHC. Data field 0 is then pointed to in the receiver buffer by incrementing the buffer pointer and control continues at Connector F of FIG. 26.

Figure 29:
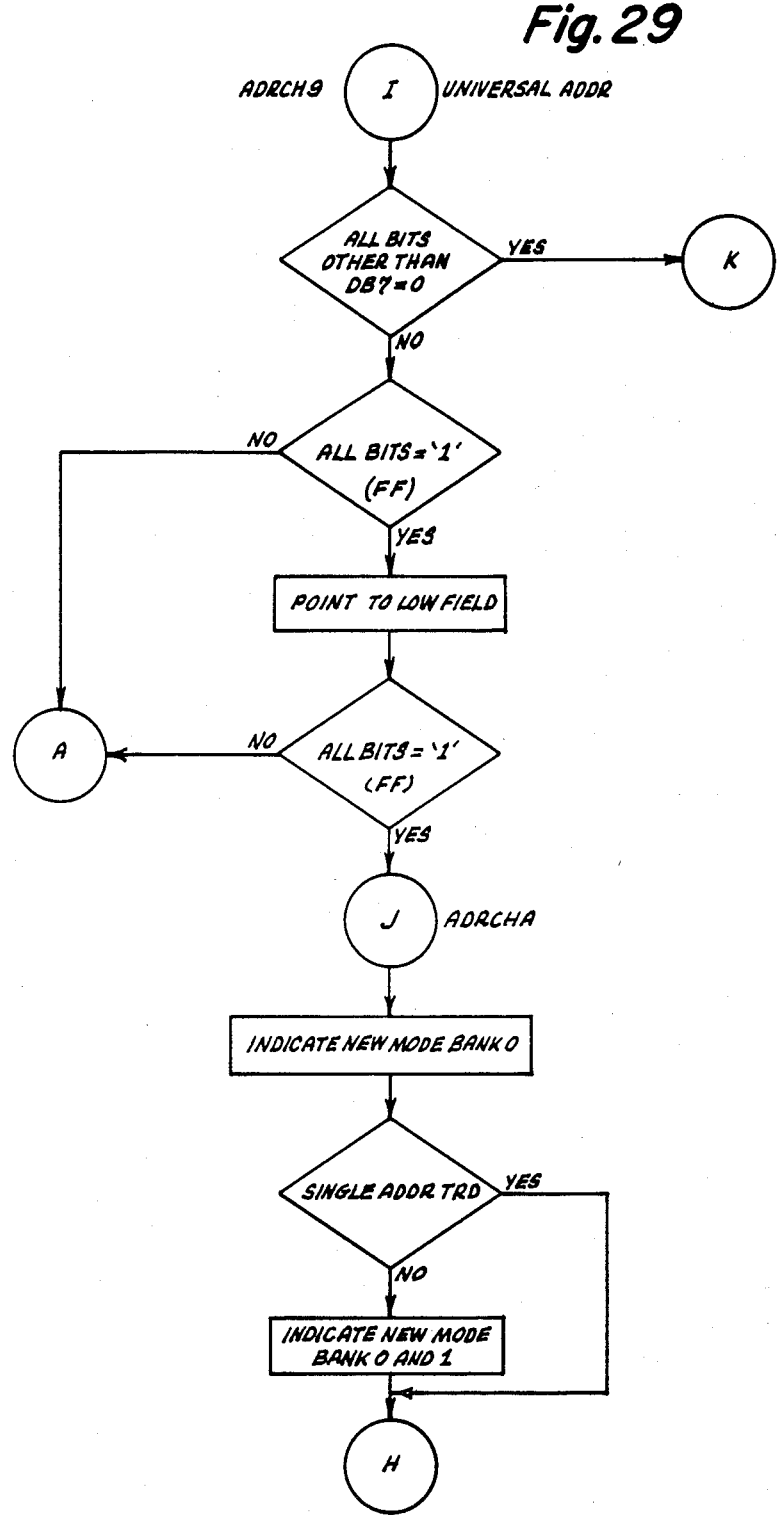

Whenever it is determined that universal addressing is being used within a new mode, Connector I of FIG. 29 is entered. A test is performed in order to determine if all bits other than the U (or DB7) bit of the high address field is equal to 0. If so, then a Family universal address is being used and control continues at Connector K of FIG. 30. Otherwise, a test is made of the high address field to determine if all of the bits are equal to 1. If not, and an improper address has been received then the routine aborts at Connector A of FIG. 25. Otherwise, the low address field is pointed to and a further test is performed to insure that it also is equal to all 1's. If not, the process aborts. Otherwise, it continues at Connector J (FIG. 29). A new mode transmission for bank 0 is indicated and a test is performed to determine if the device is a single address TRD. If so, then control continues at Connector H of FIG. 28. Otherwise, the indicator is updated to reflect a new mode transmission for both banks 0 and 1. (A universally addressed message transmitted to a two bank TRD will result in actions being performed on both banks of that transceiver decoder).

Figure 30:
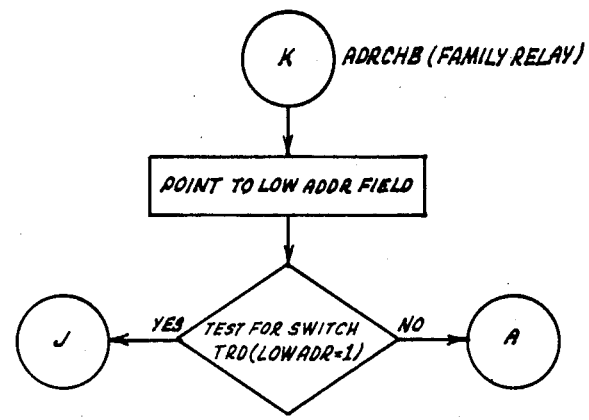

FIG. 30, connector K, describes the tests required to determine if a family address to a switch transceiver decoder (TRD) is being used. The low address field is pointed to and checked to see if it is equal to "1". If so, then the process continues at connector J of FIG. 29. Otherwise it continues at connector A of FIG. 25.

Figure 31:
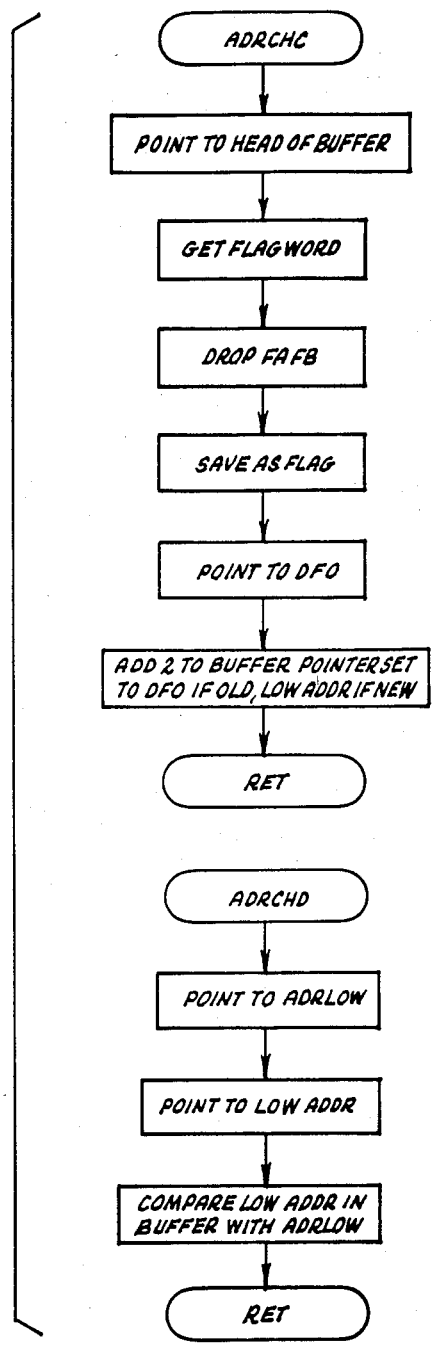

FIG. 31 describes the two subroutines required by the ADRCHK process. ADRCHC points to the head of the receiver buffer, gets the receive flag word, masks out the two least significant bits FAFB and saves the result as the flag. Next, DR0 storage register is pointed to. Finally a value of 2 is added to the receiver buffer pointer such that i will point to data field 0 if an old type message or the low address field if it is a new type message. This completes the subroutine which then returns. ADRCHD is used in order to point to the ADRLOW storage register of the transceiver decoder, point to the low address field by incrementing the receiver buffer pointer and to compare the low address in the buffer with the ADRLOW storage register. This completes the routine which then returns to the invoking procedure.

This completes the description of the Decoder Handler Module which provides a means of verifying the address of a message received; a means of distinguishing between one of two banks for a message received; a means of recognizing two formats of messages (old and new); a means of aborting the decode of a message if an invalid format is used; a means of decoding multiple flag words; a means of eliminating the response to old format commands by evaluating the presence or absence of a COMM jumper which can be Manufacturing installed; a means of allowing multiple number of data bytes to be input from the common data line; a means for decoding auxiliary flag commands for various types of devices which may or may not be jumper selectable; a means for indicating immediate or deferred response to requests for data transmission; a means of passing control of the data line from one device to the transceiver decoder in an immediate mode of transmission; a means of determining if the controlling device desires to regain control of the data line upon completion of an immediate transmission of data from the transceiver decoder; a means of deferring an immediate request for data if that request is to both banks simultaneously (as would be the case if a universal address command was used); a means for performing a modified checksum against the received message with an initial value of 80H in order to avoid the proper decoding of a message with all 0 or all 1 values (homogenous message) a means of performing a nibble parity check as required for the old format message; a means for providing the proper setup of the switchleg mask buffer; a means of generating a switchleg actuation message if the enabling of a previously disabled switchleg results in the detection of a switch contact closure; a means of reading the following TRD data registers: the switchleg mask register, the accumulated switchleg buffer, the actual switchleg contact closures, the transceiver status, the receiver threshold register, the data line counter register, and the ROM code version; a means of counting the number of properly decoded messages by incrementing a good message counter; a means of automatically clearing the status register of the transceiver decoder upon reception of a command to reestablish the switchleg mask; and a means of allowing the acknowledgement of secure or answer-back type switches.

Powerup Executive and Miscellaneous Modules

Switchleg processor 300, on Powerup, begins to execute its internal ROM memory code beginning with Address 0 (which corresponds to the PWRUP routine). The powerup routine is responsible for proper initialization of the microprocessor and associated external hardware and for placing a powerup-reset message into the transmitter output buffer for subsequent transmission over the common data line.

Figure 32:
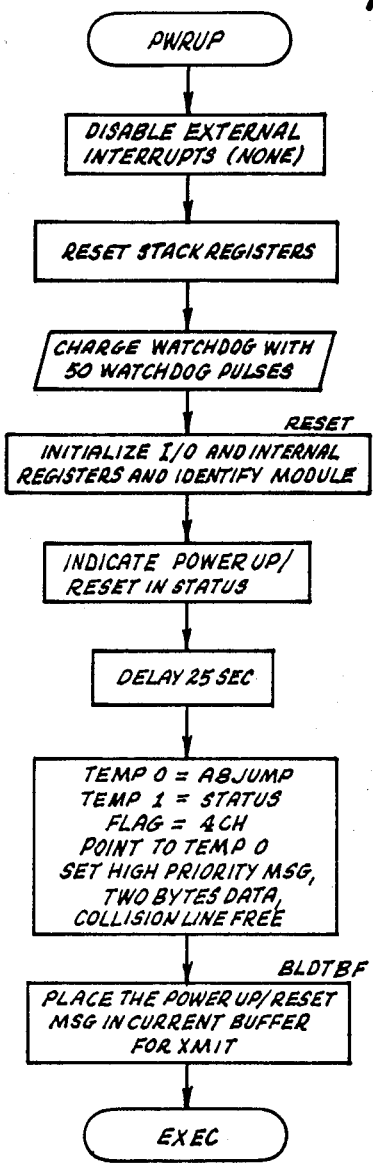

The powerup routine for the switchleg transceiver decoder is described in FIG. 32. The external interrupts are disabled since none exist for the switch transceiver decoder and the stack and registers are reset. Following this the watchdog is strobed with 50 watchdog pulses and the RESET procedure is invoked in order to initialize the I/O internal registers and identify the module. A powerup reset is indicated in the TRD status and a 25 second delay is invoked in order to allow the system to reach equilibrium. Following this, the powerup status message is placed into the output buffer. A flag value of 4CH is used.

FIG. 33 indicates the reset process used by the switch transceiver decoder. This process in addition to other tasks will input the current switchleg reading and place it into the data structures in such a manner as to avoid transmission of any switch closure that might be in a "Make" position on entry to the reset procedure. On entry to the RESET routine, the address multiplexer and switch strobes are disabled along with the jumper input. All internal RAM is then cleared to a 0 value. MODIDN is invoked in order to establish the address of the transceiver decoder (ADRLOW and A8JUMP) along with the flag indicating the number of the address to which the TRD will respond. The process continues as indicated in the figure. Bank 0 switchleg mask is set to all 1's in order to enable all switchlegs (this is done for both the black and red switch mask). A test is then made to determine if the device is a single address TRD. If not, then the Bank 1 switch masks will be enabled in a similar fashion. READSL is then invoked in order to read the current switch contact positions. The original switch readings are set equal to the new switch readings obtained by the READSL routine. Following this, RVSTAT is set equal to a line free error condition in order to require resynchronism of the receiver. Timer 0 is initialized and started (this is the 48 millisecond switch reading timer) followed by Timer 1 (this is the answerback or secured switch retransmission timer), completing the reset procedure which then returns to the supervisory function.

The executive is the main working procedure of the transceiver decoder. It is entered upon completion of the powerup procedure. Once the executive has been invoked, the only exit from the endless loop of the executive is via a reset (which would occur on powerup). However, it is possible for the activity controlled by the executive to be suspended for a brief interval of time in order to service the internal timer interrupt. It should be noted that the internal timer is set for a 6 millisecond internvval and is always active.

Figure 34:
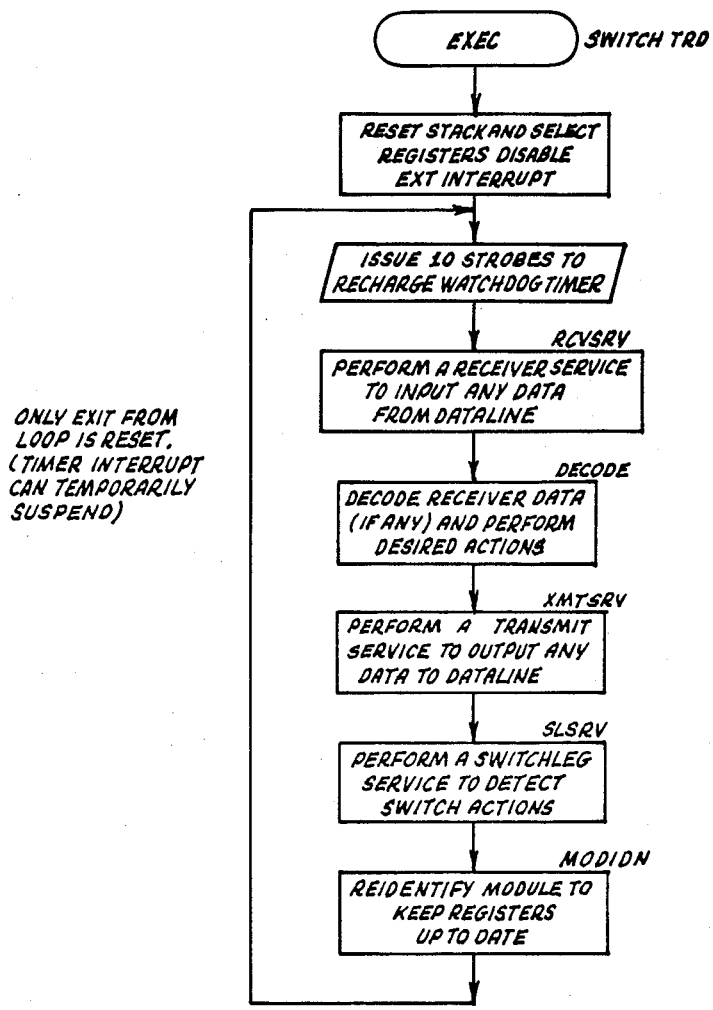

FIG. 34 describes the EXEC executive routine used by the relay transceiver. The stack is reset and the working set of registers selected. Following this, the watchdog timer is recharged by issuing 10 strobes to the appropriate hardware. At this point, a receiver service is performed in order to input any possible data from the data line by involing the RCVSRV routine (similar to that disclosed in Miller '414). On completion of this task, the DECODE process is invoked in order to decode any received data and to perform the desired actions. Following the decode of data a transmitter service is performed in order to output any possible data to the data line by calling the routine XMTSRV (similar to that disclosed in Miller '414). Next a switchleg service is invoked in order to determine switch actions. Finally, the module is reidentified in order to keep the transceiver address and jumper registers set to the most current position (it is possible to change the jumper or address configuration at any time). On completion Of the MODIDN process, the executive continues to recharge the watchdog timer and invoke the 5 main subroutines until such time that the microprocessor is reset due to a powerup, or watchdog.

Figure 35:
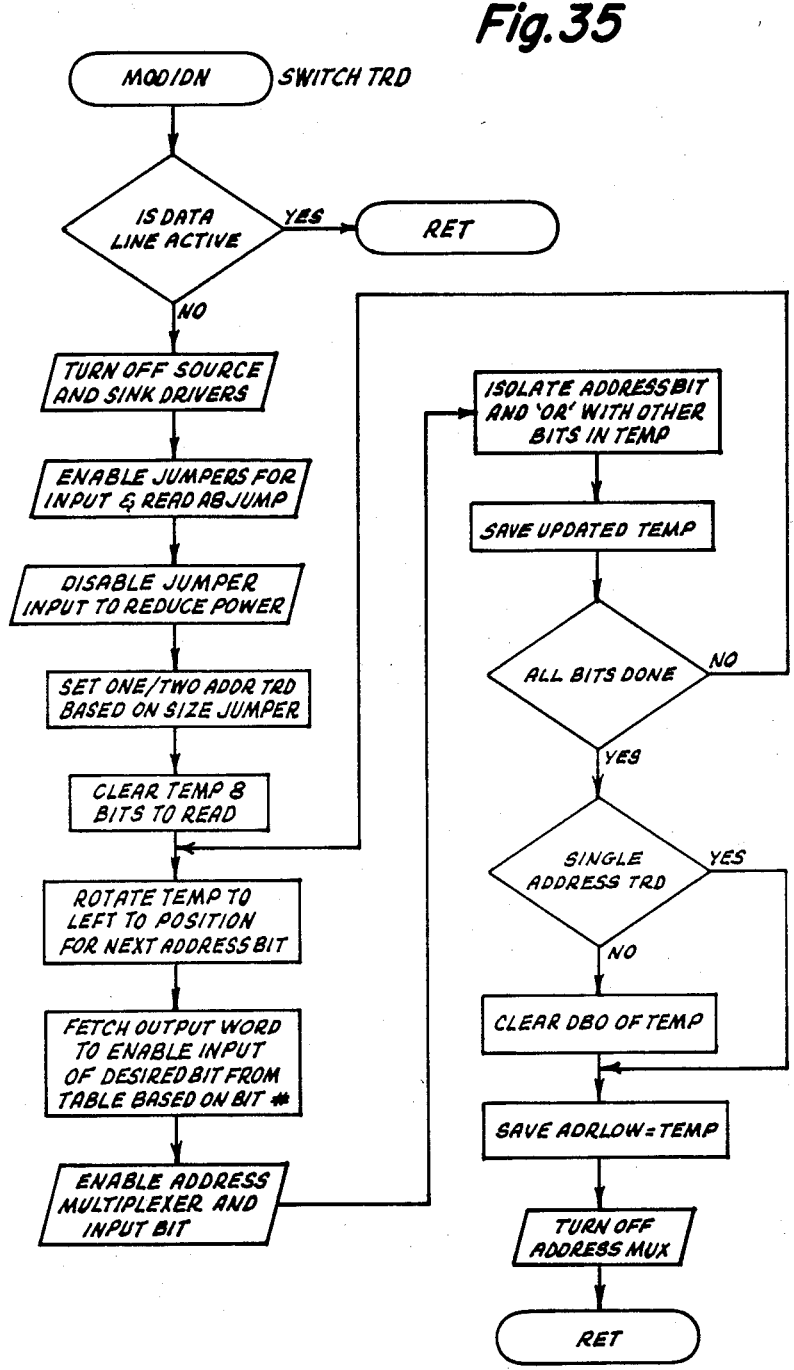

FIG. 35 describes the module identification routine used by the switch TRD. Since each transceiver decoder has a user selectable address to which it will respond as well as user and manufacturing installed jumpers which configure the method in which the transceiver decoder operates, the module identification routine is necessary in order to input the desired address and jumper configuration for subsequent later action and processing by the TRD. On entry to the MODIDN procedure, a test is performed to determine if the data line is active. If so, then the MODIDN process aborts as indicated. (It would not be desirable to reidentify the module due to the lengthy process involved if the data line was active.) If, on the other hand, no current data line activity was indicated, then the jumper hardware would be enabled for input and the A8JUMP register would be set to the value obtained by inputting the jumper configuration. The jumper input hardware is then disabled in order to reduce power consumption and a flag is set indicating a one or two address TRD based on the configuration of the size jumper. A temporary register is then established and cleared and an indication is made to input 8 bits of address data. Beginning with the loop on FIG. 35, the temporary register is rotated one bit position to the left in order to position its contents for the next address bit to be input. Following this an output word is fetched from a table of values based on the current bit number. The address multiplexer hardware is then enabled and a single bit of address data is input. This address bit is isolated and "ORed" with the bits in the temporary register. The updated temporary is then saved and a test is performed to determine if all bits have been input. This procedure of rotating the temporary, selecting an output word to enable the proper address multiplexer, inputting the bit and merging it with a temporary continues until such time that all bits have been input. Once all addres bits are in, a test is made to determine if the device is a single address TRD. If not, then bit DB0 of the temporary is cleared. (A two address device will respond to two addresses. The even address, i.e., when DB0 equals 0 corresponds to Bank 0; the odd address when DB1 equals 1 corresponds to Bank 1.) On the other hand, if the device was a single address TRD, then DB0 would not be altered and the resulting address could be either even or odd. ADRLOW is then set equal to the 8 least significant address bits contained in the temporary and then the address multiplex hardware is turned off. This completes the module identification process which then returns to the invoking utility.

As discussed above, the transceiver decoder has a continuously running internal 6 millisecond timer which is used to sequence desired actions. This timer is an internal programmable device which generates a timer interrupt whenever a programmed register has been incremented to a 0 value. This timer runs continuously and is disabled only when being serviced or updated.

Figure 36:
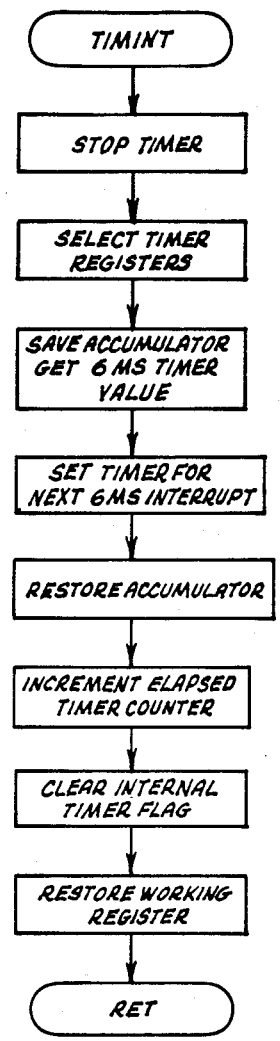
Figure 37:
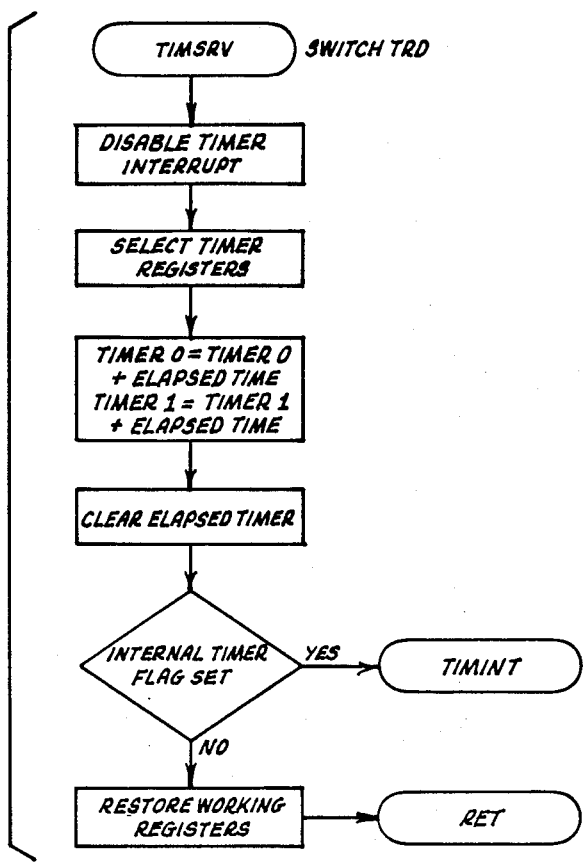

FIG. 36 describes the timer interrupt service routine TIMINT. The purpose of this routine is to service a timer interrupt which occurs every 6 milliseconds and to increment by 1 an elapsed timer counter. On detection of a timer interrupt, the timer is stopped and the timer registers are selected (this is Register Set 1 of the 8049 microprocessor, constituting the presently preferred embodiment of switch processor 300). The current accumulator value is saved in order to free the accumulator for other usages and the six (6) millisecond timer value is fetched. Following this, the timer is initialized for the next 5 millisecond interrupt and the accumulator is restored to its value on entry to the TIMINT procedure. The elapsed timer counter is then incremented by 1 and the internal hardware timer flag is cleared in case it remains set. Upon exit from the timer interrupt service procedure, the currently active working register bank is stored (this is the standard register bank or register bank 0).

The elapsed timer is continuously updated by the 6 millisecond timer interrupts. Two additional timers can be driven off of this elapsed time counter in such a way that they may be maintained current by summing in the elapsed time counts. This is the responsibility of the TIMSRV procedure described in FIG. 37. On entry to the TIMSRV process the timer interrupt is disabled and the bank of timer registers are selected. Timer 0 is then set equal to the initial value of timer 0 plus the elapsed timer counter. Timer 1 is then set equal to the initial value of timer 1 plus the elapsed timer counter. The elapsed timer counter is then cleared and a test is made of the internal hardware timer flag to determine if it was set. If so, an immediate branch is taken to the TIMINT procedure (the internal timer flag would be set if a timer interrupt occurred coincidentially with the entry to the TIMSRV process). If the timer interrupt flag was not set, then the working register bank would be restored and the procedure would complete and return to the invoking process. It should be noted that the TIMSRV process is asynchronous of the timer interrupts and could be entered at any time. A maximum delay of up 256 of the 6 millisecond timer counts could expire before losing accuracy in the timer 0 counter and timer counter.

Figure 38:
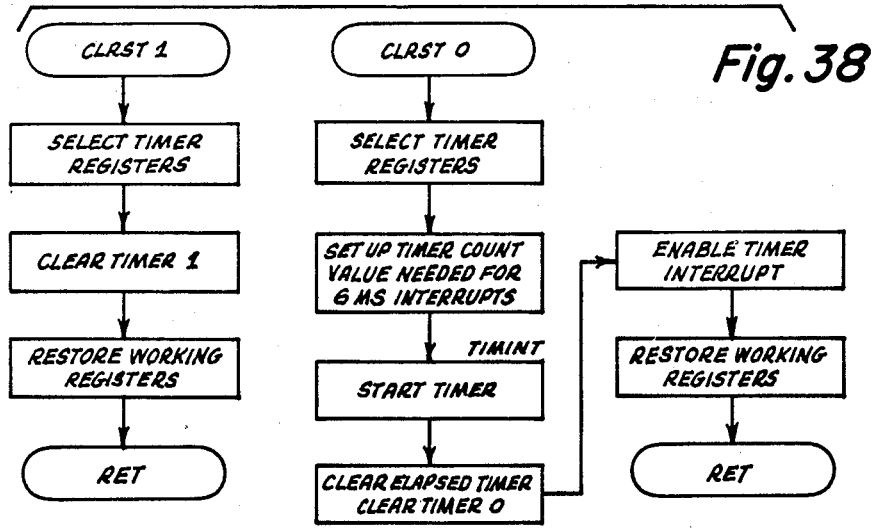

A process exists, described in FIG. 38, called CLRST0 for initializing and starting the timer 0 counter. The timer bank of registers is selected and the counts needed for the 6 millisecond interrupt duration are initialized. Following this, the timer is started by calling the TIMINT process. Next the elapsed timer and timer 0 are both cleared and set equal to 0. Finally, the timer interrupt is enabled and on exit from the routine the working bank of registers is restored.

FIG. 38 also indicates an additional routine present in the switch TRD called CLRST1 or Clear and Start Timer 1. The timer bank of registers is selected and timer 1 counter is set equal to 0. On exit from the CLRST1 process, the original bank of working registers is restored. (In the switch transceiver timer 0 is utilized as the 48 millisecond switch reading internval timers while timer 1 is utilized as the 1 second answer-back acknowledge timer as described in the switchleg handler module.)

The Powerup routine provides for the following: a means of generating a Powerup/Status message for subsequent transmission to a monitoring or controlling device; a means of invoking a reset procedure to initialize I/O devices and internal registers; a means of initializing the watchdog reset hardware; a means of initializing the machine to a known internal state.

The executive provides for: a means of periodically strobing a watchdog timer in order to indicate normal operation; a means of resetting the stack and working register bank in order to counteract any possible incorrect action due to spurious signals which may have altered the machine state; and a means of providing the functionality of the transceiver decoder by executing an executive loop of the desired functions forever.

The reset process provides for: a means of initializing I/O to a known condition; a means of initializing all desired memory registers to 0; a means of causing the receiver to resynchronize on a maximum line free timeout; a means of clearing the good and bad message counter to 0 values; a means of clearing the accumulated switchleg buffer; a means of reading any current swtich contact closures and establishing internal registers in such a way that any switches that are in the "make" condition will not cause subsequent transmission over the data line due to the reset procedure being invoked; a means of enabling all switchleg mask positions; a means of starting and clearing the proper timer counters; and a means of halting any current actions that might be pending in the transceiver decoder (such as messages awaiting decoding in the receiver buffer).

The timer routines provide for: a means of establishing a periodic 6 millisecond internval timer; a means for counting the timer interrupts and retaining a sum of the number of times the interrupt has occurred in an 8 bit elapsed timer counter; a means of providing one or more counters to which the elapsed time counter is added in order to provide for long intervals to be timed; a means of clearing to 0 and restarting one or more timer counters; and a means of deferring until a convenient time the servicing of the elapsed time counter.

The module identifier provides for: a means of inputting a set of 8 user or manufacturing installed jumpers to dynamically or statically configure the transceiver decoder; a means of operating a multiplexer circuit in order to allow the inputting of 8 user selectable address lines; a means of identifying via a flag a one or two address transceiver decoder; a means of disabling the jumper input hardware in order to reduce power consumption; a means of detecting and avoiding a conflict with the operation of the address multiplexer circuit and other external hardware; and a means of allowing the address inputs or mode selector jumpers to be dynamically varied by the user and detected and acted upon the transceiver decoder.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

ENHANCED TRD SWITCH MODULE ROM CODE - VER I.E - GEC PROPRIETARY
ALL DATA VALUES ARE IN HEXADECIMAL FORMAT

| ADDRESS | DATA | ADDRESS | DATA |
|---|---|---|---|
| 0000 | 15 | 0001 | 27 |
| 0002 | D7 | 0003 | BC |
| 0004 | 32 | 0005 | E4 |
| 0006 | 0C | 0007 | D5 |
| 0008 | 65 | 0009 | 2F |
| 000A | 62 | 000B | 55 |
| 000C | 2F | 000D | 1E |
| 000E | 16 | 000F | 10 |
| 0010 | 93 | 0011 | 35 |
| 0012 | D5 | 0013 | FD |
| 0014 | 6E | 0015 | AD |
| 0016 | FC | 0017 | 6E |
| 0018 | AC | 0019 | BE |
| 001A | 00 | 001B | 25 |
| 001C | 16 | 001D | 07 |
| 001E | 93 | 001F | F4 |
| 0020 | E6 | 0021 | F1 |
| 0022 | D2 | 0023 | 8C |
| 0024 | FB | 0025 | 53 |
| 0026 | 8F | 0027 | A1 |
| 0028 | B9 | 0029 | 59 |
| 002A | B6 | 002B | 2E |
| 002C | B9 | 002D | 61 |
| 002E | FA | 002F | 12 |
| 0030 | 32 | 0031 | 19 |
| 0032 | FB | 0033 | 47 |
| 0034 | 53 | 0035 | 07 |
| 0036 | AD | 0037 | 14 |
| 0038 | D7 | 0039 | B9 |
| 003A | 57 | 003B | B6 |
| 003C | 3F | 003D | B9 |
| 003E | 5F | 003F | B8 |
| 0040 | 51 | 0041 | FA |
| 0042 | 12 | 0043 | 48 |
| 0044 | 23 | 0045 | 02 |
| 0046 | 04 | 0047 | 4B |
| 0048 | F0 | 0049 | 53 |
| 004A | 01 | 004B | AF |
| 004C | FA | 004D | 53 |
| 004E | FC | 004F | 4F |
| 0050 | A1 | 0051 | 19 |
| 0052 | FA | 0053 | 12 |
| 0054 | 5A | 0055 | F0 |
| 0056 | 53 | 0057 | 01 |
| 0058 | A1 | 0059 | 19 |
| 005A | C8 | 005B | B6 |
| 005C | 62 | 005D | F0 |
| 005E | 43 | 005F | 01 |
| 0060 | 04 | 0061 | 63 |
| 0062 | F0 | 0063 | A1 |
| 0064 | FA | 0065 | 12 |
| 0066 | 6C | 0067 | FD |
| 0068 | 69 | 0069 | 17 |
| 006A | 04 | 006B | 6F |
| 006C | F9 | 006D | 03 |
| 006E | 03 | 006F | A8 |
| 0070 | A9 | 0071 | FA |
| 0072 | 12 | 0073 | 8D |
| 0074 | FD | 0075 | 03 |
| 0076 | 03 | 0077 | AE |
| 0078 | 23 | 0079 | 80 |
| 007A | C8 | 007B | 60 |
| 007C | EE | 007D | 7A |
| 007E | 37 | 007F | 17 |
| 0080 | A1 | 0081 | F8 |
| 0082 | 37 | 0083 | 17 |
| 0084 | 69 | 0085 | 17 |
| 0086 | B8 | 0087 | 52 |
| 0088 | B6 | 0089 | 8B |
| 008A | 18 | 008B | A0 |
| 008C | 83 | 008D | 14 |
| 008E | 92 | 008F | FF |
| 0090 | 04 | 0091 | 80 |
| 0092 | BF | 0093 | 00 |
| 0094 | BE | 0095 | 04 |
| 0096 | C8 | 0097 | F0 |
| 0098 | 47 | 0099 | 14 |
| 009A | A1 | 009B | F0 |
| 009C | 14 | 009D | A1 |
| 009E | EE | 009F | 96 |
| 00A0 | 83 | 00A1 | 53 |
| 00A2 | 0F | 00A3 | 03 |
| 00A4 | AB | 00A5 | A3 |
| 00A6 | 2F | 00A7 | E7 |
| 00A8 | 4F | 00A9 | 2F |
| 00AA | 83 | 00AB | 00 |
| 00AC | 01 | 00AD | 01 |
| 00AE | 00 | 00AF | 01 |
| 00B0 | 00 | 00B1 | 00 |
| 00B2 | 01 | 00B3 | 01 |
| 00B4 | 00 | 00B5 | 00 |
| 00B6 | 01 | 00B7 | 00 |

-continued

ENHANCED TRD SWITCH MODULE ROM CODE - VER
I.E - GEC PROPRIETARY
ALL DATA VALUES ARE IN HEXADECIMAL FORMAT

| ADDRESS | DATA | ADDRESS | DATA |
|---|---|---|---|
| 00B8 | 01 | 00B9 | 01 |
| 00BA | 00 | 00BB | F0 |
| 00BC | C6 | 00BD | C8 |
| 00BE | 37 | 00BF | 17 |
| 00C0 | 6A | 00C1 | A0 |
| 00C2 | 18 | 00C3 | F0 |
| 00C4 | 37 | 00C5 | 7B |
| 00C6 | A0 | 00C7 | 83 |
| 00C8 | 6A | 00C9 | A7 |
| 00CA | 04 | 00CB | C1 |
| 00CC | 97 | 00CD | F0 |
| 00CE | 67 | 00CF | AB |
| 00D0 | A0 | 00D1 | C8 |
| 00D2 | F0 | 00D3 | 67 |
| 00D4 | AA | 00D5 | A0 |
| 00D6 | 83 | 00D7 | C6 |
| 00D8 | E0 | 00D9 | AC |
| 00DA | F0 | 00DB | A1 |
| 00DC | 18 | 00DD | 19 |
| 00DE | EC | 00DF | DA |
| 00E0 | 83 | 00E1 | B8 |
| 00E2 | 4B | 00E3 | 04 |
| 00E4 | E7 | 00E5 | B8 |
| 00E6 | 49 | 00E7 | F0 |
| 00E8 | 03 | 00E9 | 01 |
| 00EA | A0 | 00EB | 18 |
| 00EC | F0 | 00ED | 13 |
| 00EE | 00 | 00EF | A0 |
| 00F0 | 83 | 00F1 | BA |
| 00F2 | 4D | 00F3 | BB |
| 00F4 | 02 | 00F5 | BC |
| 00F6 | 0A | 00F7 | BD |
| 00F8 | 02 | 00F9 | 44 |
| 00FA | BB | 0100 | B8 |
| 0101 | 43 | 0102 | B9 |
| 0103 | 51 | 0104 | F0 |
| 0105 | 32 | 0106 | 38 |
| 0107 | D1 | 0108 | 12 |
| 0109 | 29 | 010A | F1 |
| 010B | 72 | 010C | 2B |
| 010D | 37 | 010E | 52 |
| 010F | 29 | 0110 | 34 |
| 0111 | 9E | 0112 | 96 |
| 0113 | 29 | 0114 | BB |
| 0115 | 60 | 0116 | B8 |
| 0117 | 47 | 0118 | F0 |
| 0119 | AD | 011A | 14 |
| 011B | 92 | 011C | FD |
| 011D | DF | 011E | 96 |
| 011F | 29 | 0120 | 34 |
| 0121 | 92 | 0122 | 23 |
| 0123 | 02 | 0124 | 14 |
| 0125 | D7 | 0126 | FB |
| 0127 | 44 | 0128 | A3 |
| 0129 | C4 | 012A | 2D |
| 012B | 34 | 012C | 9E |
| 012D | 53 | 012E | FE |
| 012F | 96 | 0130 | 29 |
| 0131 | BB | 0132 | A0 |
| 0133 | F0 | 0134 | 12 |
| 0135 | 16 | 0136 | 24 |
| 0137 | 14 | 0138 | 12 |
| 0139 | 29 | 013A | 18 |
| 013B | F0 | 013C | F2 |
| 013D | 6F | 013E | F1 |
| 013F | D0 | 0140 | 12 |
| 0141 | 29 | 0142 | 34 |
| 0143 | 9E | 0144 | 76 |
| 0145 | 6B | 0146 | 53 |
| 0147 | FE | 0148 | 96 |
| 0149 | 29 | 014A | BB |
| 014B | 80 | 014C | F0 |
| 014D | 12 | 014E | 51 |
| 014F | BB | 0150 | 40 |
| 0151 | B8 | 0152 | 43 |
| 0153 | 23 | 0154 | F8 |
| 0155 | 6E | 0156 | 37 |
| 0157 | AE | 0158 | 03 |
| 0159 | FC | 015A | E6 |
| 015B | 29 | 015C | AA |
| 015D | 23 | 015E | 80 |
| 015F | 60 | 0160 | 18 |
| 0161 | EE | 0162 | 5F |
| 0163 | 96 | 0164 | 29 |
| 0165 | 34 | 0166 | 92 |
| 0167 | 18 | 0168 | FA |
| 0169 | 24 | 016A | 24 |
| 016B | 96 | 016C | 29 |
| 016D | 24 | 016E | 4F |
| 016F | 53 | 0170 | 7E |
| 0171 | C6 | 0172 | 84 |
| 0173 | F0 | 0174 | 17 |
| 0175 | 96 | 0176 | 29 |
| 0177 | 18 | 0178 | F0 |
| 0179 | 17 | 017A | 96 |
| 017B | 29 | 017C | BB |
| 017D | 40 | 017E | 76 |
| 017F | 51 | 0180 | BB |
| 0181 | C0 | 0182 | 24 |
| 0183 | 51 | 0184 | 18 |
| 0185 | F1 | 0186 | 92 |
| 0187 | 8E | 0188 | F0 |
| 0189 | 07 | 018A | 96 |
| 018B | 29 | 018C | 24 |
| 018D | 7C | 018E | F0 |
| 018F | 07 | 0190 | 24 |
| 0191 | 89 | 0192 | B8 |
| 0193 | 43 | 0194 | B9 |
| 0195 | 4D | 0196 | F0 |
| 0197 | 53 | 0198 | FC |
| 0199 | A1 | 019A | 18 |
| 019B | 18 | 019C | 19 |
| 019D | 83 | 019E | C9 |
| 019F | 18 | 01A0 | F0 |
| 01A1 | D1 | 01A2 | 83 |
| 01A3 | B8 | 01A4 | 3C |
| 01A5 | F0 | 01A6 | 96 |
| 01A7 | D0 | 01A8 | 91 |
| 01A9 | 8A | 01AA | FF |
| 01AB | 0A | 01AC | B8 |
| 01AD | 51 | 01AE | A0 |
| 01AF | 9A | 01B0 | A0 |
| 01B1 | A5 | 01B2 | 72 |
| 01B3 | B5 | 01B4 | B5 |
| 01B5 | BF | 01B6 | 00 |
| 01B7 | BE | 01B8 | 08 |
| 01B9 | FF | 01BA | E7 |
| 01BB | AF | 01BC | 23 |
| 01BD | D0 | 01BE | 6E |
| 01BF | A3 | 01C0 | 39 |
| 01C1 | 09 | 01C2 | 53 |
| 01C3 | 10 | 01C4 | 4F |
| 01C5 | AF | 01C6 | EE |
| 01C7 | B9 | 01C8 | 76 |
| 01C9 | CC | 01CA | 53 |
| 01CB | FE | 01CC | C8 |
| 01CD | A0 | 01CE | 89 |
| 01CF | FF | 01D0 | 83 |
| 01D1 | F0 | 01D2 | F4 |
| 01D3 | F2 | 01D4 | F6 |
| 01D5 | D1 | 01D6 | D5 |
| 01D7 | D3 | 01D8 | D7 |
| 01D9 | EF | 01DA | D9 |
| 01DB | EE | 01DC | D9 |
| 01DD | 83 | 01DE | 23 |
| 01DF | FF | 01E0 | 39 |
| 01E1 | 91 | 01E2 | 23 |
| 01E3 | A0 | 01E4 | 3A |
| 01E5 | B8 | 01E6 | 20 |
| 01E7 | BC | 01E8 | 4A |
| 01E9 | B4 | 01EA | 98 |
| 01EB | 34 | 01EC | A3 |
| 01ED | B8 | 01EE | 51 |
| 01EF | F0 | 01F0 | B9 |

-continued

ENHANCED TRD SWITCH MODULE ROM CODE - VER
I.E - GEC PROPRIETARY
ALL DATA VALUES ARE IN HEXADECIMAL FORMAT

| ADDRESS | DATA | ADDRESS | DATA |
|---------|------|---------|------|
| 01F1 | 3C | 01F2 | B1 |
| 01F3 | 40 | 01F4 | E4 |
| 01F5 | A5 | 01FA | 8A |
| 01FB | A0 | 01FC | BB |
| 01FD | 0F | 01FE | EB |
| 01FF | FE | 0200 | 56 |
| 0201 | 0A | 0202 | EE |
| 0203 | 00 | 0204 | 9A |
| 0205 | 20 | 0206 | EF |
| 0207 | 04 | 0208 | 97 |
| 0209 | 83 | 020A | BB |
| 020B | 03 | 020C | 46 |
| 020D | 00 | 020E | EB |
| 020F | 0C | 0210 | 97 |
| 0211 | A7 | 0212 | 83 |
| 0213 | BE | 0214 | 04 |
| 0215 | BF | 0216 | 3F |
| 0217 | 34 | 0218 | D9 |
| 0219 | 8A | 021A | A0 |
| 021B | 83 | 021C | B8 |
| 021D | 3C | 021E | F0 |
| 021F | 12 | 0220 | 2D |
| 0221 | 46 | 0222 | 2C |
| 0223 | B9 | 0224 | 03 |
| 0225 | 46 | 0226 | 2C |
| 0227 | E9 | 0228 | 25 |
| 0229 | 43 | 022A | 01 |
| 022B | A0 | 022C | 83 |
| 022D | 32 | 022E | 43 |
| 022F | 52 | 0230 | 33 |
| 0231 | 44 | 0232 | 51 |
| 0233 | 72 | 0234 | 41 |
| 0235 | 54 | 0236 | AE |
| 0237 | E6 | 0238 | 2C |
| 0239 | 32 | 023A | 3F |
| 023B | 23 | 023C | 08 |
| 023D | 44 | 023E | A3 |
| 023F | 54 | 0240 | A8 |
| 0241 | 44 | 0242 | EC |
| 0243 | 8A | 0244 | A0 |
| 0245 | 56 | 0246 | 2C |
| 0247 | BC | 0248 | 14 |
| 0249 | BD | 024A | 03 |
| 024B | 54 | 024C | D3 |
| 024D | E6 | 024E | 2C |
| 024F | 44 | 0250 | A8 |
| 0251 | BC | 0252 | 0C |
| 0253 | B8 | 0254 | 3D |
| 0255 | B4 | 0256 | 98 |
| 0257 | BA | 0258 | C8 |
| 0259 | BB | 025A | 20 |
| 025B | 14 | 025C | F5 |
| 025D | F6 | 025E | A1 |
| 025F | BE | 0260 | 04 |
| 0261 | 14 | 0262 | F1 |
| 0263 | F6 | 0264 | A1 |
| 0265 | B8 | 0266 | 3D |
| 0267 | F0 | 0268 | 6A |
| 0269 | A0 | 026A | 18 |
| 026B | F0 | 026C | 7B |
| 026D | A0 | 026E | 18 |
| 026F | F0 | 0270 | 6C |
| 0271 | A0 | 0272 | 18 |
| 0273 | F0 | 0274 | 7D |
| 0275 | A0 | 0276 | EE |
| 0277 | 61 | 0278 | B8 |
| 0279 | 3D | 027A | BA |
| 027B | 4A | 027C | BB |
| 027D | 09 | 027E | 14 |
| 027F | BB | 0280 | 14 |
| 0281 | CC | 0282 | B8 |
| 0283 | 3F | 0284 | BA |
| 0285 | 28 | 0286 | BB |
| 0287 | 08 | 0288 | 14 |
| 0289 | BB | 028A | 14 |
| 028B | CC | 028C | B8 |
| 028D | 41 | 028E | FA |

-continued

ENHANCED TRD SWITCH MODULE ROM CODE - VER
I.E - GEC PROPRIETARY
ALL DATA VALUES ARE IN HEXADECIMAL FORMAT

| ADDRESS | DATA | ADDRESS | DATA |
|---------|------|---------|------|
| 028F | A0 | 0290 | 18 |
| 0291 | FB | 0292 | A0 |
| 0293 | 14 | 0294 | CC |
| 0295 | 18 | 0296 | 10 |
| 0297 | B8 | 0298 | 3E |
| 0299 | 10 | 029A | B8 |
| 029B | 40 | 029C | 10 |
| 029D | 23 | 029E | 04 |
| 029F | 44 | 02A0 | A3 |
| 02A1 | 23 | 02A2 | 02 |
| 02A3 | B8 | 02A4 | 3C |
| 02A5 | 40 | 02A6 | A0 |
| 02A7 | 83 | 02A8 | 27 |
| 02A9 | B8 | 02AA | 3C |
| 02AB | 50 | 02AC | A0 |
| 02AD | 83 | 02AE | B8 |
| 02AF | 3D | 02B0 | F0 |
| 02B1 | AA | 02B2 | 18 |
| 02B3 | F0 | 02B4 | AB |
| 02B5 | 18 | 02B6 | F0 |
| 02B7 | AC | 02B8 | 18 |
| 02B9 | F0 | 02BA | AD |
| 02BB | FA | 02BC | C6 |
| 02BD | C2 | 02BE | 46 |
| 02BF | C9 | 02C0 | EA |
| 02C1 | BE | 02C2 | EB |
| 02C3 | BE | 02C4 | 23 |
| 02C5 | 01 | 02C6 | 97 |
| 02C7 | A7 | 02C8 | 83 |
| 02C9 | B8 | 02CA | 0C |
| 02CB | 56 | 02CC | BE |
| 02CD | E8 | 02CE | CB |
| 02CF | FA | 02D0 | 96 |
| 02D1 | D3 | 02D2 | 1B |
| 02D3 | FC | 02D4 | C6 |
| 02D5 | DA | 02D6 | 56 |
| 02D7 | E0 | 02D8 | EC |
| 02D9 | D6 | 02DA | ED |
| 02DB | D6 | 02DC | 23 |
| 02DD | 02 | 02DE | 44 |
| 02DF | C6 | 02E0 | B8 |
| 02E1 | 03 | 02E2 | 46 |
| 02E3 | D6 | 02E4 | E8 |
| 02E5 | E2 | 02E6 | FC |
| 02E7 | 96 | 02E8 | EA |
| 02E9 | 1D | 02EA | 97 |
| 02EB | 83 | 02EC | B9 |
| 02ED | 43 | 02EE | BE |
| 02EF | 06 | 02F0 | BF |
| 02F1 | 80 | 02F2 | BA |
| 02F3 | C8 | 02F4 | BB |
| 02F5 | 20 | 02F6 | B8 |
| 02F7 | 3F | 02F8 | F0 |
| 02F9 | AC | 02FA | 18 |
| 02FB | F0 | 02FC | AD |
| 02FD | 54 | 02FE | BB |
| 02FF | E6 | 0300 | 07 |
| 0301 | 64 | 0302 | 3F |
| 0303 | 54 | 0304 | AE |
| 0305 | F6 | 0306 | 3B |
| 0307 | B8 | 0308 | 41 |
| 0309 | FC | 030A | C6 |
| 030B | 28 | 030C | 37 |
| 030D | 17 | 030E | 60 |
| 030F | 18 | 0310 | FD |
| 0311 | 37 | 0312 | 70 |
| 0313 | FF | 0314 | 67 |
| 0315 | AF | 0316 | E6 |
| 0317 | 03 | 0318 | A1 |
| 0319 | 19 | 031A | BF |
| 031B | 80 | 031C | 54 |
| 031D | AE | 031E | F6 |
| 031F | 2C | 0320 | EE |
| 0321 | 07 | 0322 | 23 |
| 0323 | F7 | 0324 | 54 |
| 0325 | A9 | 0326 | 04 |
| 0327 | E1 | 0328 | 60 |

-continued

ENHANCED TRD SWITCH MODULE ROM CODE - VER
I.E - GEC PROPRIETARY
ALL DATA VALUES ARE IN HEXADECIMAL FORMAT

| ADDRESS | DATA | ADDRESS | DATA |
|---------|------|---------|------|
| 0329 | A7 | 032A | 64 |
| 032B | 0F | 032C | 12 |
| 032D | 32 | 032E | 14 |
| 032F | E1 | 0330 | 44 |
| 0331 | A8 | 0332 | 23 |
| 0333 | FC | 0334 | 6E |
| 0335 | F6 | 0336 | 26 |
| 0337 | 23 | 0338 | 10 |
| 0339 | 44 | 033A | A3 |
| 033B | 32 | 033C | 2E |
| 033D | 04 | 033E | E1 |
| 033F | 32 | 0340 | 30 |
| 0341 | 23 | 0342 | 02 |
| 0343 | 54 | 0344 | A3 |
| 0345 | 04 | 0346 | E1 |
| 0347 | B8 | 0348 | 54 |
| 0349 | B9 | 034A | 3C |
| 034B | F1 | 034C | C6 |
| 034D | 54 | 034E | B0 |
| 034F | 00 | 0350 | 23 |
| 0351 | 01 | 0352 | 44 |
| 0353 | A3 | 0354 | 74 |
| 0355 | AD | 0356 | 96 |
| 0357 | 92 | 0358 | F0 |
| 0359 | 52 | 035A | BA |
| 035B | 32 | 035C | 7F |
| 035D | 12 | 035E | 77 |
| 035F | B8 | 0360 | 04 |
| 0361 | B9 | 0362 | 40 |
| 0363 | 27 | 0364 | 21 |
| 0365 | AD | 0366 | C6 |
| 0367 | 69 | 0368 | CD |
| 0369 | C9 | 036A | 27 |
| 036B | 21 | 036C | AC |
| 036D | BA | 036E | CA |
| 036F | BB | 0370 | 08 |
| 0371 | 14 | 0372 | BB |
| 0373 | BA | 0374 | 01 |
| 0375 | 64 | 0376 | 85 |
| 0377 | BC | 0378 | F4 |
| 0379 | BD | 037A | 02 |
| 037B | BA | 037C | 03 |
| 037D | 64 | 037E | 85 |
| 037F | BC | 0380 | 3F |
| 0381 | BD | 0382 | 04 |
| 0383 | BA | 0384 | 07 |
| 0385 | 54 | 0386 | D3 |
| 0387 | E6 | 0388 | 4E |
| 0389 | B8 | 038A | 54 |
| 038B | F0 | 038C | 4A |
| 038D | A0 | 038E | 74 |
| 038F | AD | 0390 | C6 |
| 0391 | BA | 0392 | 9A |
| 0393 | 20 | 0394 | F4 |
| 0395 | E6 | 0396 | 74 |
| 0397 | DE | 0398 | F6 |
| 0399 | A1 | 039A | B8 |
| 039B | 54 | 039C | 27 |
| 039D | A0 | 039E | A1 |
| 039F | 44 | 03A0 | 13 |
| 03A1 | B8 | 03A2 | 54 |
| 03A3 | F1 | 03A4 | F2 |
| 03A5 | A8 | 03A6 | 64 |
| 03A7 | 4E | 03A8 | 43 |
| 03A9 | 01 | 03AA | A1 |
| 03AB | 64 | 03AC | 4E |
| 03AD | F0 | 03AE | B9 |
| 03AF | 56 | 03B0 | 85 |
| 03B1 | 76 | 03B2 | B6 |
| 03B3 | 51 | 03B4 | 96 |
| 03B5 | BB | 03B6 | 95 |
| 03B7 | C9 | 03B8 | F0 |
| 03B9 | 51 | 03BA | 83 |
| 03BB | 12 | 03BC | BA |
| 03BD | C9 | 03BE | F1 |
| 03BF | 19 | 03C0 | 12 |
| 03C1 | B6 | 03C2 | F1 |

-continued

ENHANCED TRD SWITCH MODULE ROM CODE - VER
I.E - GEC PROPRIETARY
ALL DATA VALUES ARE IN HEXADECIMAL FORMAT

| ADDRESS | DATA | ADDRESS | DATA |
|---------|------|---------|------|
| 03C3 | 32 | 03C4 | BA |
| 03C5 | C9 | 03C6 | F1 |
| 03C7 | 19 | 03C8 | 32 |
| 03C9 | B6 | 03CA | F1 |
| 03CB | 83 | 03DE | BD |
| 03DF | 07 | 03E0 | BE |
| 03E1 | 08 | 03E2 | BF |
| 03E3 | CA | 03E4 | 34 |
| 03E5 | D9 | 03E6 | BE |
| 03E7 | 29 | 03E8 | BF |
| 03E9 | 29 | 03EA | 34 |
| 03EB | FA | 03EC | F6 |
| 03ED | BA | 03EE | ED |
| 03EF | E6 | 03F0 | BE |
| 03F1 | 04 | 03F2 | BF |
| 03F3 | 3F | 03F4 | 34 |
| 03F5 | D9 | 03F6 | B8 |
| 03F7 | 52 | 03F8 | B6 |
| 03F9 | FB | 03FA | 18 |
| 03FB | F0 | 03FC | AD |
| 03FD | B8 | 03FE | 57 |
| 03FF | B6 | 0400 | 03 |
| 0401 | B8 | 0402 | 5F |
| 0403 | BC | 0404 | 08 |
| 0405 | F0 | 0406 | AA |
| 0407 | FA | 0408 | 77 |
| 0409 | AA | 040A | F2 |
| 040B | 12 | 040C | BE |
| 040D | 1B | 040E | BF |
| 040F | 29 | 0410 | 84 |
| 0411 | 16 | 0412 | BE |
| 0413 | 37 | 0414 | BF |
| 0415 | 29 | 0416 | 34 |
| 0417 | FA | 0418 | F6 |
| 0419 | 20 | 041A | EC |
| 041B | 07 | 041C | 18 |
| 041D | ED | 041E | 03 |
| 041F | 97 | 0420 | 83 |
| 0421 | D5 | 0422 | BF |
| 0423 | 83 | 0424 | 14 |
| 0425 | 07 | 0426 | BD |
| 0427 | 00 | 0428 | BE |
| 0429 | 00 | 042A | 25 |
| 042B | 93 | 042C | D5 |
| 042D | BC | 042E | 00 |
| 042F | 93 | 0430 | 01 |
| 0431 | 02 | 0432 | 04 |
| 0433 | 08 | 0434 | 10 |
| 0435 | 20 | 0436 | 40 |
| 0437 | 80 | 0438 | 72 |
| 0439 | 3C | 043A | 84 |
| 043B | 3D | 043C | 18 |
| 043D | 53 | 043E | 07 |
| 043F | 03 | 0440 | 30 |
| 0441 | A3 | 0442 | 83 |
| 0443 | 94 | 0444 | 38 |
| 0445 | 40 | 0446 | A0 |
| 0447 | 83 | 0448 | 94 |
| 0449 | 38 | 044A | 37 |
| 044B | 50 | 044C | A0 |
| 044D | 83 | 044E | B8 |
| 044F | 51 | 0450 | F0 |
| 0451 | 92 | 0452 | A7 |
| 0453 | D2 | 0454 | 7D |
| 0455 | 14 | 0456 | 11 |
| 0457 | B9 | 0458 | 1C |
| 0459 | 23 | 045A | 59 |
| 045B | 61 | 045C | E6 |
| 045D | 7F | 045E | 85 |
| 045F | 76 | 0460 | 68 |
| 0461 | B8 | 0462 | 38 |
| 0463 | F0 | 0464 | C6 |
| 0465 | 68 | 0466 | 94 |
| 0467 | E8 | 0468 | 95 |
| 0469 | B8 | 046A | 30 |
| 046B | F0 | 046C | C6 |
| 046D | 70 | 046E | 94 |

ENHANCED TRD SWITCH MODULE ROM CODE - VER 1.E - GEC PROPRIETARY
ALL DATA VALUES ARE IN HEXADECIMAL FORMAT

| ADDRESS | DATA | ADDRESS | DATA |
|---|---|---|---|
| 046F | E8 | 0470 | 35 |
| 0471 | 14 | 0472 | 07 |
| 0473 | 25 | 0474 | B8 |
| 0475 | 1C | 0476 | B0 |
| 0477 | 00 | 0478 | B8 |
| 0479 | 1E | 047A | B0 |
| 047B | 00 | 047C | 83 |
| 047D | 14 | 047E | 11 |
| 047F | B9 | 0480 | 1D |
| 0481 | 23 | 0482 | F8 |
| 0483 | 61 | 0484 | E6 |
| 0485 | A7 | 0486 | B4 |
| 0487 | 05 | 0488 | 85 |
| 0489 | 94 | 048A | A8 |
| 048B | 76 | 048C | 93 |
| 048D | B9 | 048E | 34 |
| 048F | B8 | 0490 | 28 |
| 0491 | 94 | 0492 | BF |
| 0493 | 95 | 0494 | 94 |
| 0495 | A8 | 0496 | B9 |
| 0497 | 2C | 0498 | B8 |
| 0499 | 24 | 049A | 94 |
| 049B | BF | 049C | 35 |
| 049D | 14 | 049E | 07 |
| 049F | 25 | 04A0 | B8 |
| 04A1 | 1D | 04A2 | B0 |
| 04A3 | 00 | 04A4 | 18 |
| 04A5 | B0 | 04A6 | 00 |
| 04A7 | 83 | 04A8 | B8 |
| 04A9 | 51 | 04AA | F0 |
| 04AB | 97 | 04AC | 32 |
| 04AD | AF | 04AE | A7 |
| 04AF | 83 | 04B0 | F1 |
| 04B1 | 50 | 04B2 | AA |
| 04B3 | F0 | 04B4 | 37 |
| 04B5 | 18 | 04B6 | 50 |
| 04B7 | 4A | 04B8 | AA |
| 04B9 | D1 | 04BA | 2A |
| 04BB | A1 | 04BC | 2A |
| 04BD | 19 | 04BE | 83 |
| 04BF | 94 | 04C0 | B0 |
| 04C1 | F6 | 04C2 | F0 |
| 04C3 | AB | 04C4 | 5A |
| 04C5 | 51 | 04C6 | AC |
| 04C7 | 19 | 04C8 | 19 |
| 04C9 | FA | 04CA | 37 |
| 04CB | 5B | 04CC | 51 |
| 04CD | 4C | 04CE | AB |
| 04CF | 5A | 04D0 | AA |
| 04D1 | FB | 04D2 | 96 |
| 04D3 | D5 | 04D4 | 83 |
| 04D5 | B4 | 04D6 | 26 |
| 04D7 | B4 | 04D8 | 46 |
| 04D9 | B9 | 04DA | 51 |
| 04DB | F1 | 04DC | 37 |
| 04DD | D2 | 04DE | E8 |
| 04DF | 52 | 04E0 | EC |
| 04E1 | BA | 04E2 | C5 |
| 04E3 | BB | 04E4 | AA |
| 04E5 | 14 | 04E6 | 1F |
| 04E7 | 83 | 04E8 | BA |
| 04E9 | 40 | 04EA | 84 |
| 04EB | E3 | 04EC | BA |
| 04ED | 44 | 04EE | 84 |
| 04EF | E3 | 04F0 | 5A |
| 04F1 | 51 | 04F2 | AB |
| 04F3 | FA | 04F4 | AC |
| 04F5 | 18 | 04F6 | 19 |
| 04F7 | 94 | 04F8 | B0 |
| 04F9 | 5A | 04FA | 51 |
| 04FB | 4B | 04FC | AB |
| 04FD | FA | 04FE | 5C |
| 04FF | 37 | 0500 | 5B |
| 0501 | AB | 0502 | 5C |
| 0503 | 84 | 0504 | D0 |
| 0505 | B8 | 0506 | 24 |
| 0507 | BE | 0508 | 04 |
| 0509 | 91 | 050A | FE |
| 050B | 03 | 050C | 21 |
| 050D | A3 | 050E | 39 |
| 050F | BC | 0510 | 09 |
| 0511 | B0 | 0512 | 00 |
| 0513 | 08 | 0514 | AF |
| 0515 | 08 | 0516 | DF |
| 0517 | 40 | 0518 | A0 |
| 0519 | EC | 051A | 15 |
| 051B | 18 | 051C | FF |
| 051D | A0 | 051E | 18 |
| 051F | EE | 0520 | 0A |
| 0521 | 83 | 0522 | 2F |
| 0523 | 1F | 0524 | 8F |
| 0525 | 4F | 0526 | B4 |
| 0527 | 46 | 0528 | B9 |
| 0529 | 51 | 052A | F1 |
| 052B | 37 | 052C | D2 |
| 052D | 42 | 052E | F4 |
| 052F | E6 | 0530 | F2 |
| 0531 | 42 | 0532 | FB |
| 0533 | A0 | 0534 | 18 |
| 0535 | FA | 0536 | A0 |
| 0537 | 18 | 0538 | F0 |
| 0539 | 4B | 053A | A0 |
| 053B | 18 | 053C | FB |
| 053D | 37 | 053E | 50 |
| 053F | 4A | 0540 | A0 |
| 0541 | 83 | 0542 | B4 |
| 0543 | 38 | 0544 | A4 |
| 0545 | 37 | 0546 | B8 |
| 0547 | 30 | 0548 | B6 |
| 0549 | 4C | 054A | B8 |
| 054B | 38 | 054C | 83 |
| 054D | B8 | 054E | 67 |
| 054F | B0 | 0550 | 9E |
| 0551 | BA | 0552 | 5C |
| 0553 | 23 | 0554 | 10 |
| 0555 | C4 | 0556 | DD |
| 0557 | BA | 0558 | 2C |
| 0559 | B4 | 055A | DB |
| 055B | C4 | 055C | D3 |
| 055D | F4 | 055E | E6 |
| 055F | F2 | 0560 | 96 |
| 0561 | 14 | 0562 | 1F |
| 0563 | FB | 0564 | 52 |
| 0565 | 96 | 0566 | B8 |
| 0567 | 3C | 0568 | F0 |
| 0569 | 53 | 056A | C0 |
| 056B | D3 | 056C | C0 |
| 056D | C6 | 056E | 96 |
| 056F | BA | 0570 | C8 |
| 0571 | BB | 0572 | 20 |
| 0573 | BC | 0574 | 01 |
| 0575 | BC | 0576 | 01 |
| 0577 | 54 | 0578 | BB |
| 0579 | 74 | 057A | 92 |
| 057B | F6 | 057C | 90 |
| 057D | 46 | 057E | 83 |
| 057F | BB | 0580 | 0F |
| 0581 | EB | 0582 | 81 |
| 0583 | B8 | 0584 | 3F |
| 0585 | F0 | 0586 | AC |
| 0587 | 18 | 0588 | F0 |
| 0589 | AD | 058A | 54 |
| 058B | D3 | 058C | E6 |
| 058D | 90 | 058E | 54 |
| 058F | A8 | 0590 | 14 |
| 0591 | E5 | 0592 | B8 |
| 0593 | 3C | 0594 | C4 |
| 0595 | 2D | 0596 | C4 |
| 0597 | C1 | 0598 | B0 |
| 0599 | 00 | 059A | 18 |
| 059B | EC | 059C | 98 |
| 059D | 83 | 059E | B4 |
| 059F | DB | 05A0 | FA |
| 05A1 | F2 | 05A2 | A7 |

-continued

ENHANCED TRD SWITCH MODULE ROM CODE - VER 1.E - GEC PROPRIETARY
ALL DATA VALUES ARE IN HEXADECIMAL FORMAT

| ADDRESS | DATA | ADDRESS | DATA |
|---|---|---|---|
| Ø5A3 | 94 | Ø5A4 | 48 |
| Ø5A5 | A4 | Ø5A6 | A9 |
| Ø5A7 | 94 | Ø5A8 | 43 |
| Ø5A9 | B4 | Ø5AA | C7 |
| Ø5AB | F4 | Ø5AC | E6 |
| Ø5AD | 96 | Ø5AE | B7 |
| Ø5AF | BA | Ø5BØ | 2C |
| Ø5B1 | BB | Ø5B2 | 24 |
| Ø5B3 | B4 | Ø5B4 | DB |
| Ø5B5 | 14 | Ø5B6 | 1F |
| Ø5B7 | C4 | Ø5B8 | C1 |
| Ø5B9 | FØ | Ø5BA | Ø2 |
| Ø5BB | 23 | Ø5BC | BF |
| Ø5BD | 39 | Ø5BE | 89 |
| Ø5BF | FF | Ø5CØ | 18 |
| Ø5C1 | FØ | Ø5C2 | Ø2 |
| Ø5C3 | 23 | Ø5C4 | 7F |
| Ø5C5 | A4 | Ø5C6 | D7 |
| Ø5C7 | B4 | Ø5C8 | DB |
| Ø5C9 | B6 | Ø5CA | B9 |
| Ø5CB | FØ | Ø5CC | Ø2 |
| Ø5CD | 23 | Ø5CE | 8Ø |
| Ø5CF | 3A | Ø5DØ | 8A |
| Ø5D1 | AØ | Ø5D2 | 18 |
| Ø5D3 | FØ | Ø5D4 | Ø2 |
| Ø5D5 | 23 | Ø5D6 | EF |
| Ø5D7 | 39 | Ø5D8 | 89 |
| Ø5D9 | FF | Ø5DA | 83 |
| Ø5DB | B8 | Ø5DC | 2Ø |
| Ø5DD | B6 | Ø5DE | E1 |
| Ø5DF | B8 | Ø5EØ | 22 |
| Ø5E1 | 83 | Ø6ØØ | B8 |
| Ø6Ø1 | 3C | Ø6Ø2 | FØ |
| Ø6Ø3 | 53 | Ø6Ø4 | 1Ø |
| Ø6Ø5 | C6 | Ø6Ø6 | 2D |
| Ø6Ø7 | 34 | Ø6Ø8 | ØØ |
| Ø6Ø9 | B9 | Ø6ØA | 51 |
| Ø6ØB | F1 | Ø6ØC | 37 |
| Ø6ØD | AF | Ø6ØE | B9 |
| Ø6ØF | 4D | Ø61Ø | FØ |
| Ø611 | 53 | Ø612 | CØ |
| Ø613 | C6 | Ø614 | 2D |
| Ø615 | 85 | Ø616 | F2 |
| Ø617 | 19 | Ø618 | 95 |
| Ø619 | FØ | Ø61A | 53 |
| Ø61B | 2Ø | Ø61C | C6 |
| Ø61D | 48 | Ø61E | FF |
| Ø61F | 92 | Ø62Ø | 2D |
| Ø621 | 52 | Ø622 | 2D |
| Ø623 | F1 | Ø624 | D3 |
| Ø625 | 1C | Ø626 | C6 |
| Ø627 | B1 | Ø628 | F1 |
| Ø629 | D3 | Ø62A | 8C |
| Ø62B | C6 | Ø62C | 31 |
| Ø62D | 23 | Ø62E | ØF |
| Ø62F | 44 | Ø63Ø | A9 |
| Ø631 | 19 | Ø632 | F1 |
| Ø633 | D3 | Ø634 | FØ |
| Ø635 | C6 | Ø636 | 77 |
| Ø637 | F1 | Ø638 | D3 |
| Ø639 | E1 | Ø63A | C6 |
| Ø63B | 7B | Ø63C | F1 |
| Ø63D | D3 | Ø63E | B4 |
| Ø63F | C6 | Ø64Ø | 87 |
| Ø641 | F1 | Ø642 | D3 |
| Ø643 | 69 | Ø644 | C6 |
| Ø645 | 87 | Ø646 | C4 |
| Ø647 | 2D | Ø648 | F1 |
| Ø649 | 77 | Ø64A | 77 |
| Ø64B | C6 | Ø64C | F7 |
| Ø64D | Ø7 | Ø64E | C6 |
| Ø64F | 5D | Ø65Ø | Ø7 |
| Ø651 | C6 | Ø652 | 61 |
| Ø653 | Ø7 | Ø654 | F6 |
| Ø655 | 8D | Ø656 | C6 |
| Ø657 | B1 | Ø658 | Ø7 |
| Ø659 | 96 | Ø65A | 2D |

-continued

ENHANCED TRD SWITCH MODULE ROM CODE - VER 1.E - GEC PROPRIETARY
ALL DATA VALUES ARE IN HEXADECIMAL FORMAT

| ADDRESS | DATA | ADDRESS | DATA |
|---|---|---|---|
| Ø65B | C4 | Ø65C | 83 |
| Ø65D | BB | Ø65E | Ø1 |
| Ø65F | C4 | Ø66Ø | 63 |
| Ø661 | BB | Ø662 | Ø4 |
| Ø663 | 19 | Ø664 | F1 |
| Ø665 | C6 | Ø666 | D1 |
| Ø667 | Ø7 | Ø668 | C6 |
| Ø669 | D7 | Ø66A | Ø7 |
| Ø66B | C6 | Ø66C | E1 |
| Ø66D | Ø7 | Ø66E | C6 |
| Ø66F | F5 | Ø67Ø | Ø7 |
| Ø671 | F6 | Ø672 | 9A |
| Ø673 | 96 | Ø674 | 2D |
| Ø675 | A4 | Ø676 | 57 |
| Ø677 | 19 | Ø678 | F1 |
| Ø679 | C4 | Ø67A | 7F |
| Ø67B | 19 | Ø67C | F1 |
| Ø67D | 43 | Ø67E | 8Ø |
| Ø67F | Ø7 | Ø68Ø | AA |
| Ø681 | A4 | Ø682 | 9E |
| Ø683 | 19 | Ø684 | F1 |
| Ø685 | C4 | Ø686 | 8Ø |
| Ø687 | B8 | Ø688 | 21 |
| Ø689 | BA | Ø68A | A9 |
| Ø68B | A4 | Ø68C | 59 |
| Ø68D | Ø7 | Ø68E | Ø7 |
| Ø68F | 96 | Ø69Ø | 93 |
| Ø691 | E4 | Ø692 | 3A |
| Ø693 | F1 | Ø694 | D3 |
| Ø695 | 48 | Ø696 | 96 |
| Ø697 | 2D | Ø698 | C4 |
| Ø699 | A5 | Ø69A | Ø7 |
| Ø69B | C6 | Ø69C | F9 |
| Ø69D | Ø7 | Ø69E | C6 |
| Ø69F | FB | Ø6AØ | Ø7 |
| Ø6A1 | 96 | Ø6A2 | 2D |
| Ø6A3 | E4 | Ø6A4 | 9B |
| Ø6A5 | 19 | Ø6A6 | B4 |
| Ø6A7 | 46 | Ø6A8 | F1 |
| Ø6A9 | 37 | Ø6AA | 5Ø |
| Ø6AB | AØ | Ø6AC | 18 |
| Ø6AD | 5Ø | Ø6AE | AØ |
| Ø6AF | C4 | Ø6BØ | C1 |
| Ø6B1 | B8 | Ø6B2 | 69 |
| Ø6B3 | BØ | Ø6B4 | ØØ |
| Ø6B5 | 19 | Ø6B6 | B4 |
| Ø6B7 | BD | Ø6B8 | F8 |
| Ø6B9 | 29 | Ø6BA | A8 |
| Ø6BB | 23 | Ø6BC | Ø2 |
| Ø6BD | 14 | Ø6BE | D7 |
| Ø6BF | A4 | Ø6CØ | A9 |
| Ø6C1 | 14 | Ø6C2 | E5 |
| Ø6C3 | B8 | Ø6C4 | 3C |
| Ø6C5 | FØ | Ø6C6 | B6 |
| Ø6C7 | CC | Ø6C8 | 53 |
| Ø6C9 | 7F | Ø6CA | C4 |
| Ø6CB | CE | Ø6CC | 53 |
| Ø6CD | BF | Ø6CE | AØ |
| Ø6CF | C4 | Ø6DØ | Ø9 |
| Ø6D1 | D4 | Ø6D2 | E7 |
| Ø6D3 | 23 | Ø6D4 | 2Ø |
| Ø6D5 | C4 | Ø6D6 | DD |
| Ø6D7 | B8 | Ø6D8 | 3D |
| Ø6D9 | BA | Ø6DA | 5Ø |
| Ø6DB | 23 | Ø6DC | 4Ø |
| Ø6DD | 4B | Ø6DE | AB |
| Ø6DF | A4 | Ø6EØ | 5D |
| Ø6E1 | B8 | Ø6E2 | 49 |
| Ø6E3 | BA | Ø6E4 | 58 |
| Ø6E5 | C4 | Ø6E6 | DB |
| Ø6E7 | BA | Ø6E8 | 4C |
| Ø6E9 | B8 | Ø6EA | 68 |
| Ø6EB | B9 | Ø6EC | 69 |
| Ø6ED | F1 | Ø6EE | AØ |
| Ø6EF | C8 | Ø6FØ | B9 |
| Ø6F1 | 51 | Ø6F2 | F1 |
| Ø6F3 | AØ | Ø6F4 | 83 |

ENHANCED TRD SWITCH MODULE ROM CODE - VER I.E - GEC PROPRIETARY
ALL DATA VALUES ARE IN HEXADECIMAL FORMAT
-continued

| ADDRESS | DATA | ADDRESS | DATA |
|---------|------|---------|------|
| Ø6F5 | A4 | Ø6F6 | 4D |
| Ø6F7 | 24 | Ø6F8 | DE |
| Ø6F9 | E4 | Ø6FA | 7D |
| Ø6FB | E4 | Ø6FC | 91 |
| Ø7ØØ | BB | Ø7Ø1 | 64 |
| Ø7Ø2 | BA | Ø7Ø3 | A6 |
| Ø7Ø4 | 8C | Ø7Ø5 | EA |
| Ø7Ø6 | Ø4 | Ø7Ø7 | EB |
| Ø7Ø8 | Ø2 | Ø7Ø9 | EC |
| Ø7ØA | ØØ | Ø7ØB | 83 |
| Ø7ØC | 8C | Ø7ØD | EC |
| Ø7ØE | ØC | Ø7ØF | 34 |
| Ø71Ø | DE | Ø711 | BC |
| Ø712 | FA | Ø713 | F4 |
| Ø714 | ØØ | Ø715 | B8 |
| Ø716 | 69 | Ø717 | BØ |
| Ø718 | Ø1 | Ø719 | D4 |
| Ø71A | E7 | Ø71B | BB |
| Ø71C | 21 | Ø71D | 85 |
| Ø71E | 95 | Ø71F | 14 |
| Ø72Ø | 1F | Ø721 | F4 |
| Ø722 | E6 | Ø723 | 43 |
| Ø724 | 4Ø | Ø725 | A1 |
| Ø726 | 15 | Ø727 | 27 |
| Ø728 | D7 | Ø729 | BA |
| Ø72A | ØA | Ø72B | 8C |
| Ø72C | EA | Ø72D | 2B |
| Ø72E | 54 | Ø72F | 1C |
| Ø73Ø | D4 | Ø731 | ØØ |
| Ø732 | 74 | Ø733 | 47 |
| Ø734 | 94 | Ø735 | 4E |
| Ø736 | 34 | Ø737 | A3 |
| Ø738 | E4 | Ø739 | 26 |
| Ø73A | B8 | Ø73B | 69 |
| Ø73C | BØ | Ø73D | ØØ |
| Ø73E | 19 | Ø73F | B8 |
| Ø74Ø | 2D | Ø741 | B6 |
| Ø742 | 45 | Ø743 | B8 |
| Ø744 | 35 | Ø745 | FØ |
| Ø746 | D1 | Ø747 | 51 |
| Ø748 | AA | Ø749 | F1 |
| Ø74A | AØ | Ø74B | 18 |
| Ø74C | 18 | Ø74D | 19 |
| Ø74E | FØ | Ø74F | D1 |
| Ø75Ø | 51 | Ø751 | AB |
| Ø752 | F1 | Ø753 | AØ |
| Ø754 | 94 | Ø755 | A8 |
| Ø756 | B8 | Ø757 | 2C |
| Ø758 | B6 | Ø759 | 5C |
| Ø75A | B8 | Ø75B | 34 |
| Ø75C | FØ | Ø75D | AC |
| Ø75E | 5A | Ø75F | AA |
| Ø76Ø | F6 | Ø761 | 7Ø |
| Ø762 | FC | Ø763 | 37 |
| Ø764 | 5B | Ø765 | 4A |
| Ø766 | AB | Ø767 | 5C |
| Ø768 | AA | Ø769 | FB |
| Ø76A | C6 | Ø76B | 6E |
| Ø76C | 94 | Ø76D | D5 |
| Ø76E | C4 | Ø76F | C1 |
| Ø77Ø | 18 | Ø771 | 18 |
| Ø772 | FØ | Ø773 | 5B |
| Ø774 | AB | Ø775 | 5A |
| Ø776 | 37 | Ø777 | AD |
| Ø778 | FA | Ø779 | 4B |
| Ø77A | 5D | Ø77B | E4 |
| Ø77C | 66 | Ø77D | B9 |
| Ø77E | 2D | Ø77F | B6 |
| Ø78Ø | 83 | Ø781 | B9 |
| Ø782 | 35 | Ø783 | BA |
| Ø784 | 3Ø | Ø785 | B8 |
| Ø786 | 67 | Ø787 | F1 |
| Ø788 | AØ | Ø789 | 19 |
| Ø78A | 19 | Ø78B | 18 |
| Ø78C | F1 | Ø78D | AØ |
| Ø78E | C8 | Ø78F | C4 |
| Ø79Ø | D3 | Ø791 | B9 |
| Ø792 | 2C | Ø793 | B6 |
| Ø794 | 97 | Ø795 | B9 |
| Ø796 | 34 | Ø797 | BA |
| Ø798 | 34 | Ø799 | E4 |
| Ø79A | 85 | Ø79B | B8 |
| Ø79C | 32 | Ø79D | B6 |
| Ø79E | A1 | Ø79F | B8 |
| Ø7AØ | 3A | Ø7A1 | BA |
| Ø7A2 | 3C | Ø7A3 | C4 |
| Ø7A4 | D3 | Ø7A5 | 76 |
| Ø7A6 | A9 | Ø7A7 | B1 |
| Ø7A8 | CØ | Ø7A9 | 92 |
| Ø7AA | D3 | Ø7AB | 23 |
| Ø7AC | FF | Ø7AD | B8 |
| Ø7AE | 2D | Ø7AF | AØ |
| Ø7BØ | B8 | Ø7B1 | 2F |
| Ø7B2 | AØ | Ø7B3 | 76 |
| Ø7B4 | BB | Ø7B5 | B8 |
| Ø7B6 | 35 | Ø7B7 | AØ |
| Ø7B8 | B8 | Ø7B9 | 37 |
| Ø7BA | AØ | Ø7BB | B4 |
| Ø7BC | Ø5 | Ø7BD | B8 |
| Ø7BE | 25 | Ø7BF | B9 |
| Ø7CØ | 2C | Ø7C1 | F4 |
| Ø7C2 | DD | Ø7C3 | 76 |
| Ø7C4 | CB | Ø7C5 | B8 |
| Ø7C6 | 29 | Ø7C7 | B9 |
| Ø7C8 | 34 | Ø7C9 | F4 |
| Ø7CA | DD | Ø7CB | B8 |
| Ø7CC | 3C | Ø7CD | BØ |
| Ø7CE | Ø3 | Ø7CF | 94 |
| Ø7DØ | 21 | Ø7D1 | 84 |
| Ø7D2 | 2C | Ø7D3 | 85 |
| Ø7D4 | B4 | Ø7D5 | C7 |
| Ø7D6 | 76 | Ø7D7 | CB |
| Ø7D8 | 95 | Ø7D9 | B4 |
| Ø7DA | C7 | Ø7DB | E4 |
| Ø7DC | CB | Ø7DD | FØ |
| Ø7DE | A1 | Ø7DF | 18 |
| Ø7EØ | 18 | Ø7E1 | 19 |
| Ø7E2 | 19 | Ø7E3 | FØ |
| Ø7E4 | A1 | Ø7E5 | 83 |
| Ø7E6 | B9 | Ø7E7 | 55 |
| Ø7E8 | B6 | Ø7E9 | EB |
| Ø7EA | 19 | Ø7EB | F1 |
| Ø7EC | 83 | Ø7ED | 28 |
| Ø7EE | 43 | Ø7EF | 29 |
| Ø7FØ | 2Ø | Ø7F1 | 47 |
| Ø7F2 | 45 | Ø7F3 | 2Ø |
| Ø7F4 | 31 | Ø7F5 | 39 |
| Ø7F6 | 38 | Ø7F7 | 32 |

NOTE:
ALL UNSPECIFIED ADDRESSES FROM 0 TO 7FFH ARE FILLED WITH DATA BYTE=00

What is claimed is:

1. In a system for controlling distributed electrical loads including a central controller for providing a data signal defining the manner in which said loads are to be controlled; plural transceiver devices, each device being connected to control a subset of said loads by controlling relays in respective power circuits of said loads and including means for receiving contact closure inputs and transmitting information related thereto to the central controller; and a single data line connecting said central controller with each transceiver device, and improved transceiver device, comprising:
   means, coupled to said receiving means, for monitoring the current state of any contact closure input to said transceiver and transmitting information indicative thereof to the central controller.

2. In a system for controlling distributed electrical loads including a central controller for providing a data signal defining the manner in which said loads are to be controller; plural transceiver devices, each device being connected to control a subset of said loads by controlling relays in respective power circuits of said loads and including means receiving contact closure inputs and transmitting information related thereto to the central controller; and a single data line connecting said central controller with each transceiver device, and improved transceiver device, comprising:

means for selectively disabling a contact closure input such that a contact closure on the disabled input will not cause data indicative of that contact closure input to be transmitted to the central controller, thereby providing a masking override function for such an input.

3. In a system for controlling distributed electrical loads including a central controller for providing a data signal defining the manner in which said loads are to be controlled; plural transceiver devices, each device being connected to control a subset of said loads by controlling relays in respective power circuits of said loads and including means for receiving contact closure inputs and transmitting information related thereto to the central controller; and a single data line connecting said central controller with each transceiver device, and improved transceiver device, comprising:

means, coupled to said receiving means for accumulating contact closure inputs and maintaining a record of the last received contact closure for each contact closure input of said transceiver; and means for interrogating said accumulating means as to the last contact closure state of any switch input and transmitting data indicative thereof to said central controller.

4. A system for controlling distributed electrical loads comprising:

a central controller for providing a data signal defining the manner in which said loads are to be controlled; plural transceiver devices, each device being connected to control a subset of said loads by controlling relays in respective power circuits of said loads and including means for receiving contact closure inputs and transmitting information related thereto to the central controller;

and a single data line connecting said central controller with each transceiver device;

means for providing from said central controller to said transceiver decoder an acknowledgement of received information indicative of a contact closure input to said transceiver decoder.

5. A system according to claim 4 further comprising means at said transceiver for periodically retransmitting information related to contact closures until receiving a positive acknowledgement of the information from the central controller.

6. In a system for controlling distributed electrical loads including a cental controller for providing a data signal defining the manner in which said loads are to be controlled; plural transceiver devices, each device being connected to control a subset of said loads by controlling relays in respective power circuits of said loads and including means for receiving contact closure inputs and transmitting information related thereto to the central controller; and a single data line connecting said central controller with each transceiver device, and improved transceiver device, comprising:

means for providing a changeable threshold reference providing first and second threshold signals;

means for comparing a contact closure input with said first threshold signal; and means, in the event of a favorable comparison with said first threshold in accordance with predetermined criteria, for further comparing the contact closure input with said second threshold signal to determine whether a contact closure actually occurred.

7. An improved transceiver device according to claim 6 further comprising means for multiplexing contact closure inputs onto a number of lines less than the total number of contact closure inputs associated with the transceiver for coupling to a processor of said transceiver.

8. In a system for controlling distributed electrical loads including a central controller for providing a data signal defining the manner in which said loads are to be controlled; plural microprocessor-based transceiver devices, each device being connected to control a subset of said loads by controlling relays in respective power circutis of said loads and including means for receiving contact closure inputs and tarnsmitting information related thereto to the central controller; and a single data line connecting said central controller with each transceiver device, and improved transceiver device, comprising:

a watchdog reset circuit coupled to said microprocessor for monitoring the operation thereof, and providing a reset signal thereto in the event of a failure of proper operation thereof, said watchdog reset circuit being AC coupled to said microprocessor so that its operation is not defeated by a malfunction that would cause a DC condition in a signal resetting a watchdog timer of the watchdog reset circuit; and means, responsive to a reset of said microprocessor for annunciating a reset message, via said data line, to said central controller.

9. An improved transceiver device according to claim 8 further comprising means, coupled to said watchdog reset circuit, for preventing erroneous switch transmissions from said transceiver to said central controller on power-up thereby preventing regeneration of a previously processed contact closure.

* * * * *